US012091366B2

(12) United States Patent
Addiego et al.

(10) Patent No.: US 12,091,366 B2
(45) Date of Patent: Sep. 17, 2024

(54) METHODS OF MAKING HONEYCOMB BODIES HAVING INORGANIC FILTRATION DEPOSITS

(71) Applicant: CORNING INCORPORATED, Corning, NY (US)

(72) Inventors: William Peter Addiego, Big Flats, NY (US); Xiaoran Fang, Shanghai (CN); Thomas Jean Glasson, Avon (FR); Roychelle Sheneen Ingram-Ogunwumi, Painted Post, NY (US); Mark Alan Lewis, Horseheads, NY (US); Cai Liu, Suzhou (CN); Dale Robert Powers, Painted Post, NY (US); Todd Parrish St Clair, Painted Post, NY (US); Jianguo Wang, Horseheads, NY (US); Huiqing Wu, Shanghai (CN); Xinfeng Xing, Shanghai (CN); Danhong Zhong, Elmira, NY (US)

(73) Assignee: Corning Incorporated, Corning, NY (US)

( * ) Notice: Subject to any disclaimer, the term of this patent is extended or adjusted under 35 U.S.C. 154(b) by 615 days.

(21) Appl. No.: 17/272,175

(22) PCT Filed: Aug. 30, 2019

(86) PCT No.: PCT/US2019/049209
§ 371 (c)(1),
(2) Date: Feb. 26, 2021

(87) PCT Pub. No.: WO2020/047503
PCT Pub. Date: Mar. 5, 2020

(65) Prior Publication Data
US 2021/0354071 A1 Nov. 18, 2021

Related U.S. Application Data

(60) Provisional application No. 62/726,192, filed on Aug. 31, 2018.

(30) Foreign Application Priority Data

Sep. 3, 2018 (WO) ................ PCT/CN2018/103807

(51) Int. Cl.
*B01D 53/22* (2006.01)
*B01D 39/20* (2006.01)
(Continued)

(52) U.S. Cl.
CPC ...... *C04B 38/0006* (2013.01); *B01D 39/2034* (2013.01); *B01D 39/2079* (2013.01);
(Continued)

(58) Field of Classification Search
CPC ....... C04B 2111/00793; C04B 41/5031; C04B 38/0096; C04B 26/10; C04B 41/009;
(Continued)

(56) References Cited

U.S. PATENT DOCUMENTS 4,676,740 A * 6/1987 deBeus ............... F27D 99/0001
432/118
6,840,976 B2 1/2005 Vance et al.
(Continued)

FOREIGN PATENT DOCUMENTS

CN 1365298 A 8/2002
CN 1424493 A 6/2003
(Continued)

OTHER PUBLICATIONS

C. U. Ingemar, et al., "Dealuminated mordenites as catalyst in the oxidation and decomposition of nitric oxide and in the decomposition of nitrogen dioxide: characterization and activities", Catalysis Today, Jan. 1989, pp. 155-172.
(Continued)

*Primary Examiner* — Anthony R Shumate
(74) *Attorney, Agent, or Firm* — Matthew J. Mason

(57) ABSTRACT

Filtration articles herein exhibit excellent filtration efficiency and pressure drop before and after water durability
(Continued)

testing. The articles comprise: a honeycomb filter body; inorganic deposits disposed within the honeycomb filter body at a loading of less than or equal to 20 grams of the inorganic deposits per liter of the honeycomb filter body. The inorganic deposits are comprised of refractory inorganic nanoparticles bound by a high temperature binder comprising one or more inorganic components. At least a portion of the inorganic deposits form a porous inorganic network over portions of inlet walls of the honeycomb filter body.

18 Claims, 69 Drawing Sheets

(51) Int. Cl.
| | |
|---|---|
| B01D 46/00 | (2022.01) |
| B01D 46/24 | (2006.01) |
| B05B 7/14 | (2006.01) |
| B05B 7/16 | (2006.01) |
| C04B 26/10 | (2006.01) |
| C04B 35/195 | (2006.01) |
| C04B 38/00 | (2006.01) |
| C04B 41/00 | (2006.01) |
| C04B 41/45 | (2006.01) |
| C04B 41/50 | (2006.01) |
| C04B 41/87 | (2006.01) |
| B82Y 30/00 | (2011.01) |
| B82Y 40/00 | (2011.01) |
| C04B 111/00 | (2006.01) |

(52) U.S. Cl.
CPC ..... *B01D 46/0001* (2013.01); *B01D 46/2418* (2013.01); *B05B 7/14* (2013.01); *B05B 7/1613* (2013.01); *C04B 26/10* (2013.01); *C04B 35/195* (2013.01); *C04B 38/0019* (2013.01); *C04B 38/0096* (2013.01); *C04B 41/009* (2013.01); *C04B 41/4543* (2013.01); *C04B 41/5031* (2013.01); *C04B 41/87* (2013.01); *B01D 2239/0407* (2013.01); *B01D 2239/0478* (2013.01); *B82Y 30/00* (2013.01); *B82Y 40/00* (2013.01); *C04B 2111/00793* (2013.01); *C04B 2111/0081* (2013.01)

(58) Field of Classification Search
CPC .............. C04B 41/87; C04B 2111/0081; C04B 38/0006; C04B 38/0019; C04B 35/195; C04B 41/4543; B01D 39/2079; B01D 39/2034; B01D 2239/0407; B01D 2239/0478; B01D 46/2418; B01D 46/0001; B82Y 40/00; B05B 7/14; B05B 7/1613

See application file for complete search history.

(56) References Cited

U.S. PATENT DOCUMENTS

| | | | |
|---|---|---|---|
| 6,890,616 B2 | 5/2005 | Suwabe et al. | |
| 7,520,918 B2 | 4/2009 | Zoeller, III | |
| 7,704,296 B2 | 4/2010 | Merkel | |
| 7,767,256 B2 | 8/2010 | Gu et al. | |
| 8,012,439 B2 | 9/2011 | Arnold et al. | |
| 8,298,311 B2 | 10/2012 | Chen et al. | |
| 8,475,557 B2 | 7/2013 | Boger et al. | |
| 8,495,968 B2 | 7/2013 | Tsuji et al. | |
| 8,534,221 B2 | 9/2013 | Tsuji et al. | |
| 8,632,852 B2 | 1/2014 | Tsuji et al. | |
| 8,894,895 B2 | 11/2014 | Fredholm et al. | |
| 8,959,773 B2 | 2/2015 | Fekety et al. | |
| 9,040,003 B2 | 5/2015 | Andersen et al. | |
| 9,255,036 B2 | 2/2016 | Drury et al. | |
| 9,321,694 B2 | 4/2016 | Pyzik et al. | |
| 9,352,277 B2 | 5/2016 | Sutton et al. | |
| 9,523,623 B2 | 12/2016 | Blanchard et al. | |
| 9,650,661 B2* | 5/2017 | Witcher | C12Q 1/22 |
| 9,656,421 B2 | 5/2017 | Chaumonnot et al. | |
| 10,752,997 B2 | 8/2020 | Jiang | |
| 11,248,129 B2* | 2/2022 | Brown | C09D 123/12 |
| 2003/0024219 A1 | 2/2003 | Harada et al. | |
| 2003/0167755 A1 | 9/2003 | Nakatani et al. | |
| 2004/0176246 A1 | 9/2004 | Shirk et al. | |
| 2005/0180898 A1 | 8/2005 | Yamada | |
| 2009/0192205 A1* | 7/2009 | Augustijns | A61K 31/41 514/359 |
| 2010/0126133 A1 | 5/2010 | Fekety et al. | |
| 2010/0158774 A1 | 6/2010 | Andy et al. | |
| 2011/0014455 A1* | 1/2011 | Miller | H01B 1/04 427/430.1 |
| 2012/0070346 A1 | 3/2012 | Mizutani et al. | |
| 2012/0276387 A1* | 11/2012 | Hattanda | B22D 41/58 428/448 |
| 2013/0182331 A1* | 7/2013 | Hebrink | G02B 5/0294 359/601 |
| 2013/0186466 A1* | 7/2013 | Hebrink | C12N 15/113 428/149 |
| 2014/0248464 A1 | 9/2014 | Soga | |
| 2014/0272276 A1 | 9/2014 | Drury et al. | |
| 2015/0017075 A1 | 1/2015 | Jinbo et al. | |
| 2016/0272547 A1 | 9/2016 | Kikuchi et al. | |
| 2018/0037463 A1* | 2/2018 | Fujino | C03B 20/00 |
| 2018/0311621 A1 | 11/2018 | Chen et al. | |
| 2018/0361299 A1 | 12/2018 | Ingram-Ogunwumi et al. | |
| 2019/0351392 A1* | 11/2019 | Tran-Thi | B01J 20/3293 |
| 2020/0155710 A1* | 5/2020 | Kohle | A61K 49/0032 |
| 2020/0353401 A1 | 11/2020 | Beall et al. | |
| 2021/0267412 A1* | 9/2021 | Som | B01J 20/28007 |
| 2022/0365024 A1* | 11/2022 | Aran | G01N 27/414 |

FOREIGN PATENT DOCUMENTS

| | | |
|---|---|---|
| CN | 1464936 A | 12/2003 |
| CN | 1512972 A | 7/2004 |
| CN | 1646204 A | 7/2005 |
| CN | 1984854 A | 6/2007 |
| CN | 101311501 A | 11/2008 |
| CN | 101558024 A | 10/2009 |
| CN | 101563170 A | 10/2009 |
| CN | 101679135 A | 3/2010 |
| CN | 101970377 A | 2/2011 |
| CN | 102413906 A | 4/2012 |
| CN | 102762279 A | 10/2012 |
| CN | 103080047 A | 5/2013 |
| CN | 103270002 A | 8/2013 |
| CN | 103459012 A | 12/2013 |
| CN | 103796758 A | 5/2014 |
| CN | 103889928 A | 6/2014 |
| CN | 104768643 A | 7/2015 |
| CN | 104801114 A | 7/2015 |
| CN | 105408731 A | 3/2016 |
| CN | 105503232 A | 4/2016 |
| CN | 105793212 A | 7/2016 |
| CN | 108290102 A | 7/2018 |
| CN | 108367225 A | 8/2018 |
| EP | 1775021 A1 | 4/2007 |
| EP | 1775022 A1 | 4/2007 |
| EP | 2158956 A1 | 3/2010 |
| JP | 07-330456 A | 12/1995 |
| JP | 2010-529343 A | 8/2010 |
| JP | 2012-509764 A | 4/2012 |
| JP | 2013-542902 A | 11/2013 |
| JP | 2014-117663 A | 6/2014 |
| JP | 2015-034322 A | 2/2015 |
| WO | 2004/007499 A1 | 1/2004 |
| WO | 2009/101683 A1 | 8/2009 |
| WO | 2017/075328 A1 | 5/2017 |

(56) References Cited

FOREIGN PATENT DOCUMENTS

WO 2020/047503 A2 3/2020
WO 2020/047506 A1 3/2020

OTHER PUBLICATIONS

Chinese Patent Application No. 201880099198.X, Office Action dated May 10, 2022, 7 pages (English Translation Only), Chinese Patent Office.
Chinese Patent Application No. 201980072251.1, Office Action, dated Apr. 28, 2022, 5 pages, Chinese Patent Office.
European Patent Application No. 19769665.1, Observations by third parties, dated Jul. 5, 2022; 5 pages; European Patent Office.
R. M. Heck, et al., Catalytic Air Pollution Control, Commercial Technology, John Wiley & Sons 3rd Edition, 2009.
Japanese Patent Application No. 2021-536124, Office Action, dated Aug. 3, 2022, 10 pages (5 pages of English Translation and 5 pages of Original Copy); Japanese Patent Office.
International Search Report and Written Opinion of the International Searching Authority; PCT/CN2018/103807; Mailed May 30, 2019; 9 Pages; National Intellectual Property.
International Search Report and Written Opinion of the International Searching Authority; PCT/US19/49209; Mailed Feb. 28, 2020; 22 Pages; European Patent Office.
Hanft et al., "An overview of the aerosol deposition method process: fundamentals and new trends in materials applications", J. Ceram. Sci. Tech., vol. 6, No. 3, pp. 147-182.
Konstandopoulos et al., "Microstructural Properties of Soot Deposit in Diesel Particulate Traps", In SAE World Congress & Exhibition, 2002, 11 pages.
Tandon et al., "Measurement and prediction of filtration efficiency evolution of soot loaded diesel particulate filters", Chemical Engineering Science vol. 65, Issue 16, Aug. 15, 2010, pp. 4751-4760.

* cited by examiner

400 ↘

405 — Mixture Preparation

410 — Atomizing to form droplets

415 — Intermixing droplets and gaseous carrier stream

420 — Evaporation to form agglomerates

425 — Material Deposition

430 — Post-Treatment

- 1405 Aqueous or Alcohol Suspension Preparation
- 1410 Atomizing to form droplets
- 1415 Intermixing droplets and gaseous carrier stream
- 1420 Evaporation to form agglomerates
- 1425 Material Deposition
- 1430 Off-Line Curing

FIG. 11

```
Solution Preparation
        ↓
     Atomizing
        ↓
  Aggregate Drying
        ↓
 Material Deposition
        ↓
    Binder Curing
```

FIG. 30

METHODS OF MAKING HONEYCOMB BODIES HAVING INORGANIC FILTRATION DEPOSITS

This is a national stage application under 35 U.S.C. § 371 of International Application No. PCT/US2019/049209, filed on Aug. 30, 2019, which claims the benefit of priority under 35 U.S.C. § 119 of U.S. Provisional Application No. 62/726, 192 filed on Aug. 31, 2018, and to International Application No. PCT/CN2018/103807 filed on Sep. 3, 2018, the contents of which are incorporated herein by reference in their entireties.

BACKGROUND

Field

The present specification relates to methods of making porous bodies, such as porous ceramic honeycomb bodies, which comprise inorganic deposits, the deposits comprised of an inorganic filtration material.

Technical Background

Wall-flow filters are employed to remove particulates from fluid exhaust streams, such as from combustion engine exhaust. Examples include diesel particulate filters used to remove particulates from diesel engine exhaust gases and gasoline particulate filters (GPF) used to remove particulates from gasoline engine exhaust gases. Exhaust gas to be filtered enters inlet cells and passes through the cell walls to exit the filter via outlet channels, with the particulates being trapped on or within the inlet cell walls as the gas traverses and then exits the filter.

SUMMARY

Aspects of the disclosure pertain to porous bodies and methods for their manufacture and use.

In an aspect, a filtration article comprises: a honeycomb filter body; inorganic deposits disposed within the honeycomb filter body at a loading of less than or equal to 20 grams of the inorganic deposits per liter of the honeycomb filter body; and a clean filtration efficiency before being exposed to a water durability test of greater than or equal to 70% as measured by a clean filtration efficiency test, wherein the clean filtration efficiency of the filtration article after being exposed to the water durability test is greater than or equal to 80% of the clean filtration efficiency of the filtration article before the water durability test; and wherein the water durability test is selected from the group consisting of: a water soak test, a water immersion test, or a water nebulizer test.

In an aspect, a filtration article comprises: a honeycomb filter body comprised of a plurality of porous walls comprised of a first ceramic composition, wherein the honeycomb filter body exhibits a honeycomb filter body filtration efficiency as measured by a clean filtration efficiency test; inorganic deposits comprised of a second ceramic composition at a loading of less than or equal to 20 grams of the inorganic deposits per liter of honeycomb filter body; and a clean filtration efficiency as measured by a clean filtration efficiency test; wherein the clean filtration efficiency is greater than or equal to 110% of the honeycomb filter body filtration efficiency; wherein the clean filtration efficiency of the filtration article after being exposed to a water durability test is greater than or equal to 90% of the clean filtration efficiency of the filtration article before the water durability test; and wherein water durability test is selected from the group consisting of: a water soak test, a water immersion test, or a water nebulizer test.

In an aspect, a filtration article comprises: a honeycomb filter body comprised of: a plurality of intersecting porous walls comprised of surfaces which define a plurality of channels extending in a longitudinal direction from an inlet end to an outlet end, wherein the plurality of channels comprises inlet channels which are open at the inlet end and sealed at locations longitudinally spaced away from the inlet end, and outlet channels which are open at the outlet end and sealed at locations longitudinally spaced away from the outlet end, and inorganic deposits disposed on, or in, or both on and in, at least some of the walls, and a silicon-containing precursor binder, wherein the inorganic deposits are bound to each other, to the walls, or to both, by the silicon-containing precursor binder.

In an aspect, a filtration article comprises: a honeycomb filter body comprised of a plurality of intersecting porous walls comprised of surfaces which define a plurality of channels extending in a longitudinal direction from an inlet end to an outlet end, wherein the plurality of channels comprises inlet channels which are open at the inlet end and sealed at locations longitudinally spaced away from the inlet end, and outlet channels which are open at the outlet end and sealed at locations longitudinally spaced away from the outlet end; and inorganic deposits disposed on, or in, or both on and in, at least some of the walls; wherein the inorganic deposits are bound either to each other, to the walls, or both; wherein at least a portion of the inorganic deposits form a porous inorganic network over portions of the walls; and wherein a clean filtration efficiency of the filtration article is greater than or equal to 70% as measured by a clean filtration efficiency test.

In an aspect, a filtration article comprises: a honeycomb body comprised of a plurality of intersecting porous walls comprised of surfaces which define a plurality of channels extending from an inlet end to an outlet end, wherein the plurality of channels comprises inlet channels, which are sealed at locations spaced away from the inlet end, and outlet channels, which are sealed at locations spaced away from the outlet end; and inorganic deposits disposed on, or in, or both on and in, at least some of the walls defining the inlet channels; wherein a clean filtration efficiency of the filtration article is greater than or equal to 70% as measured by a clean filtration efficiency test; and wherein the filtration article is moisture resistant such that the clean filtration efficiency of the article does not change by more than 5% after being exposed to a water soak test; a water immersion test; a water nebulizer test; or combinations thereof.

In an aspect, a filtration article comprises: a honeycomb body comprised of a plurality of intersecting porous walls comprised of surfaces which define a plurality of channels extending from an inlet end to an outlet end, wherein the plurality of channels comprises inlet channels, which are sealed at locations spaced away from the inlet end, and outlet channels, which are sealed at locations spaced away from the outlet end; and inorganic deposits disposed on, or in, or both on and in, at least some of the walls defining the inlet channels; wherein the inorganic deposits are comprised of refractory inorganic nanoparticles bound by a high temperature binder comprising one or more inorganic components; wherein a clean filtration efficiency of the filtration article is greater than or equal to 70% as measured by a clean filtration efficiency test; and wherein the filtration article is moisture resistant such that the clean filtration efficiency of the article does not change by more than 5% after being exposed to a water soak test; a water immersion test; a water nebulizer test; or combinations thereof.

In an aspect, a filtration article comprises: a honeycomb body comprised of a plurality of intersecting porous walls comprised of surfaces which define a plurality of channels extending from an inlet end to an outlet end, wherein the plurality of channels comprises inlet channels, which are sealed at locations spaced away from the inlet end, and outlet channels, which are sealed at locations spaced away from the outlet end; and inorganic material disposed on, or in, or both on and in, at least some of the walls defining the inlet channels, wherein a clean filtration efficiency of the filtration article is greater than or equal to 70% as measured by a clean filtration efficiency test; and wherein the filtration article is moisture resistant such that the clean filtration efficiency of the article does not change by more than 5% after being exposed to a water soak test, a water immersion test, a water nebulizer test, or a combination thereof.

In an aspect, a filtration article comprises: a honeycomb body comprised of a plurality of intersecting porous walls comprised of surfaces which define a plurality of channels extending from an inlet end to an outlet end, wherein the plurality of channels comprises inlet channels, which are sealed at locations spaced away from the inlet end, and outlet channels, which are sealed at locations spaced away from the outlet end; and a porous inorganic network of refractory metal oxide nanoparticles disposed on, or in, or both on and in, at least some of the walls defining the inlet channels, wherein the refractory metal oxide nanoparticles are bound by a high temperature binder comprising one or more inorganic components, wherein a clean filtration efficiency of the filtration article is greater than or equal to 70% as measured by a clean filtration efficiency test; and wherein the filtration article is moisture resistant such that the clean filtration efficiency of the article does not change by more than 5% after being exposed to a water soak test; a water immersion test; a water nebulizer test; or combinations thereof.

In an aspect, a filtration article comprises: a honeycomb filter body comprising porous walls having pores; and inorganic deposits comprising inorganic material nanoparticles and a binder disposed within the honeycomb filter body; wherein the inorganic deposits comprise a network of aggregated agglomerates of the inorganic material nanoparticles and the binder, the binder comprising an alcohol-soluble binder.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 is a flowchart depicting an exemplary embodiment of a process of making material according to embodiments disclosed herein;

FIG. 11 is a flowchart depicting an exemplary embodiment of an aqueous-based process of forming material according to embodiments disclosed herein;

FIG. 30 is a flowchart showing an exemplary process flow according to a specific embodiment;

DETAILED DESCRIPTION

Figure 2:
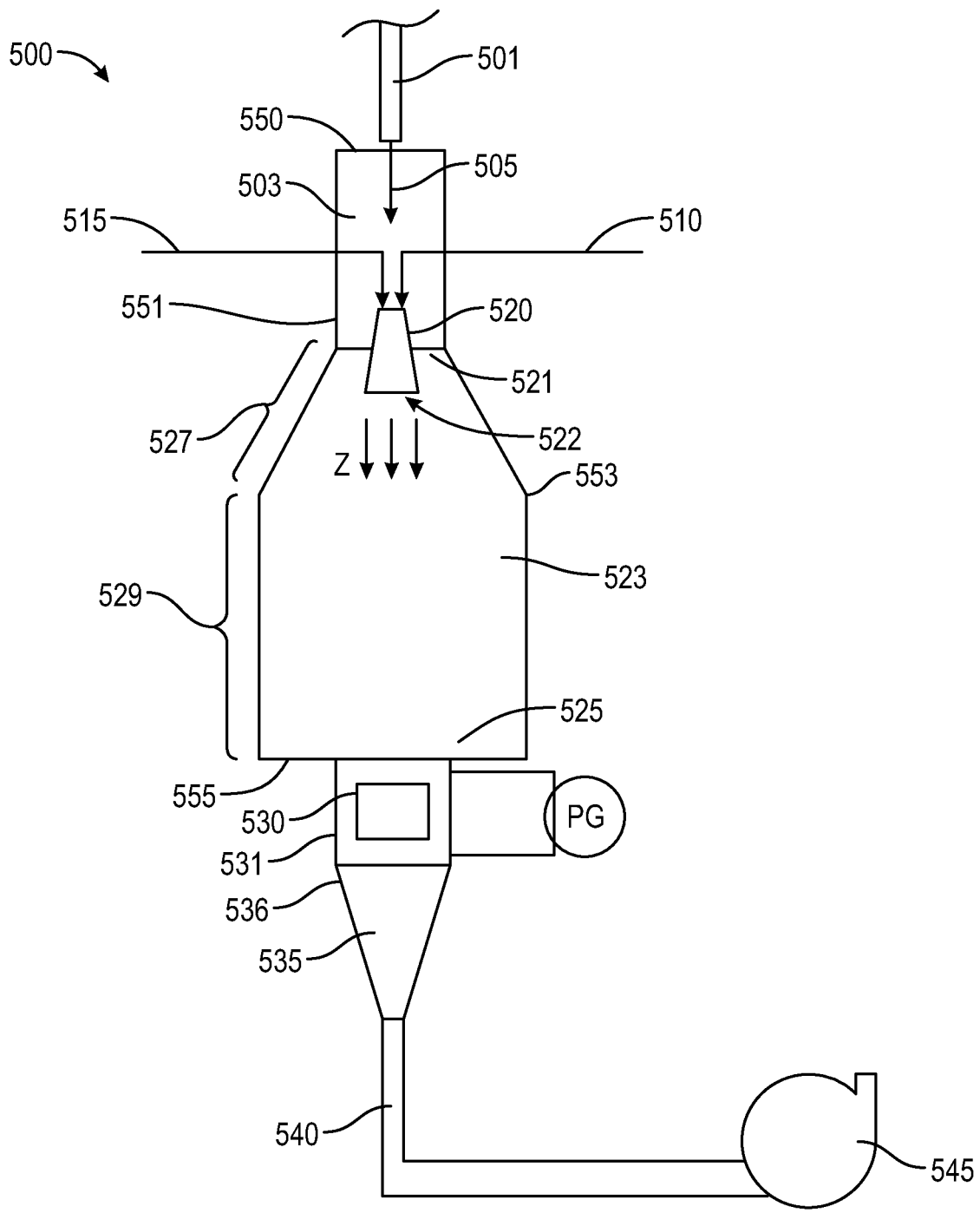
FIG. 2 schematically depicts an apparatus for depositing inorganic material according to embodiments disclosed herein.

Reference will now be made in detail to embodiments of methods for forming honeycomb bodies comprising a porous honeycomb body comprising inorganic deposits (or "filtration deposits") on, or in, or both on and in, the porous ceramic walls of the honeycomb body matrix, embodiments of which are illustrated in the accompanying drawings. Filtration deposits comprise material that was deposited into the honeycomb body, as well as compounds that may be formed, for example, by heating, from one or materials that were originally deposited. For example, a binder material may be transformed by heating into an organic component which is eventually burned off or volatilized, while an inorganic component (such as silica) remains contained within the honeycomb filter body. Whenever possible, the same reference numerals will be used throughout the drawings to refer to the same or like parts.

Definitions

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A "honeycomb body," as referred to herein, comprises a ceramic honeycomb structure of a matrix of intersecting walls that form cells which define channels. The ceramic honeycomb structure can be formed, extruded, or molded from a plasticized ceramic or ceramic-forming batch mixture or paste. A honeycomb body may comprise an outer peripheral wall, or skin, which was either extruded along with the matrix of walls or applied after the extrusion of the matrix. For example, a honeycomb body can be a plugged ceramic honeycomb structure which forms a filter body comprised of cordierite or other suitable ceramic material. A plugged honeycomb body has one or more channels plugged at one, or both ends of the body.

A honeycomb body disclosed herein comprises a ceramic honeycomb structure comprising at least one wall carrying one or more filtration material deposits which is configured to filter particulate matter from a gas stream. The filtration material deposits can be in discrete regions or in some portions or some embodiments can make one or more layers of filtration material at a given location on the wall of the honeycomb body. The filtration material deposits preferably comprise inorganic material, in some embodiments organic material, and in some embodiments both inorganic material and organic material. For example, a honeycomb body may, in one or more embodiments, be formed from cordierite or other porous ceramic material and further comprise inorganic material deposits disposed on or below wall surfaces of the cordierite honeycomb structure.

In some embodiments, the filtration material comprises one or more inorganic materials, such as one or more ceramic or refractory materials.

As used herein, "green" or "green ceramic" are used interchangeably and refer to an unsintered or unfired material, unless otherwise specified.

Methods

Aspects of the disclosure pertain to methods of forming porous bodies, such as porous ceramic honeycomb bodies, comprising a material such as a filtration material such as a inorganic material such as a ceramic or refractory material or even a porous ceramic or refractory material. In specific embodiments, the filtration material is an aerosol-deposited filtration material. In some preferred embodiments, the filtration material comprises a plurality of inorganic particle agglomerates, wherein the agglomerates are comprised of inorganic, such as ceramic or refractory, material. In some embodiments, the agglomerates are porous, which may allow gas to flow through the agglomerates.

Aerosol deposition enables deposition of filtration material onto the porous ceramic walls, which can be discrete regions as small as a single agglomerate or larger such as a plurality of agglomerates, and in some embodiments is in the form of a porous layer of filtration material, on or in, or both on and in, at least some surfaces of the walls of the ceramic honeycomb body. In certain embodiments, an advantage of the aerosol deposition method according to one or more embodiments is that ceramic honeycomb bodies with enhanced filtration performance can be produced economically, and/or more efficiently.

In certain embodiments, an aerosol deposition process disclosed herein comprises: mixture preparation (e.g., inorganic material, liquid vehicle, and binder), atomizing the mixture with an atomizing gas with a nozzle to form agglomerates and/or aggregates, comprised of the inorganic material, the liquid vehicle, and the binder if any, drying the agglomerates and/or aggregates in the presence of a carrier gas or a gaseous carrier stream, depositing the aggregates and/or agglomerates onto the honeycomb bodies, and optionally curing the material. In some embodiments, walls of the apparatus can be heated to assist in drying the aggregates and/or agglomerates.

In various embodiments, the carrier gas can be heated in addition to, or rather than, heating walls of the apparatus, such that liquid vehicle can evaporate from the agglomerates faster, which in turn allows agglomerates to be generated more efficiently. A heated gaseous carrier stream carries both the atomized droplets and the agglomerates created through the apparatus and into the honeycomb body. In some embodiments, atomizing gas is heated, alone or in combination with heating the carrier gas. In some embodiments, co-flowing the aerosolized droplets and/or agglomerates and the gaseous carrier stream in substantially the same direction into a chamber of an apparatus may help to reduce material loss or overspray on walls of the apparatus. Furthermore, a convergent section can be added to the apparatus before the agglomerates enter the ceramic honeycomb body in order to help the gas flow and particle tracking to be more uniform across the apparatus. An inner diameter of the end of the convergent section can be slightly larger than an outer diameter of the ceramic honeycomb body outer diameter in order to reduce or eliminate boundary effects of non-uniform particle deposition.

In an atomizing nozzle, or atomizer, high pressure and/or high speed atomizing gas can be used to break-up the suspension, which contains a mixture of liquid vehicle, binder, and solid particles, into small liquid droplets, for example with average droplet size of 4-6 micrometers. Heating of these liquid droplets and quick evaporation of the liquid vehicle creates porous inorganic agglomerates before depositing on the honeycomb body walls as a porous inorganic feature or structure. In some embodiments more than one nozzle is utilized, even in some cases under the same operating conditions, such that the liquid flow through each nozzle is reduced and droplet sizes can be smaller.

According to one or more embodiments, a process is disclosed herein comprising forming an aerosol with a binder, which is deposited on a honeycomb body to provide a high filtration efficiency material, which may be present in discrete regions and/or in some portions or some embodiments in an inorganic layer, on the honeycomb body to provide a particulate filter. According to one or more embodiments, the performance is >90% filtration efficiency with a <10% pressure drop penalty compared to the bare filter. According to one or more embodiments, as shown in FIG. 1, the process 400 comprises the steps of mixture preparation 405, atomizing to form droplets 410, intermixing droplets and a gaseous carrier stream 415; evaporating liquid vehicle to form agglomerates 420, depositing of material, e.g., agglomerates, on the walls of a wall-flow filter 425, and optional post-treatment 430 to, for example, bind the material on, or in, or both on and in, the porous walls of the honeycomb body. Aerosol deposition methods form of agglomerates comprising a binder can provide a high mechanical integrity even without any high temperature curing steps (e.g., heating to temperatures in excess of 1000° C.), and in some embodiments even higher mechanical integrity after a curing step such as a high temperature (e.g., heating to temperatures in excess of 1000° C.) curing step. In the process in FIG. 1, the aerosol deposition forms inorganic material deposits, which in some specific embodiments are porous material deposits. In some embodiments, the material deposits are in the form of discrete regions of filtration material. In some embodiments, at least some portions of the material deposits may be in the form of a porous inorganic layer.

In various embodiments, the process further includes part-switching such that depositing of agglomerates onto the porous walls of a plugged honeycomb body is conducted semi-continuously or continuously, which reduces idle time of the equipment. In one or more embodiments, the part-switching is timed so that deposition is essentially continuous into and/or onto a plurality of ceramic honeycomb bodies. Reference to continuous means that the operating equipment is maintained under operating temperatures and pressures and raw material supply flow, and that the flow of the gaseous carrier stream and agglomerates into a part such as a wall-flow filter is interrupted only to switch out a loaded part for an unloaded part. Semi-continuous allows also for minor interruptions to the raw material supply flow and adjustments to operating temperatures and pressures. In one or more embodiments, semi-continuous flow means that flow is interrupted for greater than or equal to 0.1% to less than or equal to 5% of an operating duration, including greater than or equal to 0.5%, greater than or equal to 1%, greater than or equal to 1.5%, greater than or equal to 2%, greater than or equal to 2.5%, and/or less than or equal to 4.5%, less than or equal to 4%, less than or equal to 3.5%, less than or equal to 3%. In one or more embodiments, flow is continuous for greater than or equal to 95% to less than or equal to 100% of an operating duration, including greater than or equal to 96%, greater than or equal to 97%, greater than or equal to 98%, greater than or equal to 99%, greater than or equal to 99.5%, and/or less than or equal to 99.9%, less than or equal to 99%, less than or equal to 98%, less than or equal to 97%.

Mixture preparation 405. Commercially available inorganic particles can be used as a raw material in a mixture in the formation of an inorganic material for depositing. According to one or more embodiments, the particles are selected from $Al_2O_3$, $SiO_2$, $TiO_2$, $CeO_2$, $ZrO_2$, SiC, MgO and combinations thereof. In one or more embodiments, the mixture is a suspension. The particles may be supplied as a raw material suspended in a liquid vehicle to which a further liquid vehicle is optionally added.

In some embodiments, the liquid vehicle is an alcohol (e.g. ethanol). In other embodiments, the liquid is water. Thus in some embodiments the mixture is aqueous-based; for example, a liquid vehicle of the suspension may be water. In other embodiments, the mixture is organic-based; for example, a liquid vehicle of the mixture may be an alcohol, such as ethanol or methanol or combinations thereof. In one or more embodiments, the liquid vehicle has a vapor pressure that is greater than the vapor pressure of water at the temperature of the gaseous carrier stream. In one or more embodiments, the liquid vehicle consists essentially of a material having a boiling point below the boiling point of water at the temperature of the gaseous carrier stream. In one or more embodiments, the liquid vehicle is an alcohol. In one or more embodiments, the liquid vehicle is methoxyethanol, ethanol, xylene, methanol, ethylacetate, benzene, or mixtures thereof. In one or more embodiments, the liquid vehicle is alcohol. In one or more embodiments, the liquid vehicle consists essentially of water.

In some embodiments, the suspension comprises by weight: 5-20% particles and 80-95% liquid, and all values and subranges therebetween. In an embodiment, the suspension comprises by weight: 11 percent±1% alumina and 89 percent±1% ethanol.

In one or more embodiments, the particles have an average primary particle size in a range of from about 10 nm to 4 about μmμm, about 20 nm to about 3 μm or from about 50 nm to about 2 μm, or from about 50 nm to about 900 nm or from about 50 nm to about 600 nm. In specific embodiments, the average primary particle size is in a range of from about 100 nm to about 200 nm, for example, 150 nm. The average primary particle size can be determined as a calculated value from the BET surface area of the aerosol particles, which in some embodiments is 10 $m^2$/g currently.

In one or more embodiments, the primary particles comprise a ceramic particle, such as an oxide particle, for example $Al_2O_3$, $SiO_2$, MgO, $CeO_2$, $ZrO_2$, CaO, $TiO_2$, cordierite, mullite, SiC, aluminum titanate, and mixture thereof.

The mixture is formed using a solvent which is added to dilute the suspension if needed. Decreasing the solids content in the mixture could reduce the aggregate size proportionally if the droplet generated by atomizing has similar size. The solvent should be miscible with suspension mentioned above, and be a solvent for binder and other ingredients.

Binder is optionally added to reinforce the agglomerates and to preferably provide a stickiness or tackiness, and can comprise inorganic binder, to provide mechanical integrity to deposited material. The binder can provide binding strength between particles at elevated temperature (>500° C.). The starting material can be organic. After exposure to high temperature in excess of about 150° C., the organic starting material will decompose or react with moisture and oxygen in the air, and the final deposited material composition could comprise $Al_2O_3$, $SiO_2$, MgO, $CeO_2$, $ZrO_2$, CaO, $TiO_2$, cordierite, mullite, SiC, aluminum titanate, and mixture thereof. One example of a suitable binder is Dowsil® US-CF-2405 and Dowsil™ US-CF-2403, both available from The Dow Chemical Company. An exemplary binder content is in the range of greater than or equal to 5% by weight to less than or equal to 25% by weight of the particle content. In an embodiment, the binder content is 15 to 20% by weight ±1%.

Catalyst can be added to accelerate the cure reaction of binder. An exemplary catalyst used to accelerate the cure reaction of Dowsil™ US-CF-2405 is titanium butoxide. An exemplary catalyst content is 1% by weight of the binder.

Stirring of the mixture or suspension during storage and/or awaiting delivery to the nozzle may be conducted by using desired stirring techniques. In one or more embodiments, stirring is conducted by a mechanical stirrer. In an embodiment, the use of a mechanical stirrer facilitates reduction and/or elimination of potential contaminations from plastic-coated mixing rods, which are in contact with a holding vessel, used in magnetic stirring systems.

Atomizing to form droplets 410. The mixture is atomized into fine droplets by high pressure gas through a nozzle. One example of the nozzle is ¼J-SS+SU11-SS from Spraying Systems Co. This setup is comprised of a nozzle body along with fluid cap 2050 and air cap 67147. The atomizing gas can contribute to breaking up the liquid-particulate-binder stream into the droplets.

In one or more embodiments, the nozzle herein is a nozzle that utilizes internal mixing, for example, internal mixing nozzles the part numbers are given above. In one or more embodiments, the nozzle herein is a nozzle that utilizes external mixing, for example, Spraying Systems external mix nozzle setup: ¼J-SS+SU1A which is made up of a 64 aircap and a 1650 fluid cap. Another useful setup consists of a 64 aircap and a 1250 fluid cap. External mix nozzles can be advantageous to allow for smaller particle sizes with tighter particle size distribution which improves material utilization and filtration efficiency. External mix nozzles tend to clog less often as compared to internal mix nozzles. In one or more embodiments, the nozzles herein are converging nozzles. As used herein, converging nozzles refer to nozzles having fluid flow passages whose cross-sectional areas decrease from inlet to outlet thereby accelerating flow of the fluids. Converging nozzles may be internally mixed or externally mixed.

In one or more embodiments, the liquid-particulate-binder droplets are directed into the chamber by a nozzle.

In one or more embodiments, the liquid-particulate-binder droplets are directed into the chamber by a plurality of nozzles. In one or more embodiments, atomizing the plurality of liquid-particulate-binder streams occurs with a plurality of atomizing nozzles. The plurality of nozzles may include 2 or more nozzles, 3 or more, 4 or more, 5 or more, 6 or more, 7 or more, 8 or more, 9 or more, 10 or more, and the like. The plurality of nozzles may be evenly spaced within the chamber. In one or more embodiments, each of the plurality of nozzles is angled toward a center of the apparatus. The angle of the nozzles may be acute, ranging from less than 90° to greater than 10° relative to a side wall of the apparatus, and all values and subranges therebetween, including 20° to 45°.

The pressure of the atomizing gas may be in the range of 20 psi to 150 psi. The pressure of the liquid may be in the range of 1 to 100 psi. The average droplet size according to one or more embodiments may be in the range of from 1 μm to 40 μm, including for example, in a range of greater than or equal to 1 μm to less than or equal to 15 μm; greater than or equal to 2 μm to less than or equal to 8 μm; greater than or equal to 4 μm to less than or equal to 8 μm; and greater than or equal to 4 μm to less than or equal to 6 μm; and all values and subranges therebetween. The droplet size can be adjusted by adjusting the surface tension of the mixture, viscosity of the mixture, density of the mixture, gas flow rate, gas pressure, liquid flow rate, liquid pressure, and nozzle design. In one or more embodiments, the atomizing gas comprises nitrogen. In one or more embodiments, the atomizing gas may consist essentially of an inert gas. In one or more embodiments, the atomizing gas may is predominantly one or more inert gases. In one or more embodiments, the atomizing gas may is predominantly nitrogen gas. In one or more embodiments, the atomizing gas may is predominantly air. In one or more embodiments, the atomizing gas may consist essentially of nitrogen or air. In one or more embodiments, the atomizing gas may be dry. In one or more embodiments, the atomizing gas may comprise essentially no liquid vehicle upon entry to the chamber.

In some embodiments, the suspension flow rate is in the range of 10 to 25 g/minute, including all values and subranges therebetween, including 18 g/min.

In some embodiments, the atomizing gas flow rate nitrogen flow rate is in the range of 2 to 10 $Nm^3/hr$, including all values and subranges therebetween, including 5-6 $Nm^3/hr$.

Suspension flow and corresponding agglomerate size may be controlled by a pressure control system or a flow control system, as appropriate to the apparatus. For a pressure control system, a pressure controller is in communication with a delivery conduit such as tubing or piping and a suspension of primary particles in a liquid is introduced into the delivery conduit, which is then flowed to the nozzle. For a flow control system, an injector pump is provided, which delivers the suspension of primary particles in a liquid to the nozzle. Atomizing gas is typically separately supplied to the nozzle. In a preferred embodiment, a pump directs the liquid-particulate-binder mixture to the atomizing nozzle at a substantially constant flow rate. A constant flow rate can be advantageous as opposed to maintaining a constant pressure because the constant flow rate can help reduce variability in the particle sizes which, in turn, improves material utilization.

In one or more embodiments, the suspension comprises an inorganic material, a liquid vehicle, and in some embodiments, a binder, which is supplied to the nozzle as a liquid-particulate-binder stream. That is, particles of an inorganic material can be mixed with a liquid vehicle and a binder material to form a liquid-particulate-binder stream. The liquid-particulate-binder stream is atomized with the atomizing gas into liquid-particulate-binder droplets by the nozzle. In one or more embodiments, the liquid-particulate-binder stream is mixed with the atomizing gas. In one or more embodiments, the liquid-particulate-binder stream is directed into the atomizing nozzle thereby atomizing the particles into liquid-particulate-binder droplets. The liquid-particulate-binder droplets are comprised of the liquid vehicle, the binder material, and the particles.

In one or more embodiments, the liquid-particulate-binder stream mixes with the atomizing gas via the atomizing nozzle. In one or more embodiments, the liquid-particulate-binder stream enters the atomizing nozzle. In one or more embodiments, the mixing of the liquid-particulate-binder stream with the atomizing gas occurs inside the atomizing nozzle. In one or more embodiments, the mixing of the liquid-particulate-binder stream with the atomizing gas occurs outside the atomizing nozzle.

Intermixing droplets and gaseous carrier stream 415. The droplets are conveyed toward the honeycomb body by a gaseous carrier stream. In one or more embodiments, the gaseous carrier stream comprises a carrier gas and the atomizing gas. In one or more embodiments, at least a portion of the carrier gas contacts the atomizing nozzle. In one or more embodiments, substantially all of the liquid vehicle is evaporated from the droplets to form agglomerates comprised of the particles and the binder material.

In one or more embodiments, the gaseous carrier stream is heated prior to being mixed with the droplets. In one or more embodiments, the gaseous carrier stream is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween. Operationally, temperature can be chosen to at least evaporate solvent of the mixture or suspension so long as the final temperature is above the dew point. As non-limiting example, ethanol can be evaporated at a low temperature. Without being held to theory, it is believed that an advantage of a higher temperature is that the droplets evaporate faster and when the liquid is largely evaporated, they are less likely to stick when they collide. In certain embodiments, smaller agglomerates contribute to better filtration material deposits formation. Furthermore, it is believed that if droplets collide but contain only a small amount of liquid (such as only internally), the droplets may not coalesce to a spherical shape. In some embodiments, non-spherical agglomerates may provide desirable filtration performance.

In one or more embodiments, the atomizing gas is heated to form a heated atomizing gas, which is then flowed through and/or contacted with the nozzle. In one or more embodiments, the heated atomizing gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

In one or more embodiments, both the carrier gas and the atomizing gas are independently heated and contacted with the nozzle. In one or more embodiments, the gaseous steam is heated, but the atomizing gas and the nozzle are maintained at a low temperature (approximately equal to room temperature, e.g., 25-40° C.). In one or more embodiments, the atomizing nozzle is cooled during the atomizing. In one or more embodiments, a temperature of the atomizing nozzle is maintained below a boiling point of the liquid vehicle.

The carrier gas is supplied to the apparatus to facilitate drying and carrying the liquid-particulate-binder droplets and resulting agglomerates through the apparatus and into the honeycomb body. In one or more embodiments, the carrier gas is predominantly an inert gas, such as nitrogen, which is especially advantageous for alcohol-based liquid vehicle and droplets. In one or more embodiments, the carrier gas consists essentially of an inert gas. In one or more embodiments, the carrier gas is predominantly one or more inert gases. In one or more embodiments, the carrier gas is predominantly nitrogen gas. In one or more embodiments, the carrier gas is predominantly air. In one or more embodiments, the carrier gas consists essentially of nitrogen or air. In one or more embodiments, the carrier gas is dry. In one or more embodiments, the carrier gas comprises essentially no liquid vehicle upon entry to the chamber. In one or more embodiments, the carrier gas comprises less than 5 weight percent water vapor. In one or more embodiments, the carrier gas is heated prior to being mixed with the droplets. In one or more embodiments, the carrier gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

In one or more embodiments, the atomizing gas and the carrier gas are independently delivered to the apparatus at a pressure of greater than or equal to 90 psi, including greater than or equal to 95 psi, greater than or equal to 100 psi, greater than or equal to 105 psi, greater than or equal to 100 psi, greater than or equal to 115 psi, or greater than or equal to 120 psi. In one or more embodiments, a booster provides the atomizing gas and the carrier gas at a desired pressure.

The apparatus can comprise a diffusing area downstream of the nozzle. At least some of the intermixing of the gaseous carrier stream with the liquid-particulate-binder droplets occurs in the diffusing area.

Upon intermixing of the gaseous carrier stream with the liquid-particulate-binder droplets inside the chamber, a gas-liquid-particulate-binder mixture is formed. The gas-liquid-particulate-binder mixture is heated at the intermixing zone. In one or more embodiments, droplets of liquid containing particles and binder are present during the intermixing. In one or more embodiments, the gaseous carrier stream is heated prior to intermixing with the liquid-particulate-binder droplets.

In an embodiment, the carrier gas is delivered to the chamber in an annular co-flow surrounding the nozzle. In an embodiment, the carrier gas is delivered to a chamber of the duct in an annular flow surrounding the nozzle in a co-flow around the droplets at the end of the nozzle.

Evaporation to Form Agglomerates 420. To avoid liquid capillary force impact which may form non-uniform material which may result in high pressure drop penalty, the droplets are dried in an evaporation section of the apparatus, forming dry solid agglomerates, which may be referred to as secondary particles, or "microparticles" which are made up of primary nanoparticles and binder-type material. The liquid vehicle, or solvent, is evaporated and passes through the honeycomb body in a gaseous or vapor phase so that liquid solvent residual or condensation is minimized during material deposition. When the agglomerate is carried into the honeycomb body by gas flow, the residual liquid in the inorganic material should be less than 10 wt %. All liquid is preferably evaporated as a result of the drying and are converted into a gas or vapor phase. The liquid residual could include solvent in the mixture (such as ethanol in the examples), or water condensed from the gas phase. Binder is not considered as liquid residual, even if some or all of the binder may be in liquid or otherwise non-solid state before cure. In one or more embodiments, a total volumetric flow through the chamber is greater than or equal to 5 $Nm^3$/hour and/or less than or equal to 200 $Nm^3$/hour; including greater than or equal to 20 $Nm^3$/hour and/or less than or equal to 100 $Nm^3$/hour; and all values and subranges therebetween. Higher flow rates can deposit more material than lower flow rates. Higher flow rates can be useful as larger cross-sectional area filters are to be produced. Larger cross-sectional area filters may have applications in filter systems for building or outdoor filtration systems.

In one or more embodiments, substantially all of the liquid vehicle is evaporated from the droplets to form agglomerates of the particles and the binder material, the agglomerates being interspersed in the gaseous carrier stream. In one or more embodiments, the apparatus has an evaporation section having an axial length which is sufficient to allow evaporation of at least a portion of the liquid vehicle, including a substantial portion and/or all of the liquid vehicle from the agglomerates.

Regarding flow, in an embodiment, a path of the droplets and a path of the gaseous carrier stream are substantially perpendicular prior to entering the evaporation section. In one or more embodiments, the carrier gas contacts the atomizing nozzle by way of a first path, and wherein a path of the droplets and a second path of the carrier gas are substantially perpendicular to each other prior to entering the evaporation section of the duct.

In another embodiment, a path of the droplets and a path of the gaseous carrier stream are substantially parallel upon entering the evaporation section. In one or more embodiments, a path of the droplets and a path of the gaseous carrier stream are substantially parallel to each other upon entering the evaporation section of the duct. In one or more embodiments, a path of the droplets and a path of the carrier gas are substantially parallel to each other upon entering an evaporation section of the duct.

In an embodiment, the gaseous carrier stream exits the chamber in a direction substantially parallel to gravity. In an embodiment, the gaseous carrier stream exits the chamber in a substantially downward direction. In an embodiment, the gaseous carrier stream exits the chamber in a substantially upward direction.

Deposition in honeycomb body 425. The secondary particles or agglomerates of the primary particles are carried in gas flow, and the secondary particles or agglomerates, and/or aggregates thereof, are deposited on inlet wall surfaces of the honeycomb body when the gas passes through the honeycomb body. In one or more embodiments, the agglomerates and/or aggregates thereof are deposited onto the porous walls of the plugged honeycomb body. The deposited agglomerates may be disposed on, or in, or both on and in, the porous walls. In one or more embodiments, the plugged honeycomb body comprises inlet channels which are plugged at a distal end of the honeycomb body, and outlet channels which are plugged at a proximal end of the honeycomb body. In one or more embodiments, the agglomerates and/or aggregates thereof are deposited on, or in, or both on and in, the walls defining the inlet channels.

The flow can be driven by a fan, a blower or a vacuum pump. Additional air can be drawn into the system to achieve a desired flow rate. A desired flow rate is in the range of 5 to 200 $m^3$/hr.

One exemplary honeycomb body is suitable for use as a gasoline particular filter (GPF), and has the following non-limiting characteristics: diameter of 4.055 inches (10.3 cm), length of 5.47 inches (13.9 cm), cells per square inch (CPSI) of 200, wall thickness of 8 mils (203 μm), and average pore size of 14 μm.

In one or more embodiments, the average diameter of the secondary particles or agglomerates is in a range of from 300 nm to 10 μm, 300 nm to 8 μm, 300 nm to 7 μm, 300 nm to 6 μm, 300 nm to 5 μm, 300 nm to 4 μm, or 300 nm to 3 μm.

In specific embodiments, the average diameter of the secondary particles or agglomerates is in the range of 1.5 µm to 3 µm, including about 2 µm. The average diameter of the secondary particles or agglomerates can be measured by a scanning electron microscope.

In one or more embodiments, the average diameter of the secondary particles or agglomerates is in a range of from 300 nm to 10 µm, 300 nm to 8 µm, 300 nm to 7 µm, 300 nm to 6 µm, 300 nm to 5 µm, 300 nm to 4 µm, or 300 nm to 3 µm, including the range of 1.5 µm to 3 µm, and including about 2 µm, and there is a ratio in the average diameter of the secondary particles or agglomerates to the average diameter of the primary particles of in range of from about 2:1 to about 67:1; about 2:1 to about 9:1; about 2:1 to about 8:1; about 2:1 to about 7:1; about 2:1 to about 6:1; about 2:1 to about 5:1; about 3:1 to about 10:1; about 3:1 to about 9:1; about 3:1 to about 8:1; about 3:1 to about 7:1; about 3:1 to about 6:1; about 3:1 to about 5:1; about 4:1 to about 10:1; about 4:1 to about 9:1; about 4:1 to about 8:1; about 4:1 to about 7:1; about 4:1 to about 6:1; about 4:1 to about 5:1; about 5:1 to about 10:1; about 5:1 to about 9:1; about 5:1 to about 8:1; about 5:1 to about 7:1; or about 5:1 to about 6:1, and including about 10:1 to about 20:1.

In one or more embodiments, the depositing of the agglomerates onto the porous walls further comprises passing the gaseous carrier stream through the porous walls of the honeycomb body, wherein the walls of the honeycomb body filter out at least some of the agglomerates by trapping the filtered agglomerates on or in the walls of the honeycomb body. In one or more embodiments, the depositing of the agglomerates onto the porous walls comprises filtering the agglomerates from the gaseous carrier stream with the porous walls of the plugged honeycomb body.

Post-Treatment 430. A post-treatment may optionally be used to adhere the agglomerates to the honeycomb body, and/or to each other. That is, in one or more embodiments, at least some of the agglomerates adhere to the porous walls. In one or more embodiments, the post-treatment comprises heating and/or curing the binder when present according to one or more embodiments. In one or more embodiments, the binder material causes the agglomerates to adhere or stick to the walls of the honeycomb body. In one or more embodiments, the binder material tackifies the agglomerates.

Depending on the binder composition, the curing conditions are varied. According to some embodiments, a low temperature cure reaction is utilized, for example, at a temperature of ≤100° C. In some embodiments, the curing can be completed in the vehicle exhaust gas with a temperature ≤950° C. A calcination treatment is optional, which can be performed at a temperature ≤650° C. Exemplary curing conditions are: a temperature range of from 40° C. to 200° C. for 10 minutes to 48 hours.

In one or more embodiments, the agglomerates and/or aggregates thereof are heated after being deposited on the honeycomb body. In one or more embodiments, the heating of the agglomerates causes an organic component of the binder material to be removed from the deposited agglomerates. In one or more embodiments, the heating of the agglomerates causes an inorganic component of the binder material to physically bond the agglomerates to the walls of the honeycomb body. In one or more embodiments, the heating of the agglomerates causes an inorganic component of the binder to form a porous inorganic structure on the porous walls of the honeycomb body. In one or more embodiments, the heating of the deposited agglomerates burns off or volatilizes an organic component of the binder material from the deposited agglomerates.

In an aspect, a method for applying a surface treatment to a plugged honeycomb body comprising porous walls comprises: mixing particles of an inorganic material with a liquid vehicle and a binder material to form a liquid-particulate-binder stream; mixing the liquid-particulate-binder stream with an atomizing gas, directing the liquid-particulate-binder stream into an atomizing nozzle thereby atomizing the particles into liquid-particulate-binder droplets comprised of the liquid vehicle, the binder material, and the particles; conveying the droplets toward the plugged honeycomb body by a gaseous carrier stream, wherein the gaseous carrier stream comprises a carrier gas and the atomizing gas; evaporating substantially all of the liquid vehicle from the droplets to form agglomerates comprised of the particles and the binder material; depositing the agglomerates onto the porous walls of the plugged honeycomb body; wherein the deposited agglomerates are disposed on, or in, or both on and in, the porous walls.

In another aspect, methods for forming a honeycomb body comprise: supplying a suspension to a nozzle that is in fluid communication with a duct comprising an evaporation section, the suspension comprising an inorganic material, a binder material, and a liquid vehicle; supplying a carrier gas to the duct; contacting the nozzle with the carrier gas; in the evaporation section, evaporating at least a portion of the liquid vehicle thereby forming agglomerates of the inorganic material; depositing the agglomerates on walls of the honeycomb body; and binding the inorganic material to the honeycomb body to form a porous inorganic material. The porous inorganic material may comprise primary particles and agglomerates of these primary particles.

A further aspect is: a method for applying an inorganic material to a plugged honeycomb body comprising porous walls, the method comprising: supplying a suspension comprising particles of the inorganic material and a liquid vehicle to a nozzle that is in fluid communication with a duct comprising an evaporation section; atomizing the suspension with an atomizing gas to form droplets; supplying a heated carrier gas; intermixing a gaseous carrier stream including the heated carrier gas with the droplets inside a chamber of the duct to form a gas-liquid-particulate-binder mixture; evaporating at least a portion of the liquid vehicle from the droplets to form agglomerates of the particles, the agglomerates being interspersed in the gaseous carrier stream; passing the agglomerates and the gaseous carrier stream into the plugged honeycomb body in fluid communication with the duct such that the gaseous carrier stream passes through porous walls of the plugged honeycomb body, and the walls of the plugged honeycomb body trap the agglomerates, wherein the agglomerates and/or aggregates thereof are deposited on or in the walls of the honeycomb body.

Apparatus

Examples of apparatuses that may used for processes to deposit inorganic material with binder on ceramic honeycomb bodies are shown in FIGS. 2-6. Generally, apparatuses suitable for methods herein include a duct that defines a chamber. The duct may have several sections defining differing spaces and chambers. In one or more embodiments, the droplets and the gaseous carrier stream are conveyed through a duct having an outlet end proximate a plugged honeycomb body. The duct may comprise a converging section for engaging a proximal end of the honeycomb body. A converging section is advantageous in that fluid convection flow is enhanced. The duct may be in sealed fluid communication with the plugged honeycomb body during the depositing step. In one or more embodiments, the duct is adiabatic, or essentially adiabatic. In some embodiments, the nozzle temperature is regulated to achieve favorable atomization.

In some embodiments, a round cross-section chamber can facilitate keeping agglomerates entrained in the gaseous carrier stream. In various embodiments, a round cross-sectional duct reduces and/or prevents recirculation regions or "dead-zones" that can be the result of, for example, corners being present.

In one or more embodiments, an average temperature of walls of the duct is less than a temperature of the gaseous carrier stream. In one or more embodiments, an average temperature of walls of the duct is greater than a temperature of the gaseous carrier stream.

In the following, Apparatuses A-D (FIGS. 2-3 and 5-6) schematically show co-flow where a path of the droplets and a path of the gaseous carrier stream are substantially parallel upon entering the evaporation section. Apparatus "T" (FIG. 4) shows the carrier gas contacting an atomizing nozzle by way of a first path, and wherein a path of the droplets and a second path of the carrier gas are substantially perpendicular to each other prior to entering the evaporation section of the duct.

FIG. 2 shows an apparatus 500, Apparatus "A", for forming honeycomb bodies, the apparatus 500 comprising a duct 551, a deposition zone 531, an exit zone 536, an exit conduit 540, and a flow driver 545.

The duct 551 spans from a first end 550 to a second end 555, defining a chamber of the duct comprising: a plenum space 503 at the first end 550 and an evaporation chamber 523 downstream of the plenum space 503. In one or more embodiments, the duct 551 is essentially adiabatic. That is, the duct 551 may have no external sources of heat. The evaporation chamber 523 is defined by an evaporation section 553 of the duct 551, which in this embodiment; comprises a first section of non-uniform diameter 527 and a second section of substantially uniform diameter 529. The evaporation section 553 comprises an inlet end 521 and an outlet end 525. The first section of non-uniform diameter 527 has a diameter that increases from the inlet end 521 toward the section of uniform diameter 529, which creates a diverging space for the flow to occupy.

A carrier gas is supplied to the duct 551 by a conduit 501, which may have a heat source to create a heated carrier gas 505. An atomizing gas 515 and a suspension 510 are separately supplied by individual delivery conduits such as tubing or piping to a nozzle 520, which is at the inlet end 521 of the evaporation section 553 and is in fluid communication with the duct 551, specifically in this embodiment with the evaporation chamber 523. The suspension 510 is atomized in the nozzle 520 with the atomizing gas 515. In one or more embodiments, the suspension 510 comprises an inorganic material, a liquid vehicle, and a binder, as defined herein, which as supplied to the nozzle is a liquid-particulate-binder stream. The liquid-particulate-binder stream is atomized with the atomizing gas 515 into liquid-particulate-binder droplets by the nozzle 520.

In one or more embodiments, the heated carrier gas 505 flows over the nozzle 520. The atomizing gas 515 can be heated to form a heated atomizing gas. Temperature of the nozzle may be regulated as desired.

Outlet flow from the nozzle 520 and flow of the heated carrier gas 505 are both in a "Z" direction as shown in FIG. 2. There may be a diffusing area 522 downstream of the nozzle where at least some intermixing occurs. In this embodiment, the diffusing area 522 is located in the evaporation chamber 523, but in other embodiments, the diffusing area 522 may be located in the plenum space 503 depending on the location of the nozzle.

The outlet flow of from the nozzle intermixes with the heated carrier gas 505, thereby forming a gas-liquid-particulate-binder mixture, which flows through the chamber of the duct 551. Specifically, the gas-liquid-particulate-binder mixture flows through the evaporation chamber 523 of the evaporation section 553 and into the deposition zone 531 at the outlet end 525 of the evaporation section 553. At the intermixing, the gas-liquid-particulate-binder mixture is heated inside the chamber by the heated carrier gas.

In this embodiment, the outlet flow of the nozzle and the heated carrier gas enter the evaporation chamber 523 of the evaporation section 553 from substantially the same direction. In the evaporation chamber 523, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 531 in fluid communication with the duct 551 houses a plugged ceramic honeycomb body 530, for example, a wall-flow particulate filter. The deposition zone 531 has an inner diameter that is larger than the outer diameter of the ceramic honeycomb body 530. To avoid leakage of the gases carrying the ceramic powders, the ceramic honeycomb body 530 is sealed to the inner diameter of deposition zone 531, a suitable seal is, for example, an inflatable "inner tube". A pressure gauge, labelled as "PG" measures the difference in the pressure upstream and downstream from the particulate filter.

The gas-liquid-particulate-binder mixture flows into the ceramic honeycomb body 530 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 530 is an exit zone 536 defining an exit chamber 535. The flow driver 545 is downstream from the ceramic honeycomb body 530, in fluid communication with the deposition zone 531 and the exit zone 536 by way of the exit conduit 540. Non-limiting examples of flow drivers are: fan, blower, and vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 500 is considered in a downward direction, for example, substantially parallel to the direction of gravity. In other embodiments, the apparatus is configured such that flow is directed in a substantially upward or vertical direction.

In FIG. 3, an apparatus 600, Apparatus "B", for forming honeycomb bodies is shown comprising a duct 651, a deposition zone 631, an exit zone 636, an exit conduit 640, and a flow driver 645.

The duct 651 spans from a first end 650 to a second end 655, defining a chamber of the duct comprising: a plenum space 603 at the first end 650 and an evaporation chamber 623 downstream of the plenum space 603. In one or more embodiments, the diameter of the duct 651 defining the plenum space 603 can be equal to the diameter of the evaporation section 653 of the duct 651 defining the evaporation chamber 623. In one or more embodiments, the duct 651 is essentially adiabatic. That is, the duct 651 may have no external sources of heat. The evaporation chamber 623, in this embodiment, comprises a single section of substantially uniform diameter 629. The evaporation section 653 comprises an inlet end 621 and an outlet end 625.

A carrier gas is supplied to the duct 651 by a conduit 601, which may have a heat source to create a heated carrier gas 605. An atomizing gas 615 and a suspension 610 are separately supplied by individual delivery conduits such as tubing or piping to a nozzle 620, which is at the inlet end 621 of the evaporation section 653 and is in fluid communication with the duct 651, specifically in this embodiment with the evaporation chamber 623. The suspension 610 is atomized in the nozzle 620 with the atomizing gas 615. In one or more embodiments, the suspension 610 comprises an inorganic material, a liquid vehicle, and a binder, as defined herein, which as supplied to the nozzle is a liquid-particulate-binder stream. The liquid-particulate-binder stream is atomized with the atomizing gas 615 into liquid-particulate-binder droplets by the nozzle 620.

In one or more embodiments, the heated carrier gas 605 flows over the nozzle 620. The atomizing gas 615 can be heated to form a heated atomizing gas. The temperature of the nozzle may be regulated as desired.

Figure 3:
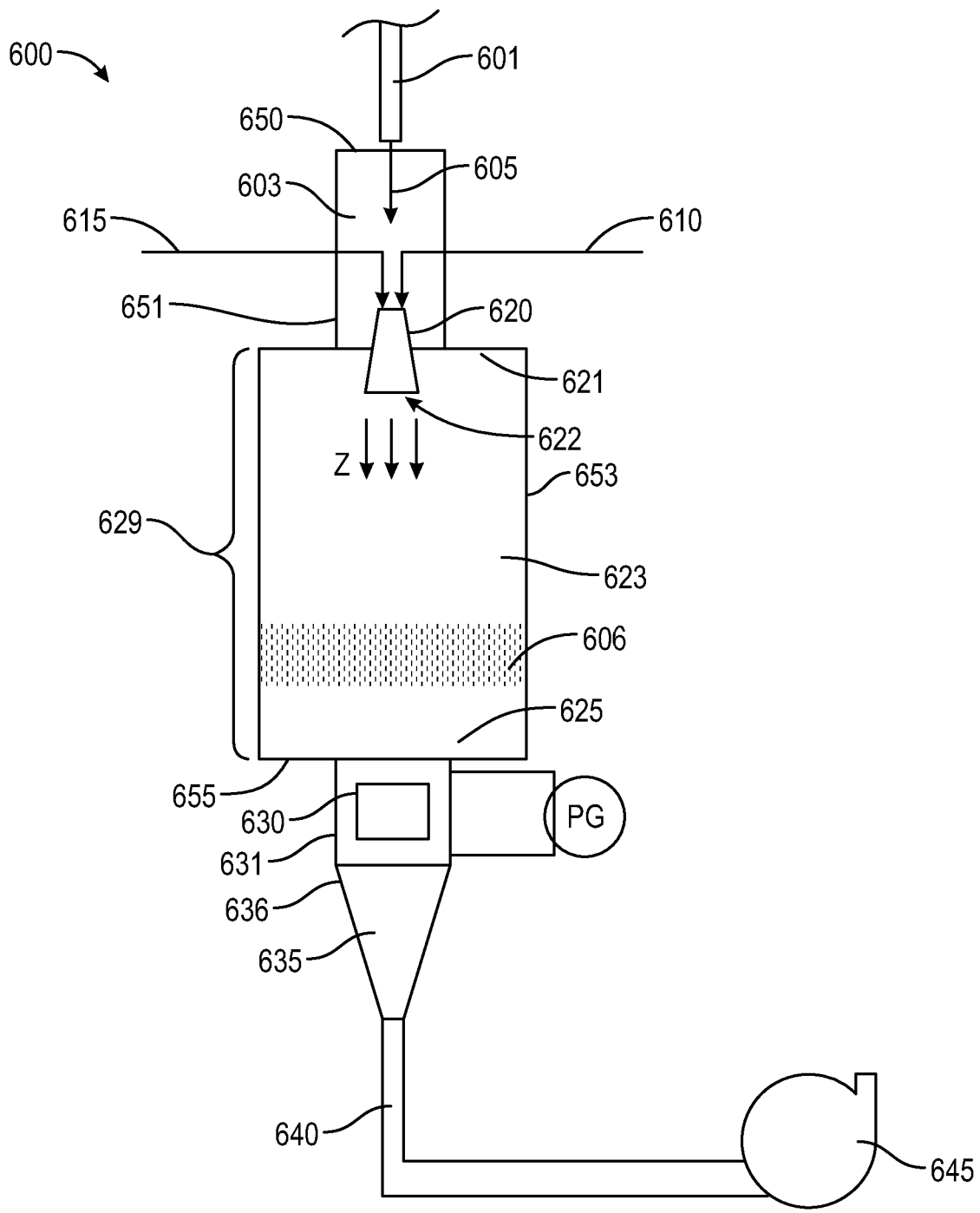
FIG. 3 schematically depicts an apparatus for depositing inorganic material according to embodiments disclosed herein.

Outlet flow from the nozzle 620 and flow of the heated carrier gas 605 are both in a "Z" direction as shown in FIG. 3. In specific embodiments, a diffusing area 622 is downstream of the nozzle where at least some intermixing occurs. In this embodiment, the diffusing area 622 is located in the evaporation chamber 623, but in other embodiments the diffusing area may be located in the plenum space 603 depending on the location of the nozzle.

The outlet flow from the nozzle intermixes with the heated carrier gas 605, thereby forming a gas-liquid-particulate-binder mixture, which flows through the chamber of the duct 651. Specifically, the gas-liquid-particulate-binder mixture flows through the evaporation chamber 623 of the evaporation section 653 and into the deposition zone 631 at the outlet end 625 of the evaporation section 653. At the intermixing, the gas-liquid-particulate-binder mixture is heated inside the chamber by the heated carrier gas.

In this embodiment, the outlet flow of the nozzle and the carrier gas enter the evaporation chamber 623 of the evaporation section 653 from substantially the same direction. In the evaporation chamber 623, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 631 in fluid communication with the duct 651 houses a plugged ceramic honeycomb body 630, for example, a wall-flow particulate filter. The deposition zone 631 has an inner diameter that is larger than the outer diameter of the ceramic honeycomb body 630. To avoid leakage of the gases carrying the ceramic powders, the ceramic honeycomb body 630 is sealed to the inner diameter of the deposition zone 631, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 630 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 630 is an exit zone 636 defining an exit chamber 635. The flow driver 645 is downstream from the ceramic honeycomb body 630, in fluid communication with the deposition zone 631 and the exit zone 636 by way of the exit conduit 640. Non-limiting examples of flow drivers are: fan, blower, and vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 600 is considered in a downward direction, for example, substantially parallel to the direction of gravity. In other embodiments, the apparatus is configured such that flow is directed in a substantially upward or vertical direction.

Figure 4:
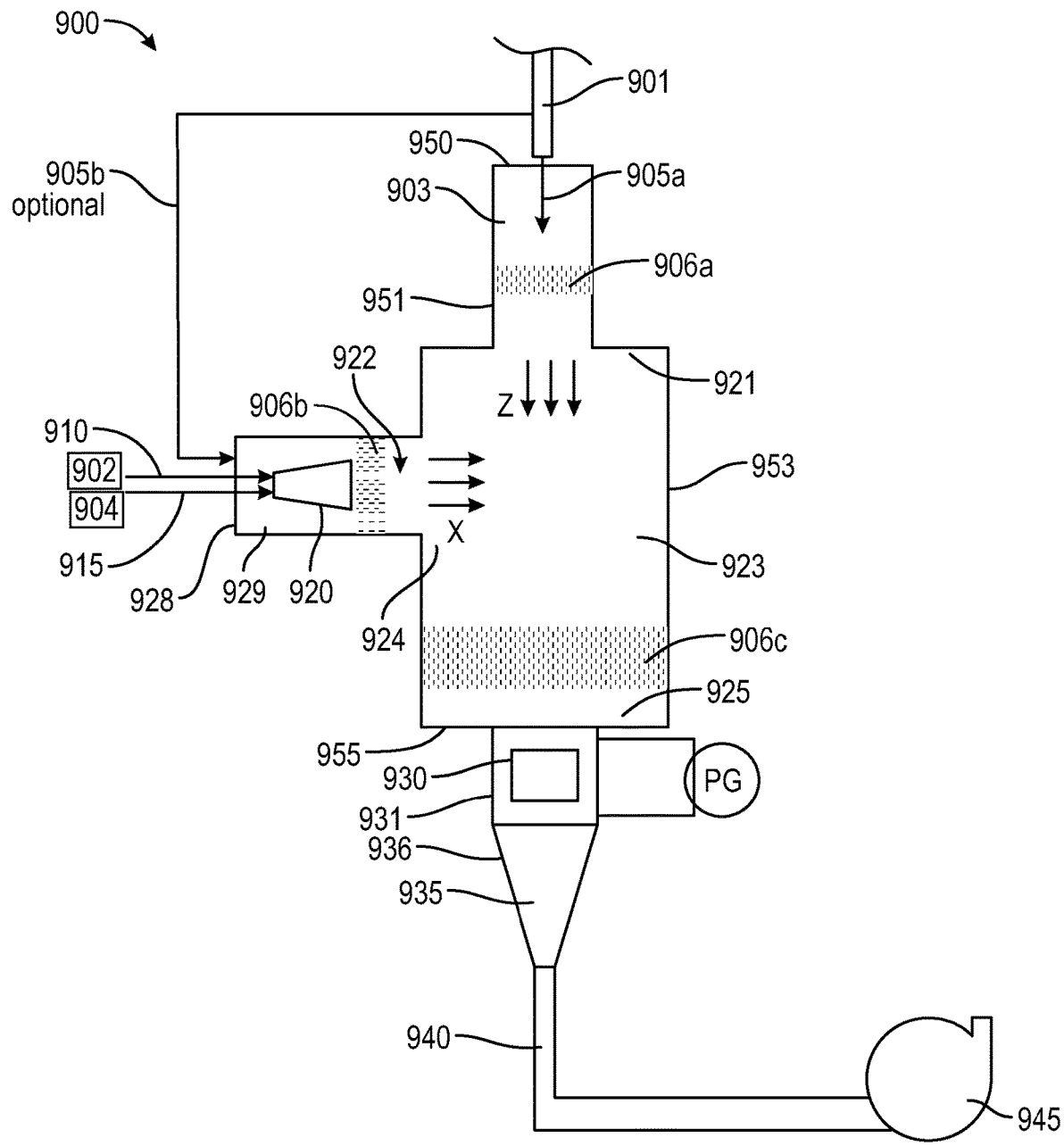
FIG. 4 schematically depicts an apparatus for depositing inorganic material according to embodiments disclosed herein.
Figure 5:
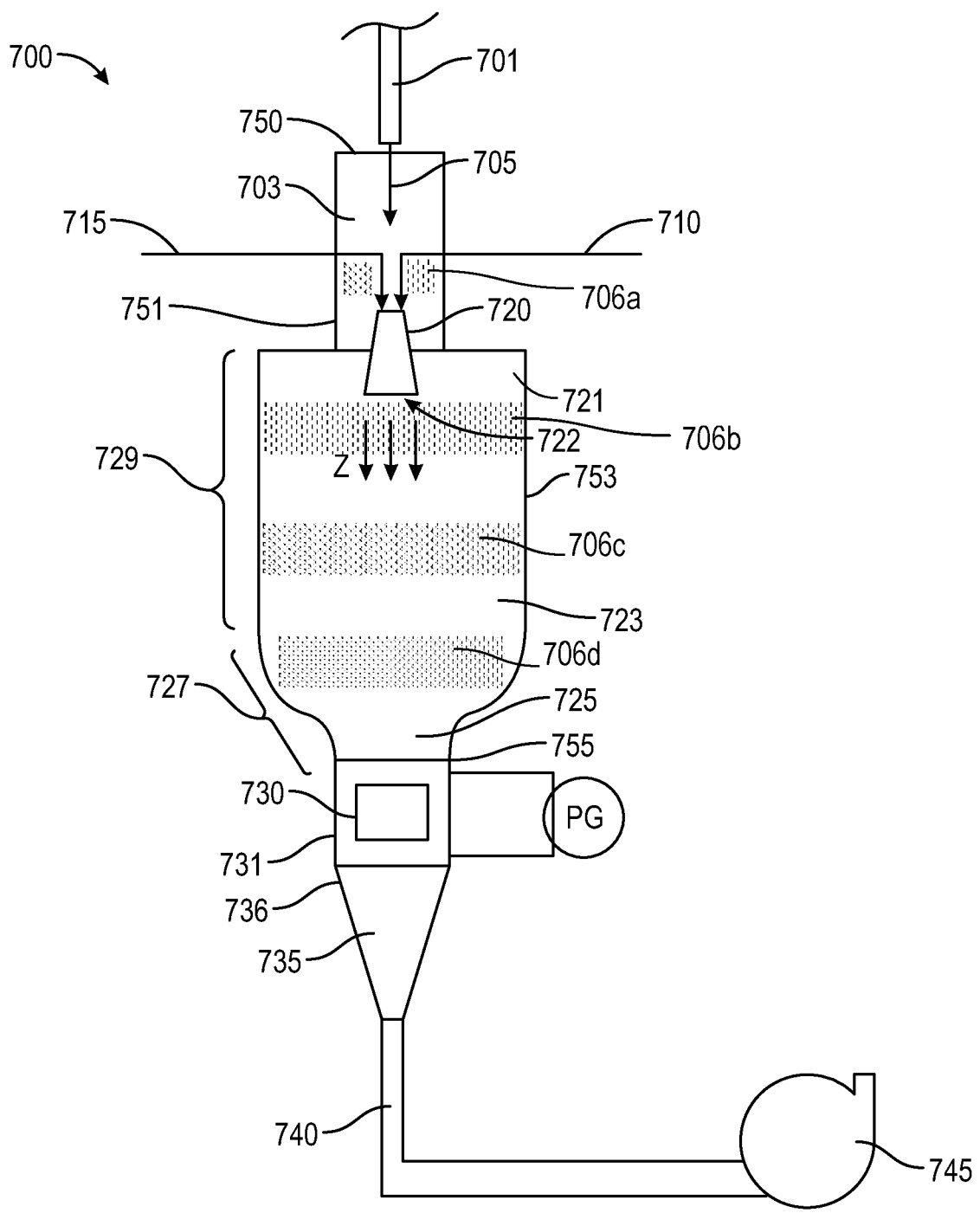
FIG. 5 schematically depicts an apparatus for depositing inorganic material according to embodiments disclosed herein.

In FIG. 4, an apparatus 900, Apparatus "T", for forming honeycomb bodies is shown comprising a duct 951, a deposition zone 931, an exit zone 936, an exit conduit 940, and a flow driver 945.

The duct 951 spans from a first end 950 to a second end 955 including a right cylindrical section 928, all defining a chamber of the duct comprising: a first plenum space 903 at the first end 950, an evaporation chamber 923 downstream of the plenum space 603, and a second plenum space 929 defined by the right cylindrical section 928. In one or more embodiments, the diameter of the duct 951 defining the plenum space 903 can be equal to the diameter of a first inlet location 921 of an evaporation section 953 of the duct 951. In one or more embodiments, the duct 951 is essentially adiabatic. That is, the duct 951 may have no external sources of heat. The evaporation chamber 923 is defined by the evaporation section 953 of the duct 951. The evaporation section 953 comprises the first inlet location 921 from the first plenum space 903, a second inlet location 924 from the second plenum space 929, and an outlet end 925. In some embodiments, some evaporation may occur in at least a portion of second plenum space 929 defined by the right cylindrical section 928.

A carrier gas is supplied in a first path to the duct 951 by a conduit 901, which may have a heat source 906a to create a primary heated carrier gas 905a that enters the first plenum space 903, and optionally another secondary heated carrier gas 905b that enters the second plenum space 929 by a second path. An atomizing gas 915 and a suspension 910 are separately supplied by individual delivery conduits such as tubing or piping to a nozzle 920, which is in the second plenum space 929 of the right cylindrical section 928 and is in fluid communication with the evaporation chamber 923 of the evaporation section 953. The suspension 910 is atomized in the nozzle 920 with the atomizing gas 915. In one or more embodiments, the suspension 910 comprises an inorganic material, a liquid vehicle, and a binder, as defined herein, which as supplied to the nozzle is a liquid-particulate-binder stream. The liquid-particulate-binder stream is atomized with the atomizing gas 915 into liquid-particulate-binder droplets by the nozzle 920.

In one or more embodiments, the secondary heated carrier gas 905b flows over the nozzle 920 Temperature of the nozzle may be regulated as desired.

Outlet flow from the nozzle 920 and, when present, flow of the secondary heated carrier gas 905b are both is in an "X" direction as shown in FIG. 4. Flow of the primary heated carrier gas 905a is in a "Z" direction as shown in FIG. 4. There may be a diffusing area 922 downstream of the nozzle where at least some intermixing occurs. In this embodiment, the diffusing area 922 is located at least partially in the second plenum space 929, but in other embodiments, the diffusing area 922 may be located in evaporation chamber 923 depending on the location of the nozzle.

The outlet flow of from the nozzle intermixes with the heated carrier gases 905a and 905b, thereby forming a gas-liquid-particulate-binder mixture, which flows through the chamber of the duct 951. Specifically, the gas-liquid-particulate-binder mixture flows through the evaporation chamber 923 of the evaporation section 953 and into the deposition zone 931 at the outlet end 925 of the evaporation section 953. At the intermixing, the gas-liquid-particulate-binder mixture is heated inside the chamber by the heated carrier gas.

In this embodiment, the outlet flow of the nozzle and the primary carrier gas 905a enter the evaporation chamber 923 of the evaporation section 953 from substantially perpendicular directions. In the evaporation chamber 923, substantially all of the liquid vehicle from the droplets is evaporated thereby forming agglomerates of the particles and the binder material, the agglomerates being interspersed in a gaseous carrier stream, which is comprised of the carrier gases and the atomizing gas.

The deposition zone 931 in fluid communication with the duct 951 houses a plugged ceramic honeycomb body 930, for example, a wall-flow particulate filter. The deposition zone 931 has an inner diameter that is larger than the outer diameter of the ceramic honeycomb body 930. To avoid leakage of the gases carrying the ceramic powders, the ceramic honeycomb body 930 is sealed to the inner diameter of the deposition zone 931, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 930 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 930 is an exit zone 936 defining an exit chamber 935. The flow driver 945 is downstream from the ceramic honeycomb body 930, in fluid communication with the deposition zone 931 and the exit zone 936 by way of the exit conduit 940. Non-limiting examples of flow drivers are: fan, blower, and vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Overall flow through embodiments such as apparatus 900 is considered in a downward direction, for example, substantially parallel to the direction of gravity. In other embodiments, the apparatus is configured such that flow is directed in a substantially upward or vertical direction.

FIG. 5 shows an apparatus 700, Apparatus "C", for forming honeycomb bodies, the apparatus 700 comprising a duct 751, a deposition zone 731, an exit zone 736, an exit conduit 740, and a flow driver 745.

The duct 751 spans from a first end 750 to a second end 755, defining a chamber of the duct comprising: a plenum space 703 at the first end 750 and an evaporation chamber 723 downstream of the plenum space 703. In one or more embodiments, the diameter of the duct 751 defining the plenum space 703 can be equal to the diameter of an evaporation section 753 at an inlet end 721. In one or more embodiments, the duct 751 is essentially adiabatic. That is, the duct 751 may have no external sources of heat. The evaporation chamber 723 is defined by the evaporation section 753 of the duct 751, which in this embodiment, comprises a first section of non-uniform diameter 727 and a second section of substantially uniform diameter 729. The evaporation section 753 comprises the inlet end 721 and an outlet end 725. The first section of non-uniform diameter 727 has a diameter that decreases from the outlet end 725 toward the section of uniform diameter 729, which creates a converging space for the flow as it enters the deposition zone 731.

A carrier gas is supplied to the duct 751 by a conduit 701, which may have a heat source to create a heated carrier gas 705. An atomizing gas 715 and a suspension 710 are separately supplied by individual delivery conduits such as tubing or piping to a nozzle 720, which is at the inlet end 721 of the evaporation section 753 and is in fluid communication with the duct 751, specifically in this embodiment with the evaporation chamber 723. The suspension 710 is atomized in the nozzle 720 with the atomizing gas 715. In one or more embodiments, the suspension 710 comprises an inorganic material, a liquid vehicle, and a binder, as defined herein, which as supplied to the nozzle is a liquid-particulate-binder stream. The liquid-particulate-binder stream is atomized with the atomizing gas 715 into liquid-particulate-binder droplets by the nozzle 720.

In one or more embodiments, the heated carrier gas 705 flows over the nozzle 720. The atomizing gas 715 can be heated to form a heated atomizing gas. Temperature of the nozzle may be regulated as desired.

Outlet flow from the nozzle 720 and flow of the heated carrier gas 705 are both in a "Z" direction as shown in FIG. 5. There may be a diffusing area 722 downstream of the nozzle where at least some intermixing occurs. In this embodiment, the diffusing area 722 is located in the evaporation chamber 723, but in other embodiments, the diffusing area may be located in the plenum space 703 depending on the location of the nozzle.

The outlet flow of from the nozzle intermixes with the heated carrier gas 705, thereby forming a gas-liquid-particulate-binder mixture, which flows through the chamber of the duct 751. Specifically, the gas-liquid-particulate-binder mixture flows through the evaporation chamber 723 of the evaporation section 753 and into the deposition zone 731 at the outlet end 725 of the evaporation section 753. At the intermixing, the gas-liquid-particulate-binder mixture is heated inside the chamber by the heated carrier gas.

In this embodiment, the outlet flow of the nozzle and the heated carrier gas enter the evaporation chamber 723 of the evaporation section 753 from substantially the same direction. In the evaporation chamber 723, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 731 in fluid communication with the duct 751 houses a plugged ceramic honeycomb body 730, for example, a wall-flow particulate filter. The deposition zone 731 has an inner diameter that is larger than the outer diameter of the ceramic honeycomb body 730. To avoid leakage of the gases carrying the ceramic powders, the ceramic honeycomb body 730 is sealed to the inner diameter of the deposition zone 731, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 730 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 730 is an exit zone 736 defining an exit chamber 735. The flow driver 745 is downstream from the ceramic honeycomb body 730, in fluid communication with the deposition zone 731 and the exit zone 736 by way of the exit conduit 740. Non-limiting examples of flow drivers are: fan, blower, and vacuum pump. The droplets of the atomized suspension are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 700 is considered in a downward direction, for example, substantially parallel to the direction of gravity. In other embodiments, the apparatus is configured such that flow is directed in a substantially upward or vertical direction.

Figure 6:
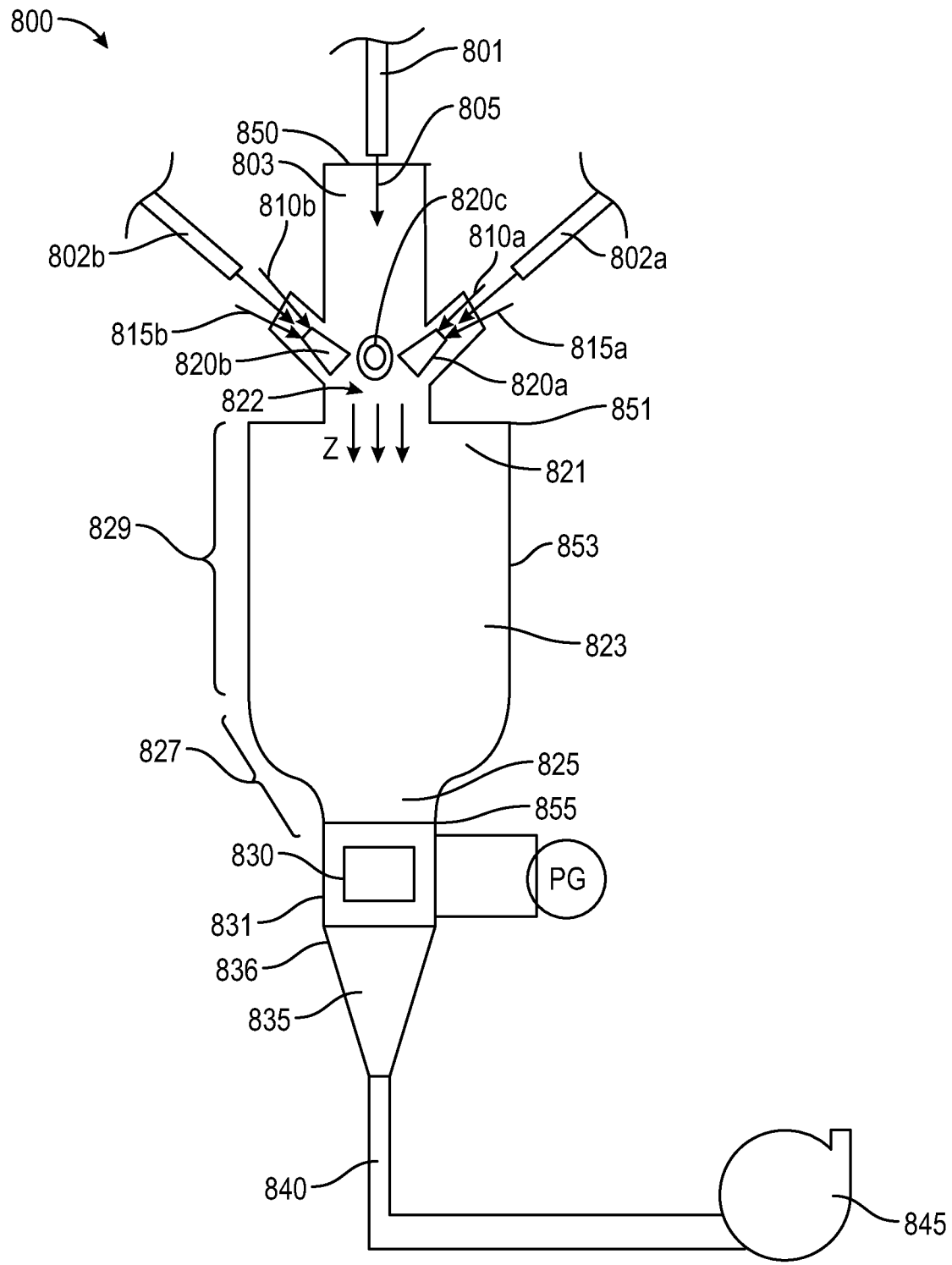
FIG. 6 schematically depicts an apparatus for depositing inorganic material according to embodiments disclosed herein.

FIG. 6 shows an apparatus 800, Apparatus "D", for forming honeycomb bodies, the apparatus 800 comprising a duct 851, a deposition zone 831, an exit zone 836, an exit conduit 840, and a flow driver 845.

The duct 851 spans from a first end 850 to a second end 855, defining a chamber of the duct comprising: a plenum space 803 at the first end 850 and an evaporation chamber 823 downstream of the plenum space 803. In one or more embodiments, the duct 851 is essentially adiabatic. That is, the duct 851 may have no external sources of heat. The evaporation chamber 823 is defined by an evaporation section 853 of the duct 851, which in this embodiment, comprises a first section of non-uniform diameter 827 and a second section of substantially uniform diameter 829. The evaporation section 853 comprises an inlet end 821 and an outlet end 825. The first section of non-uniform diameter 827 has a diameter that decreases from the outlet end 825 toward the section of uniform diameter 829, which creates a converging space for the flow as it enters the deposition zone 831. In some embodiments, the evaporation section 853 is configured to have a single section of substantially uniform diameter analogous to Apparatus "B". Alternatively, the evaporation section 853 has a section of non-uniform diameter that increases from the inlet end 821 toward a section of uniform diameter analogous to Apparatus "A."

A carrier gas is supplied to the duct 851 by a conduit 801, which may have a heat source to create a heated carrier gas 805. An atomizing gas 815 and a suspension 810 are separately supplied by individual delivery conduits such as tubing or piping to a plurality of nozzles 820a, 820b, and 820c, which are in fluid communication with the plenum space 803. Each nozzle has an inflow of the atomizing gas e.g., 815a supplies the nozzle 820a and 815b supplies the nozzle 820b. Each nozzle has an inflow of the suspension e.g., 810a supplies the nozzle 820a and 810b supplies the nozzle 820b. Optionally, each nozzle has a supply of the heated carrier gas, e.g., 802a supplies the nozzle 820a and 802b supplies the nozzle 820b. While the embodiment of FIG. 6 shows three nozzles, in other embodiments, a plurality of nozzles of any number is be used. The suspension 810 is atomized in the nozzle 820 with the atomizing gas 815. In one or more embodiments, the suspension 810 comprises an inorganic material, a liquid vehicle, and a binder, as defined herein, which as supplied to the nozzle is a liquid-particulate-binder stream. The liquid-particulate-binder stream is atomized with the atomizing gas 815 into liquid-particulate-binder droplets by the nozzle 820.

In one or more embodiments, the heated carrier gas 805 and optionally 802a and 802b flow over the nozzles. The atomizing gas 815a and 815b can be heated to form a heated atomizing gas. Temperatures of the nozzles may be regulated, individually or collectively, as desired.

Flow of the heated carrier gas 805 is in a "Z" direction as shown in FIG. 6. While outlet flow from the nozzles 820a, 820b, and 820c may be angled towards a center of the duct 851, upon intermixing with the heated carrier gas 805, the outlet flow of the nozzles will generally be in the "Z" direction. There may be a diffusing area 822 downstream of the nozzles where at least some intermixing occurs. In this embodiment, the diffusing area 822 is located in the plenum space 803, but in other embodiments, the diffusing area may be located in the evaporation chamber 823 depending on the location of the nozzles.

The outlet flow of from the nozzles intermixes with the heated carrier gas 805, thereby forming a gas-liquid-particulate-binder mixture, which flows through the chamber of the duct 851. Specifically, the gas-liquid-particulate-binder mixture flows through the evaporation chamber 823 of the evaporation section 853 and into the deposition zone 831 at the outlet end 825 of the evaporation section 853. At the intermixing, the gas-liquid-particulate-binder mixture is heated inside the chamber by the heated carrier gas.

In this embodiment, the outlet flow of the nozzles and the heated gas enter the evaporation chamber 823 of the evaporation section 853 from substantially the same direction. In the evaporation chamber 823, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 831 in fluid communication with the duct 851 houses a plugged ceramic honeycomb body 830, for example, a wall-flow particulate filter or "wall-flow filter." The deposition zone 831 has an inner diameter that is larger than the outer diameter of the ceramic honeycomb body 830. To avoid leakage of the gases carrying the ceramic powders, the ceramic honeycomb body 830 is sealed to the inner diameter of deposition zone 831, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 830 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 830 is an exit zone 836 defining an exit chamber 835. The flow driver 845 is downstream from the ceramic honeycomb body 830, in fluid communication with the deposition zone 831 and the exit zone 836 by way of the exit conduit 840. Non-limiting examples of flow drivers are: fan, blower, and vacuum pump. The droplets of the atomized suspension are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 800 is considered in a downward direction, for example, substantially parallel to the direction of gravity. In other embodiments, the apparatus may be configured such that flow is directed in a substantially upward or vertical direction.

General Overview of Honeycomb Bodies

The ceramic articles herein comprise honeycomb bodies comprised of a porous ceramic honeycomb structure of porous walls having wall surfaces defining a plurality of inner channels.

In some embodiments, the porous ceramic walls comprise a material such as a filtration material which may comprise in some portions or some embodiments a porous inorganic layer disposed on one or more surfaces of the walls. In some embodiments, the filtration material comprises one or more inorganic materials, such as one or more ceramic or refractory materials. In some embodiments, the filtration material is disposed on the walls to provide enhanced filtration efficiency, both locally through and at the wall and globally through the honeycomb body, at least in the initial use of the honeycomb body as a filter following a clean state, or regenerated state, of the honeycomb body, for example such as before a substantial accumulation of ash and/or soot occurs inside the honeycomb body after extended use of the honeycomb body as a filter.

In one aspect, the filtration material is present in some portions or some embodiments as a layer disposed on the surface of one or more of the walls of the honeycomb structure. The layer in some embodiments is porous to allow the gas flow through the wall. In some embodiments, the layer is present as a continuous coating over at least part of the, or over the entire, surface of the one or more walls. In some embodiments of this aspect, the filtration material is flame-deposited filtration material.

In another aspect, the filtration material is present as a plurality of discrete regions of filtration material disposed on the surface of one or more of the walls of the honeycomb structure. The filtration material may partially block a portion of some of the pores of the porous walls, while still allowing gas flow through the wall. In some embodiments of this aspect, the filtration material is aerosol-deposited filtration material. In some preferred embodiments, the filtration material comprises a plurality of inorganic particle agglomerates, wherein the agglomerates are comprised of inorganic or ceramic or refractory material. In some embodiments, the agglomerates are porous, thereby allowing gas to flow through the agglomerates.

In some embodiments, a honeycomb body comprises a porous ceramic honeycomb body comprising a first end, a second end, and a plurality of walls having wall surfaces defining a plurality of inner channels. A deposited material such as a filtration material, which may be in some portions or some embodiments a porous inorganic layer, is disposed on one or more of the wall surfaces of the honeycomb body. The deposited material such as a filtration material, which may be a porous inorganic layer has a porosity as measured by mercury intrusion porosimetry, SEM, or X-ray tomography in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the deposited material such as a filtration material, which may be a porous inorganic layer that has an average thickness of greater than or equal to 0.5 μm and less than or equal to 50 μm, or greater than or equal to 0.5 μm and less than or equal to 45 μm, greater than or equal to 0.5 μm and less than or equal to 40

µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm. Various embodiments of honeycomb bodies and methods for forming such honeycomb bodies will be described herein with specific reference to the appended drawings.

The material in some embodiments comprises a filtration material, and in some embodiments comprises an inorganic filtration material. According to one or more embodiments, the inorganic filtration material provided herein comprises discrete regions and/or a discontinuous layer formed from the inlet end to the outlet end comprising discrete and disconnected patches of material or filtration material and binder comprised of primary particles in secondary particles or agglomerates that are substantially spherical. In one or more embodiments, the primary particles are non-spherical. In one or more embodiments, "substantially spherical" refers to agglomerate having circularity in cross section in a range of from about 0.8 to about 1 or from about 0.9 to about 1, with 1 representing a perfect circle. In one or more embodiments, 75% of the primary particles deposited on the honeycomb body have a circularity of less than 0.8. In one or more embodiments, the secondary particles or agglomerates deposited on the honeycomb body have an average circularity greater than 0.9, greater than 0.95, greater than 0.96, greater than 0.97, greater than 0.98, or greater than 0.99.

Circularity can be measured using a scanning electron microscope (SEM). The term "circularity of the cross-section (or simply circularity)" is a value expressed using the equation shown below. A circle having a circularity of 1 is a perfect circle.

$$\text{Circularity} = (4\pi \times \text{cross-sectional area})/(\text{length of circumference of the cross-section}).$$

A honeycomb body of one or more embodiments may comprise a honeycomb structure and deposited material such as a filtration material disposed on one or more walls of the honeycomb structure. In some embodiments, the deposited material such as a filtration material is applied to surfaces of walls present within honeycomb structure, where the walls have surfaces that define a plurality of inner channels.

The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

Figure 7:
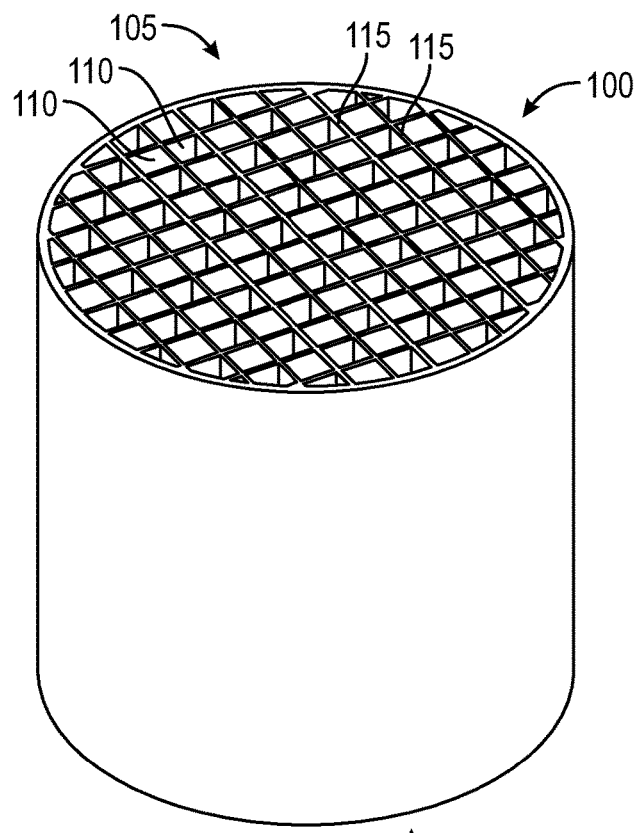
FIG. 7 schematically depicts an unplugged honeycomb body.

With reference now to FIG. 7, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the honeycomb body may be, for example, a checkerboard pattern where alternating channels of one end of the honeycomb body are plugged. In some embodiments, plugged channels at one end of the honeycomb body have corresponding unplugged channels at the other end, and unplugged channels at one end of the honeycomb body have corresponding plugged channels at the other end.

In one or more embodiments, the honeycomb body may be formed from cordierite, aluminum titanate, enstatite, mullite, forsterite, corundum (SiC), spinel, sapphirine, and periclase. In general, cordierite has a composition according to the formula $Mg_2Al_4Si_5O_{18}$. In some embodiments, the pore size of the ceramic material, the porosity of the ceramic material, and the pore size distribution of the ceramic material are controlled, for example by varying the particle sizes of the ceramic raw materials. In addition, pore formers can be included in ceramic batches used to form the honeycomb body.

In some embodiments, walls of the honeycomb body may have an average thickness from greater than or equal to 25 µm to less than or equal to 250 µm, such as from greater than or equal to 45 µm to less than or equal to 230 µm, greater than or equal to 65 µm to less than or equal to 210 µm, greater than or equal to 65 µm to less than or equal to 190 µm, or greater than or equal to 85 µm to less than or equal to 170 µm. The walls of the honeycomb body can be described to have a base portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 µm into the base portion of the wall of the honeycomb body. In some embodiments, the surface portion may extend about 5 µm, about 7 µm, or about 9 µm (i.e., a depth of 0 (zero)) into the base portion of the wall. The bulk portion of the honeycomb body constitutes the thickness of wall minus the surface portions. Thus, the bulk portion of the honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the honeycomb body (prior to applying any filtration material) has a bulk mean pore size from greater than or equal to 7 µm to less than or equal to 25 µm, such as from greater than or equal to 12 µm to less than or equal to 22 µm, or from greater than or equal to 12 µm to less than or equal to 18 µm. For example, in some embodiments, the bulk of the honeycomb body may have bulk mean pore sizes of about 10 µm, about 11 µm, about 12 µm, about 13 µm, about 14 µm, about 15 µm, about 16 µm, about 17 µm, about 18 µm, about 19 µm, or about 20 µm. Generally, pore sizes of any given material exist in a statistical distribution. Thus, the term "mean pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the mean pore size (d50) of the bulk of the honeycomb body (prior to applying any filtration material) is in a range of from 10 μm to about 16 μm, for example 13-14 μm, and the d10 refers to a length measurement, above which the pore sizes of 90% of the pores lie and below which the pore sizes of the remaining 10% of the pores lie, based on the statistical distribution of all the pores is about 7 μm. In specific embodiments, the d90 refers to a length measurement, above which the pore sizes of 10% of the pores of the bulk of the honeycomb body (prior to applying any filtration material) lie and below which the pore sizes of the remaining 90% of the pores lie, based on the statistical distribution of all the pores is about 30 μm. In specific embodiments, the mean or average diameter (D50) of the secondary particles or agglomerates is about 2 μm. In specific embodiments, it has been determined that when the agglomerate mean size D50 and the mean wall pore size of the bulk honeycomb body d50 is such that there is a ratio of agglomerate mean size D50 to mean wall pore size of the bulk honeycomb body d50 is in a range of from 5:1 to 16:1, excellent filtration efficiency results and low pressure drop results are achieved. In more specific embodiments, a ratio of agglomerate mean size D50 to mean wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the honeycomb body has a surface mean pore size from greater than or equal to 7 μm to less than or equal to 20 μm, such as from greater than or equal to 8 μm to less than or equal to 15 μm, or from greater than or equal to 10 μm to less than or equal to 14 μm. For example, in some embodiments, the surface of the honeycomb body may have surface mean pore sizes of about 8 μm, about 9 μm, about 10 μm, about 11 μm, about 12 μm, about 13 μm, about 14 μm, or about 15 μm.

In some embodiments, the surface of the honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 8:
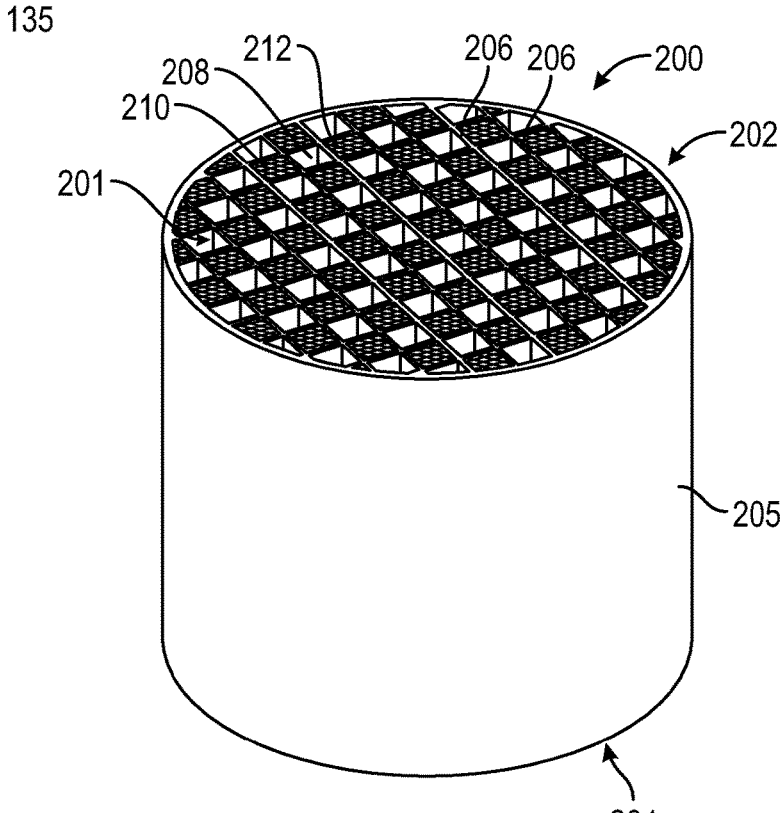
FIG. 8 schematically depicts a wall-flow particulate filter according to embodiments disclosed and described herein.
Figure 9:
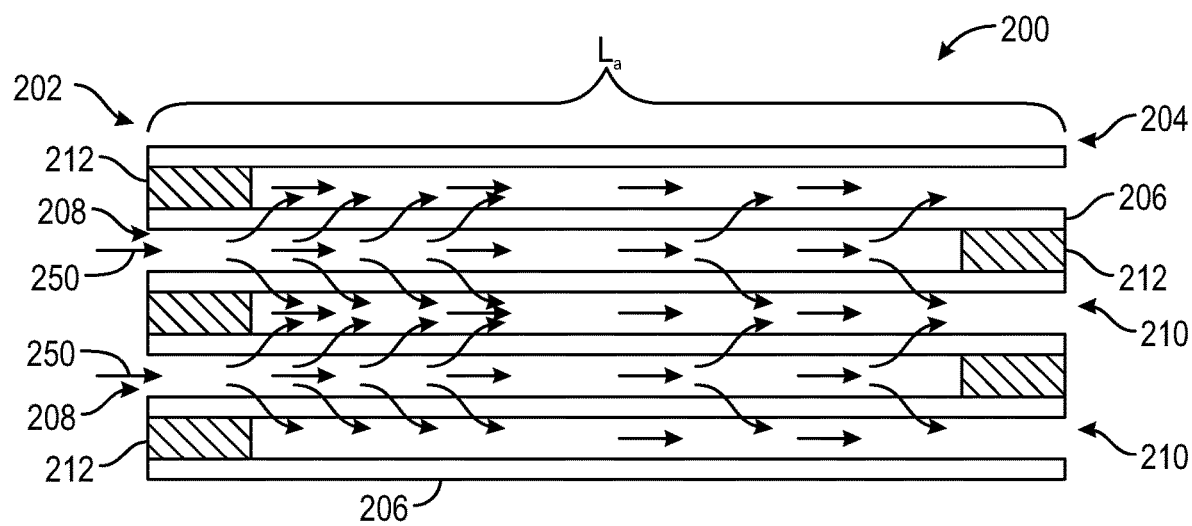
FIG. 9 is a cross-sectional longitudinal view of the particulate filter shown in FIG. 8.

Referring now to FIGS. 8 and 9, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 9). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter 200 of FIG. 8 is shown in FIG. 9. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 8, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 9. Accordingly, each cell may be plugged at or near one end of the particulate filter only.

While FIG. 8 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 μm). For example, in some embodiments, the thickness of the channel walls 206 may be in a range from about 4 mils up to about 30 mils (762 μm). In some other embodiments, the thickness of the channel walls 206 may be in a range from about 7 mils (177.8 μm) to about 20 mils (508 μm).

In some embodiments of the particulate filter 200 described herein the channel walls 206 of the particulate filter 200 may have a bare open porosity (i.e., the porosity before any coating is applied to the honeycomb body) % P≥35% prior to the application of any coating to the particulate filter 200. In some embodiments the bare open porosity of the channel walls 206 may be such that 40%≤% P≥75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in some embodiments, the channel walls 206 of the particulate filter 200 are formed such that the pore distribution in the channel walls 206 has a mean pore size of ≤30 µm prior to the application of any coatings (i.e., bare). For example, in some embodiments, the mean pore size may be ≥8 µm and less than or ≤30 µm. In other embodiments, the mean pore size may be ≥10 µm and less than or ≤30 µm. In other embodiments, the mean pore size may be ≥10 µm and less than or ≤25 µm. In some embodiments, particulate filters produced with a mean pore size greater than about 30 µm have reduced filtration efficiency while with particulate filters produced with a mean pore size less than about 8 µm may be difficult to infiltrate the pores with a washcoat containing a catalyst. Accordingly, in some embodiments, it is desirable to maintain the mean pore size of the channel wall in a range of from about 8 µm to about 30 µm, for example, in a range of rom 10 µm to about 20 µm.

In one or more embodiments described herein, the honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to ceram the plugs and secure the plugs in the channels.

Figure 10:
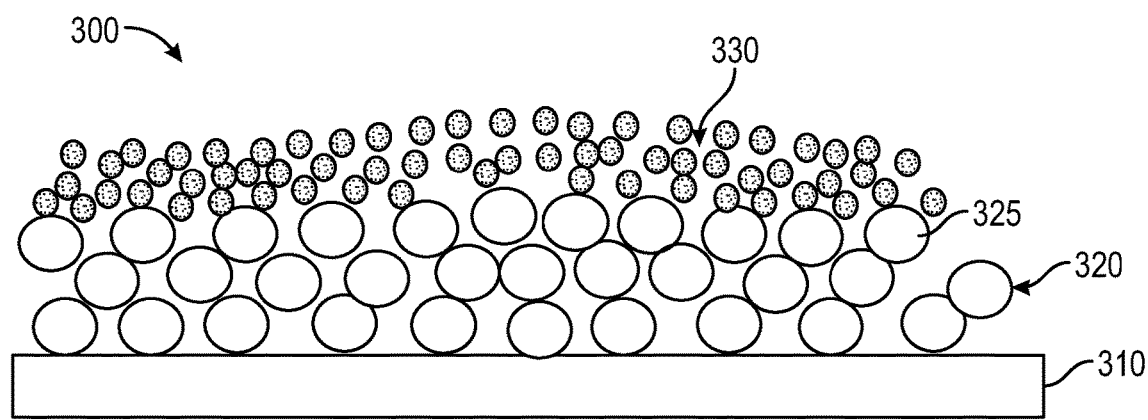
FIG. 10 schematically depicts a wall of a honeycomb body with particulate loading.

In various embodiments the honeycomb body is configured to filter particulate matter from a gas stream, for example, an exhaust gas stream from a gasoline engine. Accordingly, the mean pore size, porosity, geometry and other design aspects of both the bulk and the surface of the honeycomb body are selected taking into account these filtration requirements of the honeycomb body. As an example, and as shown in the embodiment of FIG. 10, a wall 310 of the honeycomb body 300, which can be in the form of the particulate filter as shown in FIGS. 8 and 9, has filtration material deposits 320 disposed thereon, which in some embodiments is sintered or otherwise bonded by heat treatment. The filtration material deposits 320 comprise particles 325 that are deposited on the wall 310 of the honeycomb body 300 and help prevent particulate matter from exiting the honeycomb body along with the gas stream 330, such as, for example, soot and/or ash, and to help prevent the particulate matter from clogging the base portion of the walls 310 of the honeycomb body 300. In this way, and according to embodiments, the filtration material deposits 320 can serve as the primary filtration component while the base portion of the honeycomb body can be configured to otherwise minimize pressure drop for example as compared to honeycomb bodies without such filtration material deposits. The filtration material deposits are delivered by the aerosol deposition methods disclosed herein.

As mentioned above, the material, which in some portions or some embodiments may be an inorganic layer, on walls of the honeycomb body is very thin compared to thickness of the base portion of the walls of the honeycomb body. As will be discussed in further detail below, the material, which may be an inorganic layer, on the honeycomb body can be formed by methods that permit the deposited material to be applied to surfaces of walls of the honeycomb body in very thin applications or in some portions, layers. In embodiments, the average thickness of the material, which may be deposit regions or an inorganic layer, on the base portion of the walls of the honeycomb body is greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm.

As discussed above, the deposited material, which may in some portions or some embodiments be an inorganic layer, can be applied to the walls of the honeycomb body by methods that permit the inorganic material, which may be an inorganic layer, to have a small mean pore size. This small mean pore size allows the material, which may be an inorganic layer, to filter a high percentage of particulate and prevents particulate from penetrating honeycomb and settling into the pores of the honeycomb. The small mean pore size of material, which may be an inorganic layer, according to embodiments increases the filtration efficiency of the honeycomb body. In one or more embodiments, the material, which may be an inorganic layer, on the walls of the honeycomb body has a mean pore size from greater than or equal to 0.1 µm to less than or equal to 5 µm, such as from greater than or equal to 0.5 µm to less than or equal to 4 µm, or from greater than or equal to 0.6 µm to less than or equal to 3 µm. For example, in some embodiments, the material, which may be an inorganic layer, on the walls of the honeycomb body may have mean pore sizes of about 0.5 µm, about 0.6 µm, about 0.7 µm, about 0.8 µm, about 0.9 µm, about 1 µm, about 2 µm, about 3 µm, or about 4 µm.

Although the deposited material, which may be an inorganic layer, on the walls of the honeycomb body may, in some embodiments, cover substantially 100% of the wall surfaces defining inner channels of the honeycomb body, in other embodiments, the material, which may be an inorganic layer, on the walls of the honeycomb body covers less than substantially 100% of the wall surfaces defining inner channels of the honeycomb body. For instance, in one or more embodiments, the deposited material, which may be an inorganic layer, on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIGS. 8 and 9, the honeycomb body can have a first end and second end. The first end and the second end are separated by an axial length. In some embodiments, the filtration material deposits on the walls of the honeycomb body may extend the entire axial length of the honeycomb body (i.e., extends along 100% of the axial length). However, in other embodiments, the material, which may be an inorganic layer, on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the material, which may in some portions or some embodiments be an inorganic layer, on the walls of the honeycomb body extends from the first end of the honeycomb body to the second end of the honeycomb body. In some embodiments, the material, which may be an inorganic layer, on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer or material, which may be an inorganic layer, on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

The selection of a honeycomb body having a low pressure drop in combination with the low thickness and porosity of the filtration material on the honeycomb body according to embodiments allows a honeycomb body of embodiments to have a low initial pressure drop when compared to other honeycomb bodies. In embodiments, the loading of the inorganic deposits is in a range of from 0.1 to 30 g/L or 0.3 to 30 g/L on the honeycomb body, such as in a range of from 1 to 30 g/L on the honeycomb body, or in a range of from 3 to 30 g/L on the honeycomb body, or in a range of 0.1 to 10 g/L, or 0.1 to 5 g/L. In other embodiments, the loading of the inorganic deposits is in a range of from 1 to 20 g/L on the honeycomb body, such as in a range of from 1 to 10 g/L on the honeycomb body. In specific embodiments, the loading of the inorganic deposits is in a range of from 1 to 9 g/L, 1 to 8 g/L, 1 to 7 g/L, 1 to 8 g/L, 1 to 5 g/L, 1 to 4 g/L, 1 to 3 g/L, 2 to 10 g/L, 2 to 9 g/L, 2 to 8 g/L, 2 to 7 g/L, 2 to 6 g/L, 2 to 5 g/L, 2 to 4 g/L, 3 to 10 g/L, 3 to 9 g/L, 3 to 8 g/L, 3 to 7 g/L, 3 to 6 g/L, 3 to 5 g/L, 4 to 10 g/L, 4 to 9 g/L 4 to 8 g/L, 4 to 7 g/L, or 4 to 6 g/L on the honeycomb body. In some embodiments, the increase in pressure drop across the honeycomb due to the application of the porous layer across is less than 20% of the uncoated honeycomb. In other embodiments that increase can be less than or equal to 9%, or less than or equal to 8%. In other embodiments, the pressure drop increase across the honeycomb body is less than or equal to 7%, such as less than or equal to 6%. In still other embodiments, the pressure drop increase across the honeycomb body is less than or equal to 5%, such as less than or equal to 4%, or less than or equal to 3%.

Without being bound to any particular theory, it is believed that small pore sizes in the filtration material deposits on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 CHEMICAL ENGINEERING SCIENCE 4751-60 (2010). As used herein, the initial filtration efficiency of a honeycomb body refers to a new or regenerated honeycomb body that does not comprise any measurable soot or ash loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The material, which is in some embodiments an inorganic filtration material, on the walls of the honeycomb body according to embodiments is thin and has a porosity, and in some embodiments also has good chemical durability and physical stability. The chemical durability and physical stability of the filtration material deposits on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency (ΔFE) from before the test cycles to after the test cycles indicates better chemical durability and physical stability of the filtration material deposits on the honeycomb body. In some embodiments, the ΔFE is less than or equal to 5%, such as less than or equal to 4%, or less than or equal to 3%. In other embodiments, the ΔFE is less than or equal to 2%, or less than or equal to 1%.

In some embodiments, the filtration material deposits on the walls of the honeycomb body may be comprised of one or a mixture of ceramic components, such as, for example, ceramic components selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof. Thus, the filtration material deposits on the walls of the honeycomb body may comprise an oxide ceramic. As discussed in more detail below, the method for forming the filtration material deposits on the honeycomb body according to embodiments can allow for customization of the filtration material composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In some embodiments, the filtration material deposits on the walls of the honeycomb body may comprise cordierite, aluminum titanate, enstatite, mullite, forsterite, corundum (SiC), spinel, sapphirine, and periclase.

In some embodiments, the composition of the filtration material deposits on the walls of the honeycomb body is the same as the composition of the honeycomb body. However, in other embodiments, the composition of the filtration material is different from the composition of the walls of the matrix of the honeycomb body.

The properties of the filtration material deposits and, in turn, the honeycomb body overall are attributable to the ability of applying a sparse or thin porous filtration material having small median pore sizes relative to the host honeycomb body.

In some embodiments, the method of forming a honeycomb body comprises forming or obtaining a mixture or a suspension that comprises a ceramic precursor material and a solvent. The ceramic precursor material of the filtration material precursor comprises ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like.

In one or more embodiments, the suspension is atomized with an atomizing gas to form liquid-particulate-binder droplets comprised of the liquid vehicle, the binder material, and the particles, is directed to a honeycomb body, Agglomerates formed upon removal or evaporation of the liquid vehicle are then deposited on the honeycomb body. In some embodiments, the honeycomb body may have one or more of the channels plugged on one end, such as, for example, the first end of the honeycomb body during the deposition of the aerosol to the honeycomb body. The plugged channels may, in some embodiments, be removed after deposition of the aerosol. But, in other embodiments, the channels may remain plugged even after deposition of the aerosol. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the aerosol, the aerosol may be evenly distributed within the channels of the honeycomb body.

According to one or more embodiments, binders with high temperature (e.g., greater than 400° C.) resistance are included in the agglomerates and filtration material deposits to enhance integrity of the agglomerates and deposits even at high temperatures encountered in exhaust gas emissions treatment systems. In specific embodiments, a filtration material can comprise about 5 to 25 wt % Dowsil™ US-CF-2405, an alkoxysiloxane resin. The microstructure of the filtration material deposits was similar to the as-deposited morphology after the various tests described below. The inorganic binders Aremco Ceramabind™ 644A and 830 could also be used in in one or more embodiments. The filtration efficiency of both samples were higher than 60% after the high flow blowing test, a high flow test at 850 $Nm^3/h$. The tests demonstrated that the binders, including organic and inorganic binders, caused the primary particles to bind together to form secondary particles (also called agglomerates), which were bound to the filter walls, even when exposed to high temperatures encountered in engine exhaust gas streams. According to one or more embodiments, other inorganic and organic binders such as silicate (e.g. $Na_2SiO_3$), phosphate (e.g. $AlPO_4$, $AlH_2(PO_4)_3$), hydraulic cement (e.g. calcium aluminate), sol (e.g. $mSiO_2 \cdot nH_2O$, $Al(OH)_x \cdot (H_2O)_{6-x}$) and metal alkoxides, could also be utilized, for example to increase mechanical strength by an appropriate curing process.

Aqueous- or Alcohol-Based Methods

According to one or more embodiments, a methods of aqueous- or alcohol-based aerosol deposition of inorganic material on porous walls of a plugged honeycomb body are disclosed. The porous walls of the plugged honeycomb body form a plurality of channels in the honeycomb body. In specific embodiments, a liquid-based suspension of inorganic material and binder passes through a nozzle and provides a flow of aerosol particles after contact with a gas stream and heat before being forced into the opening channels of the honeycomb body. Inorganic material is then deposited on the porous walls with some agglomerates or inorganic material getting into pores. An off-line heat treatment process may be applied for curing of the layer, which in some embodiments forms a membrane. According to one or more embodiments, the honeycomb bodies made and described herein, both before and after curing, exhibit significantly higher filtration efficiency and/or better FE/dP trade-off than bare honeycomb body substrate parts.

Referring now to FIG. 11, according to one or more embodiments, a process 4100 comprises the steps of aqueous or alcohol suspension preparation 1405, atomizing to form droplets 1410, intermixing droplets and a gaseous carrier stream 1415; evaporating liquid vehicle to form agglomerates 1420, depositing of material, e.g., agglomerates, on the walls of a wall-flow filter 1425, and optional post-treatment 1430 to, for example off-line curing, bind the material on, or in, or both on and in, the porous walls of the honeycomb body. Aerosol deposition methods form of agglomerates comprising a binder can provide a high mechanical integrity even without any high temperature curing steps (e.g., heating to temperatures in excess of 1000° C.), and in some embodiments even higher mechanical integrity after an optional off-line curing step such as a high temperature (e.g., heating to temperatures in excess of 1000° C.) curing step. In one or more embodiments, "off-line" refers to a curing process that is performed separately form the aerosol deposition apparatus, such as in a separate apparatus.

In one or more embodiments, stable aqueous- or alcohol-based inorganic material suspension or slurry is made by mixing powder of inorganic material (e.g., alumina) with deionized water and aqueous-based binder. In some embodiments, such a suspension is made by diluting a commercially available inorganic matter suspension (e.g., aqueous-based alumina suspension with deionized water or ethanol-based alumina suspension) and then adding an aqueous-based binder. In some embodiments, it may be desirable to add a dispersant. The inorganic material is in the form of particles that are spherical, rod-like, flat or irregular with the primary particle size of 30 nm to 500 nm. The concentration of the inorganic material according to one or more embodiments is varied in the range of 1% to 20% by weight of the suspension. Exemplary ranges of inorganic material in weight % are 1-2%, 1-3%, 1-4%, 1-5%, 1-6%, 1-8%, 1-9%, 1-10%, 1-15%, 1-20%, 2-3%, 2-4%, 2-5%, 2-6%, 2-8%, 2-9%, 2-10%, 2-15%, 2-20%, 3-4%, 3-5%, 3-6%, 3-8%, 3-9%, 3-10%, 3-15%, 3-20%, 4-5%, 4-6%, 4-8%, 4-9%, 4-10%, 4-15%, 4-20%, 5-6%, 5-8%, 5-9%, 5-10%, 5-15%, 5-20%, 10-15%, 10-16%, 10-17%, 10-18%, 10-19%, 10-20%, 15-18%, 15-19% and 15-20%. In one or more embodiments, the binder comprises inorganic or organic materials. Non-limiting examples of inorganic include silica, titania, silicates, aluminates, phosphate or hydraulic cement. Non-limiting examples of organic binder include silicone resin, polyvinyl alcohol (PVA) or polyethylene glycol (PEG). The concentration of binder may be in the range of 5%-100% by weight of alumina. Exemplary ranges of binder by weight of inorganic material in weight % are 5-100%, 10-100%, 15-100%, 20-100%, 25-100%, 30-100%, 35-100%, 40-100%, 45-100%, 50-100%, 55-100%, 60-100%, 5-90%, 10-90%, 15-90%, 20-90%, 25-90%, 30-90%, 35-90%, 40-90%, 45-90%, 50-90%, 55-90%, 60-90%, 5-80%, 10-80%, 15-80%, 20-80%, 25-80%, 30-80%, 35-80%, 40-80%, 45-80%, 50-80%, 55-80%, 60-80%, 5-70%, 10-70%, 15-70%, 20-70%, 25-70%, 30-70%, 35-70%, 40-70%, 45-70%, 50-70%, 55-70%, 60-70%, 5-60%, 10-60%, 15-60%, 20-60%, 25-60%, 30-60%, 35-60%, 40-60%, 45-60%, 50-60%, 55-60%, 5-50%, 10-50%, 15-50%, 20-50%, 25-50%, 30-50%, 35-50%, 40-50%, 45-50%, 5-40%, 10-40%, 15-40%, 20-40%, 25-40%, 30-40%, 35-40%, 5-30%, 10-30%, 15-30%, 20-30%, 25-30%, 5-25%, 10-25%, 15-25%, 20-25%, 1-20%, 2-20%, 3-20%, 4-20%, 5-20%, 6-20%, 7-20%, 8-20%, 9-20%, 10-20%, 1-15%, 2-15%, 3-15%, 4-15%, 5-15%, 6-15%, 7-15%, 8-15%, 9-15%, 10-15%, 1-10%, 2-10%, 3-10%, 4-10%, 5-10%, 6-10%, 7-10% and 8-10%. In one or more embodiments, mixing is performed mechanically or acoustically. The as-prepared suspension according to some embodiments is stable for at least 1 hour without clear settlement.

In some embodiments, a tape test may be used to roughly evaluate effectiveness of different binders and to decide the amount of binders to be added in the suspension. A layer of wet coating of a sample suspension is prepared according to embodiments described herein and then is applied on one microscope slide with use of as-prepared inorganic material suspension. After drying, the coated slide is placed in the oven and heated to curing temperature for a period of time in the range of 10 minutes up to 2 hours. Curing temperature and profile will depend on the binder used. After curing, a piece of regular tape such as Highland™ transparent tape is pressed against the cured coating, and then is lifted off from the coating. According to some embodiments, if particles of inorganic material are observed on the tape, the cohesive strength of the cured suspension is not acceptable. More binder or a different binder can be used, and the test can be repeated.

FIG. 4, discussed above, illustrates a schematic of a deposition system that can be used for aerosol deposition an aqueous-based suspension containing inorganic material according to one or more embodiments. In FIG. 4, the suspension is contained in a suspension container 902, and liquid pressure was applied and controlled by a gas supply 902, which in some embodiments is in the form of a cylinder. In one or more embodiments, pressure is controlled by a digital automatic pressure regulator or a piezo actuator valve. Atomization gas according to one or more embodiments comprises nitrogen or air. A first heat source 906a heats carrier gas 905a that enters the first plenum space 903. A second heat source 906b is positioned downstream from the nozzle 920 to heat the suspension 910 that is atomized in the nozzle 920. A third heat source 906c is positioned in the evaporation chamber 923, and the outlet flow of the nozzle and the primary carrier gas 905a enter the evaporation chamber 923 of the evaporation section 953.

In one or more embodiments, an aqueous- or alcohol-based aerosol deposition process and products made thereby are provided, which provide plugged honeycomb bodies comprising porous walls and inorganic material deposited thereon exhibiting significantly higher filtration efficiency and minimal backpressure penalty than those prepare by other methods. Such honeycomb bodies in some embodiments exhibit excellent water durability in certain tests described further below, including a vibration test, a vehicle test and water durability tests.

In specific embodiments, a process is provided comprising flowing an liquid suspension of inorganic material (e.g., alumina nanoparticles) in a suspension comprising a binder comprising (e.g., a water-soluble silicate binder or an alcohol-soluble alkoxysiloxane binder) through a spray nozzle to provide a flow of aerosol particles which form agglomerates after contact with a drying gas stream. In specific embodiments, the agglomerates are then forced into the opening channels of plugged honeycomb bodies and on and/or in the surface of porous walls which form the channels. In some embodiments, the agglomerates contact surface pores first. In one or more embodiments, an off-line heat treatment process is utilized for binder curing and deposit strengthening. After deposition and thermal treatment, the filter parts show improved filtration efficiency or FE/dP trade-off performance compared to bare plugged honeycomb bodies. The plugged honeycomb bodies made according to the methods made herein pass various durability tests including water resistance tests with a thermal treatment. A binder, water-soluble or alcohol-soluble binder or aqueous-compatible or alcohol-compatible binder is used according to one or more embodiments. The process according to one or more embodiments forms deposits having a microstructure of densely packed agglomerates.

Plugged Honeycomb Bodies Comprising Inorganic Material

Embodiments of the disclosure pertain to plugged honeycomb bodies comprising porous walls and inorganic material deposited on or in or both on and in the porous walls, which provide a filtration article configured to filter particulate from an exhaust gas stream. In specific embodiments, the filtration article comprises a gasoline particulate filters (GPF) used to remove particulates from gasoline engine exhaust gases. Exhaust gas to be filtered enters inlet cells and passes through the cell walls to exit the filter via outlet channels, with the particulates being trapped on or within the inlet cell walls as the gas traverses and then exits the filter. According to one or more embodiments, porous walls of the filtration article having inorganic material deposited on or in or both on and in the porous walls provide improved filtration efficiency and excellent durability, including durability when exposed to water.

In one or more embodiments the inorganic material comprises particulate or primary particles of inorganic material (e.g. alumina), particulate-binder agglomerates (referred to as "agglomerates") comprised of the particles and the binder material, and aggregates of particulate-binder agglomerates. In one or more embodiments, the "particulate" or "primary particle" refers to the smallest discrete mass of inorganic material. In one or more embodiments, "agglomerate" refers to a mass of primary particles or particulate and binder, wherein the primary particles or particulate are held together by the binder. In one or more embodiments, "aggregates of particulate-binder agglomerates" or "aggregates of primary particle-binder agglomerates" (referred to as "aggregates") refers to a clustered mass of individual particulate-binder agglomerates or primary particle-binder agglomerates, which are held together by binder. In one or more embodiments, some of the aggregates and individual, for example, non-aggregated, agglomerates are deposited onto the porous walls of the honeycomb filter body. In one or more embodiments, at least a portion of the primary particles or the particulate are present in, on or both in and on the porous walls as discrete masses that are not part of agglomerate or aggregate. In one or more embodiments, at least a portion of the particulate-binder agglomerates or the primary particle-binder agglomerates are present in, on or in and on the porous walls as discrete masses that are not part of an aggregate.

In one or more embodiments, the inorganic material in or on or in and one the porous walls of the filtration article in the form of a plugged honeycomb body is present "clusters" or "chains" of agglomerates and/or aggregates. In some embodiments, the cluster or chains provide an inorganic material morphology that is one or more of finger-shaped, fibril-shaped, or sponge-like, such as for example, a morphology resembling a sea wool sponge.

As discussed herein, according to embodiments, the inorganic material is formed from a suspension comprised of nanoparticles (e.g., inorganic particles, ceramic particles, refractory particles, alumina particles, etc.), binder (e.g., a silicon-containing binder and/or an aqueous binder, and liquid vehicle (e.g., an alcohol or water). The suspension is delivered to a nozzle which sprays droplets of the suspension with a gas flow assist. The liquid vehicle is evaporated from the droplets to form spherical agglomerates of the nanoparticles. The binder serves as one or more of an agglomerate promoter, an aggregate promoter, a chain promoter and a cluster promoter. Some spherical agglomerates are conveyed to the porous ceramic walls and lodge either on the surface of the porous ceramic walls (on, in, or over surface pores present on the walls), or in pores inside the porous ceramic walls (below the surface of the porous ceramic walls), or into contact with other previously deposited agglomerates which are disposed either in or on the porous ceramic walls, so as to form aggregates of spherical agglomerates therein, or thereon. Other spherical agglomerates come into contact with still other spherical agglomerates while being conveyed toward the honeycomb filter body so as to form aggregates of spherical agglomerates, wherein the aggregates are then conveyed toward the porous ceramic walls and the aggregates then lodge either on the surface of the porous ceramic walls (on, in, or over surface pores present on the walls), or in pores inside the porous ceramic walls (below the surface of the porous ceramic walls), or into contact with other previously deposited agglomerates or aggregates which are disposed either in or on the porous ceramic walls, so as to form aggregates of spherical agglomerates therein, or thereon.

Thus, according to one or more embodiments, the inorganic deposits are comprised of individual agglomerates of nanoparticles (e.g., spherical agglomerates of nanoparticles), aggregates of agglomerates, and/or porous clusters or chains of aggregates of spherical agglomerates, wherein some clusters or chains are disposed within pores in or below the surface of the porous ceramic wall, and/or wherein some clusters are disposed on the surface of the porous ceramic wall. In some embodiments, some of the porous clusters are porous clusters or cluster islands comprising exposed aggregates of agglomerates (e.g., spherical agglomerates). In some embodiments, the porous clusters or cluster islands comprise one or more chains of two or agglomerates, each chain extending in a substantially outward direction from the porous ceramic wall. In some embodiments, a plurality of the outwardly extending chains collectively provides a morphology resembling a member of the group consisting of fingers, tufts, sponges (e.g., a sea wool sponge) and fans. In some embodiments, at least one chain includes a free end of the chain projecting above the surface of the porous ceramic wall. In some embodiments, the inorganic material on the honeycomb body is present as inorganic deposits comprising a network of aggregated spherical agglomerates of inorganic material particles.

In embodiments, the loading of the inorganic material present on the honeycomb body in a range of from 0.3 to 30 g/L on the honeycomb body, such as in a range of from 1 to 30 g/L on the honeycomb body, or in a range of from 3 to 30 g/L on the honeycomb body. In other embodiments, the loading of the inorganic material is in a range of from 1 to 20 g/L on the honeycomb body, such as in a range of from 1 to 10 g/L on the honeycomb body. In specific embodiments, the loading of the inorganic material is in a range of from 1 to 9 g/L, 1 to 8 g/L, 1 to 7 g/L, 1 to 8 g/L, 1 to 5 g/L, 1 to 4 g/L, 1 to 3 g/L, 2 to 10 g/L, 2 to 9 g/L, 2 to 8 g/L, 2 to 7 g/L, 2 to 6 g/L, 2 to 5 g/L, 2 to 4 g/L, 3 to 10 g/L, 3 to 9 g/L, 3 to 8 g/L, 3 to 7 g/L, 3 to 6 g/L, 3 to 5 g/L, 4 to 10 g/L, 4 to 9 g/L 4 to 8 g/L, 4 to 7 g/L, or 4 to 6 g/L on the honeycomb body. Loading of the inorganic material is weight of added material in grams divided by the geometric part volume in liters. The geometric part volume is based on outer dimensions of the honeycomb filter body (or plugged honeycomb body).

In one or more embodiments, the particles of the inorganic material have a surface area in a range of from 5 $m^2/g$ to 15 $m^2/g$, 5 $m^2/g$ to 14 $m^2/g$, 5 $m^2/g$ to 13 $m^2/g$, 5 $m^2/g$ to 12 $m^2/g$, 5 $m^2/g$ to 12 $m^2/g$, or 5 $m^2/g$ to 10 $m^2/g$.

In one or more embodiments the inorganic material deposits on the honeycomb body are free from rare earth oxides such as ceria, lanthana and yttria. In one or more embodiments the inorganic material is free from catalyst, for example, an oxidation catalyst such as a platinum group metal (e.g., platinum, palladium and rhodium) or a selective catalytic reduction catalyst such as a copper, a nickel or an iron promoted molecular sieve (e.g., a zeolite).

In one or more embodiments, prior to heat treatment of the honeycomb body comprising inorganic material on or in or on and in the porous wall, the honeycomb body further comprises a water soluble binder, for example a water soluble silicon-containing binder, a water soluble silicate binder (e.g., metal silicate binder such as sodium silicate), a water soluble aluminate binder (e.g., metal aluminate binder such as sodium aluminate). In one or more embodiments, the binder is present in a range of from 5 wt % to 40 wt %, 5 wt % to 35 wt %, 5 wt % to 30 wt %, 5 wt % to 25 wt %, 5 wt % to 20 wt %, 5 wt % to 15 wt % or 5 wt % to 10 wt % based on the weight of the organic material on the honeycomb body. In one or more embodiments, the binder or binder material is provided by a precursor binder or precursor binder material. In one or more embodiments, the precursor binder or precursor binder material is silicon-containing. In one or more embodiments, the silicon-containing precursor binder is a silicone resin, or a siloxane, or an alkalisiloxane, or an alkoxysiloxane, or a silicate, e.g., an alkaline silicate or sodium silicate. In one or more embodiments, the silicon-containing precursor binder is comprised of an inorganic component and an organic component. In one or more embodiments, the silicon-containing precursor binder transitions to silica upon application of heat. In one or more embodiments, the silicon-containing precursor binder is comprised of an inorganic component and an organic component, and wherein upon application of heat the organic component is driven off and the inorganic component transitions to silica.

Figure 31A:
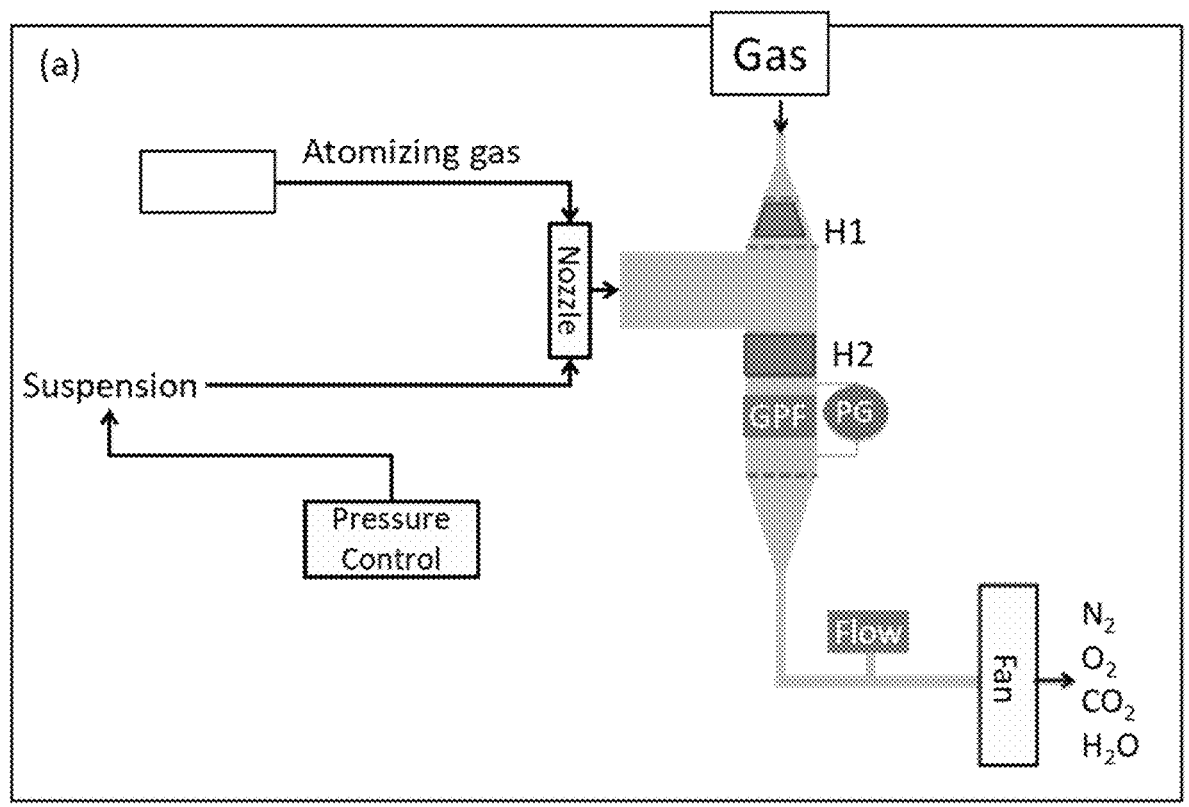
FIG. 31A schematically depicts an apparatus for depositing filtration material according to embodiments disclosed herein.

FIG. 31A shows a pressure control system which can be used to control agglomerate size when forming agglomerates to be deposited on a gasoline particulate filter, labeled as GPF in FIGS. 31A-D. In FIG. 31A, a pressure controller is in communication with a delivery conduit such as tubing or piping and a suspension of primary particles in a liquid is introduced into the delivery conduit, which is then flowed to the nozzle. In a separate line atomizing gas, which can be any suitable gas such as nitrogen, air, etc., is flowed to the nozzle to atomize the suspension in an appropriate nozzle as described further blow. The GPF is placed in an enclosure as shown in FIG. 31A, and the atomized suspension is directed through the GPF while a gas is flowed through the enclosure from one end. Heaters H1 and H2 heat the gas flowed from the one end of the enclosure and a pressure gauge, labelled as PG in FIGS. 31A-B measures pressure upstream and downstream from the GPF. A fan is placed downstream from the GPF in the enclosure and connected by conduit, and flow is monitored with a flow measurement device as shown in FIG. 31A. According to one or more embodiments, control of the pressure of the suspension delivered to the nozzle can control the agglomerate size formed during the process. The atomized suspension is deposited on one or more walls of the GPF as material, such as filtration material, which may be an inorganic layer comprised of primary particles and formed into agglomerates.

Figure 31B:
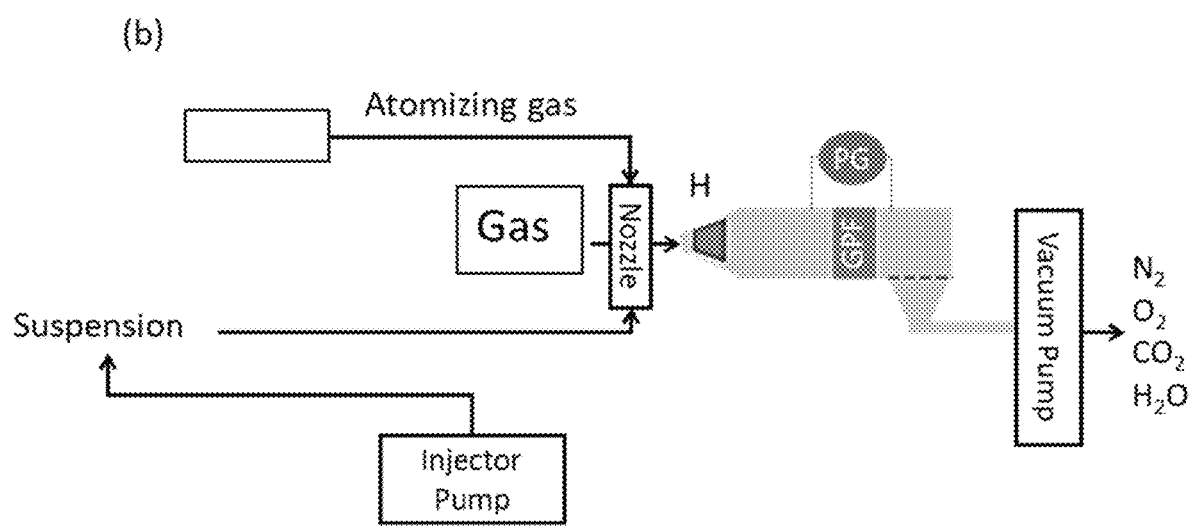
FIG. 31B schematically depicts an apparatus for depositing filtration material according to embodiments disclosed herein.

FIG. 31B shows an alternative system which uses flow control to control the agglomerate size. Flow control is provided with an injector pump, which delivers the suspension of primary particles in a liquid as shown through conduit to the nozzle as shown in FIG. 31B. Atomizing gas is flowed through a separate conduit as shown in FIG. 31B and the nozzle atomizes the suspension, which is delivered to the GPF as shown. A pressure gauge, labelled as PG in FIGS. 31A-B measures pressure upstream and downstream from the GPF. Heaters H1 and H2, which may be resistance heaters or other suitable heaters heat the gas delivered from a first end of the enclosure containing the GPF. A fan shown in FIG. 31B is connected to conduit in fluid communication with the enclosure containing the GPF and a flow monitor labelled as FLOW monitors flow rate provided by the fan. The atomized suspension is deposited on one or more walls of the GPF as material, such as filtration material, which may be an inorganic layer comprised of primary particles and formed into agglomerates.

Figure 31C:
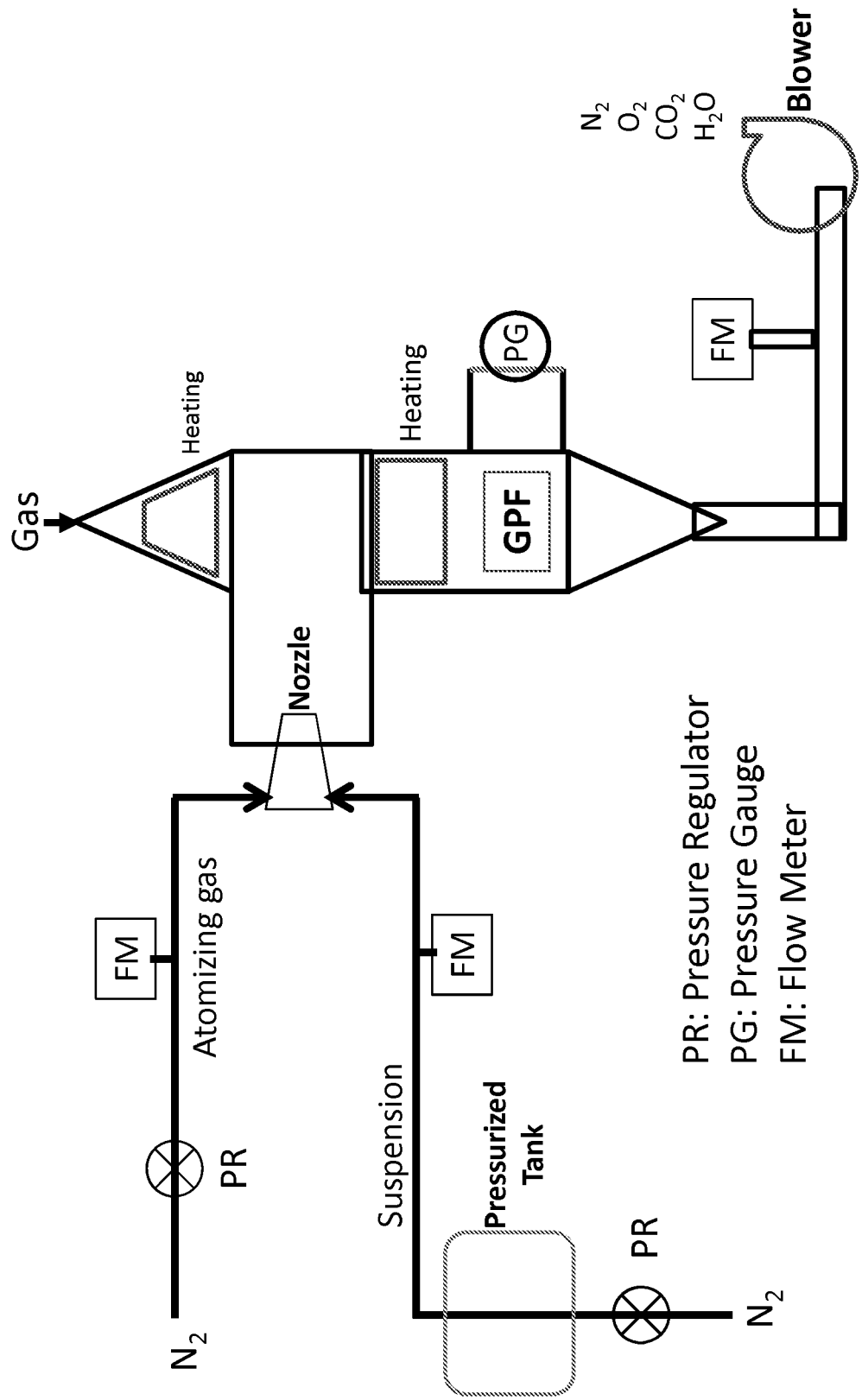
FIG. 31C schematically depicts an apparatus for depositing filtration material according to embodiments disclosed herein.

FIG. 31C shows another embodiment of a system for atomizing a suspension to deposit material on a GPF. Nitrogen gas or other suitable process delivers the gas through a conduit which is monitored by a pressure regulator and a flow meter monitors flow rate to the nozzle. In a separate conduit, nitrogen gas or any other suitable process gas is flowed, and a pressure regulator PR monitors pressure. A suspension of primary particles in a liquid is delivered to a nozzle, and flow is measured by a flow meter FM. Gas is delivered to an enclosure having heaters as shown upstream from the GPF in the enclosure. A pressure gauge measures pressure upstream and downstream from the GPF. A blower or fan is in fluid communication with the enclosure containing the GPF via conduit and a flow meter measures the flow in this conduit. The atomized suspension is deposited on one or more walls of the GPF as material, such as filtration material, which may be an inorganic layer comprised of primary particles and formed into agglomerates. It will be appreciated in FIG. 31C, the suspension is delivered in a downward direction. The atomized suspension is deposited on one or more walls of the GPF as material, such as filtration material, which may be an inorganic layer comprised of primary particles and formed into agglomerates.

Figure 31D:
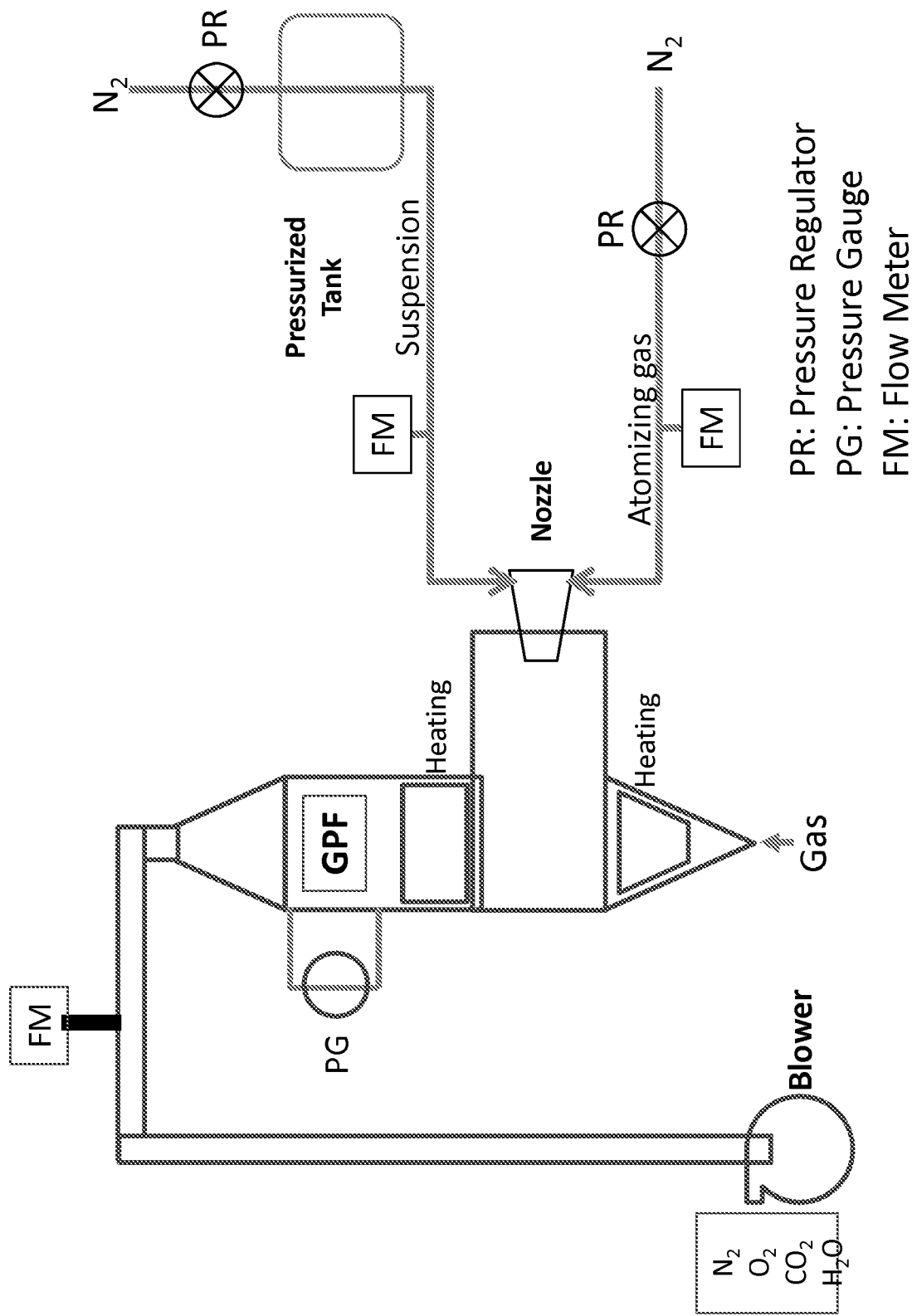
FIG. 31D schematically depicts an apparatus for depositing filtration material according to embodiments disclosed herein.

In FIG. 31D, the system is configured similarly to the system shown in FIG. 31C, except the flow of the suspension is delivered in an upward manner through the GPF as shown, and the blower connected to the enclosure containing the GPF flows gas downstream from the GPF.

In one or more embodiments, inorganic deposits on a honeycomb filter body create a filtration article that is water resistant. A formulation to deliver inorganic material of the inorganic deposits comprises a hydrophilic base material, an adhesion promoter and a surfactant. The hydrophilic base material of the dispersant examples was alumina, but the hydrophilic base material could be any metal oxide with similar attribute alone or in combination with others including alumina. Enhanced formulations with additional amounts of adhesion promoter and the use of surfactant are provided in the dispersant examples.

The articles made according to embodiments herein are highly water resistant, which can endure harsh water conditions repeatably without suffering detrimental filtration efficiency (FE) loss. Use of small molecule dispersants that can be adherent, non-adherent or a combination of both that when added to a slurry enhances the strength and durability of the applied material. These materials have a direct impact on the agglomerate formation such that changes in these compositional elements will reduce the loading amounts (g/L) required to attain the FE specification. Such organic additives can impact the morphology of the agglomerate, affecting the particle size distribution as the agglomerates form and potentially affecting its pore structure.

In some embodiments, addition of small molecule dispersants advantageously facilitates strength and durability of inorganic deposits and overall filtration article. Addition of the small molecule dispersants allows for a reduction in the material loading while maintaining a desired FE/dP specification. Addition of small molecular dispersants can promote the structure and uniformity of agglomerate composition.

Filtration articles according to embodiments herein are expected to survive various environmental conditions, e.g., those encountered in a vehicle's exhaust system, such as high velocity gas and the presence of a condensate (water) without losing an appreciable amount (>5%) of the filtration efficiency (FE). A slurry/aerosol process is a cost-effective and efficient way to adding inorganic materials to a honeycomb filter body, which followed by a sintering step, gives excellent durability.

According to one or more embodiments, addition of a binder (Dowsil 2405) to an aerosol mixture or slurry enhances the durability of a filtration article. Several materials have been identified that were both adherent and non-adherent.

EXAMPLES

Embodiments will be further understood by the following non-limiting examples.

Wall-flow filters. The diameter and length of the wall-flow filter substrates used in the examples were 4.055" and 5.47". The CPSI and wall thickness were 200 and 8 mils. The pore size was 14 μm.

Raw Materials. Unless specified otherwise in the examples, the following raw materials were used. The inorganic material being deposited was alumina, the atomizing gas was nitrogen, and a binder was present. The carrier gas was either air or nitrogen.

Raw Material Utilization. Raw material utilization was determined by determining the weight gain of the honeycomb and comparing that to a calculated amount of ceramic put into the process. For example, if the weight gain was equal to the amount of ceramic put into the process, then the utilization was calculated as 100%; or if the weight gain were only one half of the of ceramic put into the process, the utilization was calculated to be 50%.

According to one or more embodiments, a honeycomb filter body comprising inorganic deposits disposed within the honeycomb filter body to create a filtration article is characterized according to the following tests unless specified otherwise or otherwise modified in the examples.

Smoke Filtration Efficiency (FE)

The smoke filtration efficiency performance of the deposited inorganic material disposed within the honeycomb filter bodies was evaluated using a smoke filtration test.

The filtration efficiency (in percent %) is calculated as:

$$FE = \left(1 - \frac{c_{outlet}}{c_{inlet}}\right) * 100,$$

where C is the smoke concentration on the outlet and inlet side of the part, respectively.

Two particle counter units (Lighthouse 2016, USA) are used simultaneously at upstream and downstream positions with respect to the article at the underfloor position of a dilution chamber. A cigarette is lit in a smoke generator to provide desired quantity of soot particles into the dilution chamber and the concentration is maintained at a certain level (500,000 particles/cm$^3$) before the smoke travels into the inlet side of the tunnel. The flow is driven by a blower which carries the soot particles through the tunnel and eventually into the wall flow filter parts. When the concentration at upstream of GPF reaches a stable state, the two particle counters reset to begin counting for 60 seconds and filtration efficiency (FE) was calculated based on the differential of total particle count of 0.3 μm and above. The pressure drop (dP) measured by pressure gauges located upstream and downstream from the article is also recorded at a fixed flow of 51 Nm$^3$/hr.

Pre-Test Canning. During pre-test canning, an article is wrapped in a ceramic fiber mat material and then placed into a metal can. The article, mat and can assembly are heated in an oven to 650° C. and held at 650° C. for a duration. The mat expands to help hold the article in place within the can. This process is referred to as mat popping as the mat expands, it "pops" inside the can to fit the article in place. The duration of the pre-test canning is chosen based on the subsequent test being conducted.

Post-Test Cleanout. After a test is conducted, the following steps are completed to achieve post-test cleanout of the article. The article, mat and can assembly are placed in an oven at 650° C. and held at 650° C. for a duration, usually about 6 hours so that the soot that was loaded into the article is burned out of the article.

Clean Filtration Efficiency

As used herein, the "clean filtration efficiency" of a honeycomb body or filtration article refers to a new or regenerated honeycomb body that does not comprise any measurable soot loading. In embodiments, the clean filtration efficiency of the honeycomb body or filtration article is greater than or equal to 70%, such as greater than or equal to 80%, or greater than or equal to 85%. In yet other embodiments, the initial filtration efficiency of the honeycomb body or filtration article is greater than 90%, such as greater than or equal to 93%, or greater than or equal to 95%, or greater than or equal to 98%.

As used herein, "Clean Filtration Efficiency Test" refers to testing an article as follows.

After pre-test canning for 6 hours, an air stream is supplied by a blower upstream of the article at a ramped rate, and clean pressure drop is measured across the filter using a differential pressure sensor/gauge at room temperature (about 25° C.). The flow rate of the air stream was ramped from 25.5 m$^3$/h to 356.8 m$^3$/h over 10 step increases, where the flow rate was maintained for one minute at each new step increase. Each step increase was in a range of about 8 to 68 m$^3$/h. Next, an air stream containing soot particles at a concentration of 8 mg/m$^3$ and a flow rate of 22.5 m$^3$/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article before and after exposure to the flow conditions. After the clean filtration efficiency is measured, post-test cleanout is conducted for 6 hours.

Water Exposure Tests

Several assessment protocols for understanding the durability of the filtration articles disclosed herein were utilized. Analysis of impact of water exposure of varying intensities on honeycomb filter bodies having aerosol-deposited inorganic material is an indication of the durability of the filtration articles.

Water Soak Test

As used herein, "Water Soak Test" refers to testing an article as follows.

To simulate conditions where a vehicle exhaust pipeline has seen incoming water source in an underfloor condition, the water soak test was conducted.

An article is first measured for baseline FE/dP measurement by the clean filtration efficiency test.

Next, the article is weighed at 75° C. to determine an initial weight. The article is then placed on its side in a petri dish, skin layer side, to simulate an underfloor position of the filter in a vehicle exhaust system and soaked in a quantity of deionized water for 2 hours. After the part soaks up water to a target amount, it is dried at 75° C. until completely dry (weight goes back to as-deposited state). The target quantity of water may be premeasured. For example, nominally 300 grams of water may be used. In one or more embodiments, there is a water absorption level that can be described as a percentage of a distance along a diameter of the article face the water absorbed, e.g., ½ to ¾ of a filter diameter. The article is then dried in a furnace for 5-6 hours at 100° C. until the initial weight is achieved. Next, clean filtration efficiency is measured. For evaluating clean filtration efficiency, an air stream containing soot particles at a concentration of 8 mg/m$^3$ and a flow rate of 22.5 m$^3$/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article. After the filtration efficiency is measured, post-test cleanout is conducted for 6 hours. Filtration efficiency at 0 g/L soot is compared before and after the article is exposed to the water soak test.

Water Immersion Test

Another method for evaluating durability of a filtration article is the water immersion test, where a part is completely soaked in water to imitate the worst case scenario where an exhaust pipeline is submerged in water.

As used herein, "Water Immersion Test" refers to testing an article as follows.

An article is first measured for baseline FE/dP measurement by the clean filtration efficiency test.

Next, the article is weighed at 75° C. to determine an initial weight. The article with inlet end face down is slowly immersed into a vessel of water over a duration of time. The quantity of water depends on the size of the article in order to fully immerse the article. The sample remains still in the water for 1 minute and then is slowly removed from the water and allowed to sit for 2 hours. The article is weighed. Then the filter is dried in a furnace for 5-6 hours at 100° C. until the initial weight is achieved. Another clean filtration efficiency measurement is conducted to evaluate the filtration efficiency change after exposure to water.

Water Nebulizer Test

As used herein, "Water Nebulizer Test" refers to testing an article as follows. The article is placed in a can which contains a bladder. The bladder is inflated with air to hold the filter in place. Next, clean pressure drop is measured across the filter using a differential pressure sensor/gauge at room temperature (about 25° C.). The flow rate of the exhaust gas upstream from the assembly is ramped from 25.5 Nm$^3$/h to 356.8 Nm$^3$/h over 10 step increases, where the flow rate was maintained for one minute at each new step increase. Each step increase is in a range of about 8-68 Nm$^3$/h. Next, filtration efficiency is measured at 30° C., with the exhaust flow rate at 21 Nm$^3$/h and 120 nm median particle diameter soot particles at a concentration of 8.5 mg/m$^3$ introduced upstream of the filter using a propane burner for 45 minutes. Particle mass and particle number is measured upstream and downstream of the filter using a AVL microsoot sensor and TSI Engine Exhaust Particle Sizer (EEPS), respectively. After the filtration efficiency is measured, the article is removed from the can and placed in an oven at 650° C. and held at 650° C. for 9 hours so that the soot that was loaded into the article was burned out of the honeycomb.

The article is weighed at room temperature. The article is exposed to a fine mist or spray of water using a nebulizer or atomizer as described in U.S. Pat. No. 7,520,918 until the part is exposed to 15 g/L of water. Next the article is dried in an oven using 250° C. for 3 hours. Then, the article and can assembly are tested for filtration efficiency at 21 Nm$^3$/hr at 30° C. and 8.5 mg/m$^3$ and the filtration efficiency at 0 g/L soot is compared to that measured before the 650° C. heat treatment and nebulizer water exposure. Then, a cleanout procedure is performed on the article in an oven at 650° C. for 12 hours. The filter is then removed from the can and exposed to a fine mist or spray of water using a nebulizer or atomizer as described in U.S. Pat. No. 7,520,918 until the part was exposed to 15 g/L of water. Next the article is dried in an oven using 650° C. for 9 hours. Then, the article and can assembly are tested for filtration efficiency at 21 Nm$^3$/hr at 30° C. and 8.5 mg/m$^3$. Filtration efficiency at 0 g/L soot measured after the second nebulizer water exposure is compared to the baseline filtration efficiency at 0 g/L soot prior to the first 650° C. heat treatment and nebulizer water exposure.

High Flow Test

As used herein, "High Flow Test" refers to testing an article as follows.

An article is first measured for baseline FE/dP measurement by the clean filtration efficiency test.

Thereafter, high flow is introduced to the article. The flow rate of the exhaust gas upstream from the assembly is ramped from 85 m$^3$/h to 850.8 m$^3$/h over 10 step increases at about 25° C., where the flow rate was maintained for one minute at each new step increase. Each step increase was in a range of about 85-170 m$^3$/h. Next, an air stream containing soot particles at a concentration of 8 mg/m$^3$ and a flow rate of 22.5 m$^3$/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article before and after exposure to the flow conditions. After the filtration efficiency is measured, post-test cleanout is conducted for 6 hours. Filtration efficiency at 0 g/L soot is compared before and after the article is exposed to the high flow test.

Soot Loaded Pressure Drop Test

After pre-test canning for 6 hours, soot is loaded into the article with a flow rate of an exhaust gas upstream from the assembly ramped from 25.5 m$^3$/h to 356.8 m$^3$/h over 10 step increases at about 25° C., where the flow rate was maintained for one minute at each new step increase. Each step increase was in a range of about 8-68 m$^3$/h. Soot loading was increased from 0 g/L to 3 g/L. A soot loaded pressure drop is measured across the filter using a differential pressure sensor/gauge at room temperature (about 25° C.) after the filter is loaded with soot. After the soot loaded pressure drop was measured, post-test cleanout is conducted for 6 hours.

Cold Vibration Test

An article is placed on a shaker table which vibrates in 2 directions and is vibrated at 706 m/s$^2$, 200 Hz for 2 hours along the longitudinal and cross-sectional axis.

Vehicle Test

A canned article is installed on a vehicle which is driven on the highway simulating acceleration followed by a "fuel cut," or reduction in speed. The article experiences short pulses of high temperature and high flow rate 5 times targeting 1000 m³/h for 30 seconds or more.

Example 1

An aqueous-based suspension was prepared using Ceramabind™ 880 binder, Allied 0.3 μm alumina suspension as an inorganic material for the suspension. Ceramabind™ 880 purchased from Aremco is high temperature, water-dispersible silicone resin. It cures at 232° C. in 1 hour or 249° C. in 45 minutes. It has a pH=6.5 and a solids content of 50% by weight. Allied 0.3 μm alumina suspension purchased from Allied High Tech has median particle size of 0.3 μm or 300 nm. It contains 18.2% alumina and 81.8% distilled water by weight. It has pH=9 and is fully miscible in water. In this example, four dilute alumina suspensions were prepared with dilution of as-received Allied 0.3 um alumina suspension with deionized (DI) water followed by addition of different amounts of Ceramabind™ 880. All four samples had the same alumina concentration of 3% but different concentrations of the binder, 10%, 30%, 50%, and 100% by weight of alumina, respectively. The pH value was measured for each sample as listed in Table 1. The stability of the suspension with 10% binder was acceptable, and the sample showed no clear separation for 1-2 hours. The other suspension samples with more binder had good stability, and the samples showed no clear separation for more than 4 hours. The tape test showed that the samples with addition of binder up to 50% did not pass the test, and the sample with 100% binder passed the test. However, the tape test is not considered to be a definitive test as to whether the suspension will work in the manufacture of a honeycomb filter body.

TABLE 1

Ceramabind ™ 880 and Allied 0.3 um alumina suspension

| Sample ID | 1-C | 1-D | 1-F | 1-G |
|---|---|---|---|---|
| Binder concentration (by wt % of alumina) | 10% | 30% | 50% | 100% |
| Alumina concentration, wt % | 3.1% | 3.1% | 3.2% | 3.2% |
| pH value | 8.0 | 8.0 | 7.9 | 7.7 |
| Stability of suspension | OK | Good | Good | Good |
| Tape test | Failed | Failed | Failed | Passed |

Example 2

An aqueous-based suspension was prepared comprising a suspension of BINDZIL 9950 colloidal silica and Sky Spring alumina powder. The binder BINDZIL 9950 colloidal silica was purchased from AkzoNoble contains 50% of silica in water with colloidal particles in sizes in a range of 10-20 nm. It has a pH=9 and a specific surface area of 80 m²/g. SkySpring alpha-alumina powder purchased from SkySpring Nanomaterials, Inc. has average alumina particle size of 150 nm and specific surface area of 10 m²/g. In this example, 5 dilute alumina suspensions were prepared by mixing SkySpring alumina powder with DI water followed by addition of different amounts of BINDZIL 9950 colloidal silica. All 4 samples had the same alumina concentration of 10% but different concentrations of the binder, 20%, 30%, 50%, and 100% by weight of alumina, respectively, as listed in Table 2. The stability of the suspensions was good and the samples kept no clear separation for more than 4 hours. The tape test showed that the samples with addition of binder up to 50% didn't pass the test, and the sample with 100% binder barely passed the test.

TABLE 2

BINDZIL 9950 colloidal silica and Sky Spring alumina powder

| Sample ID | 5-D | 5-E | 5-B | 5-C |
|---|---|---|---|---|
| Binder concentration (by wt % of alumina) | 20% | 30% | 50% | 100% |
| Alumina concentration, wt % | 10% | 10% | 10% | 10% |
| Stability of suspension | Good | Good | Good | Good |
| Tape test | Failed | Failed | Failed | Barely passed |

Example 3

An ethanol-based aerosol deposition experiment was performed on the same type of wall-flow filter substrates used in Examples 1 and 2.

150 nm $Al_2O_3$ of an ethanol suspension (30 wt. % solids, Beijing Dk Nano technology Co. LTD http://www.nanoinglobal.com/en/ProductShow.asp?ID=189) was diluted to 11 wt. % by ethanol (AR, Sinopharm Group Co. LTD). Dowsil 2405 was added as binder.

A two-phase fluid nozzle (¼J-SS+SU11-SS, Spraying Systems Co.) was used to atomize the solution. The atomizing gas was nitrogen at 91.5 psi, and the liquid atomizing speed was 18 ml/min.

The droplets were dried in the deposition chamber as shown in FIG. 4. The gas flow and the droplets were heated up by the heaters placed around the chamber. The setting temperatures were 350° C., 350° C. and 120° C. for the heat sources 906a, 906b and 906c as shown in FIG. 4.

The flow was driven by a fan (TBR R11Q CL.HP from Twin city fan (Shanghai) Co. Ltd.) at 2518 RPM. The total flow rate was 21.5 Nm³/h. Additional air was sucked in the system to make up the total flow required. The final $Al_2O_3$ loading was 4.4 g/part. After deposition, the parts were cured at 200° C. for one hour.

Next, 300 nm median cigarette smoke particulate was used to measure the filtration efficiency. The upstream concentrations were 500,000 particles over 30 seconds which is equal to approximately 353 particles/cc with a 0.1 cfm flow rate into a Lighthouse Handheld 3016 particle counter. The particle number was collected for 30 seconds upstream and 30 seconds downstream. The total test was completed in about 1-2 minutes. The air velocity was 51 m³/h. The filtration efficiency was calculated based on reduction of particulate number concentration at downstream. The pressure drop was measured at the same flow rate by differential pressure gauge. The filtration efficiency was 80% and the pressure drop was 195 Pa.

Example 4

Aqueous-Based Aerosol Deposition Experiments on a Wall-Flow Filter.

Two kinds of $Al_2O_3$ aqueous suspensions were used. One suspension was Allied 0.3 μm alumina suspension, and the other was 0.15 μm alumina suspension (30 wt. % solids, Beijing DK Nano technology Co. LTD http://www.nanoinglobal.com/ProductShow.asp?ID=189). The suspension was diluted with DI water and mixed with binder to form a solution composition as shown in Table 3.

A two-phase fluid nozzle (¼J-SS+SU11-SS, Spraying Systems Co.) was used to atomize the solution. The atomizing gas was nitrogen, the liquid pressure was adjusted to achieve liquid flow rate at about 10 ml/min as listed in Table 3. The droplet was dry in the deposition chamber as shown in FIG. 1. The gas flow and the droplets were heated up by the heaters placed around the chamber. The setting temperatures of for the heat sources 906a, 906b and 906c as shown in FIG. 4 were 350° C., 350° C. and 300° C. The flow was driven by a fan (TBR R11Q CL.HP from Twin city fan (Shanghai) Co. Ltd.) at the RPM of 2518. The total flow rate was 21.5 Nm³/h. Additional air was sucked in the system to make up the total flow required.

Figure 12:
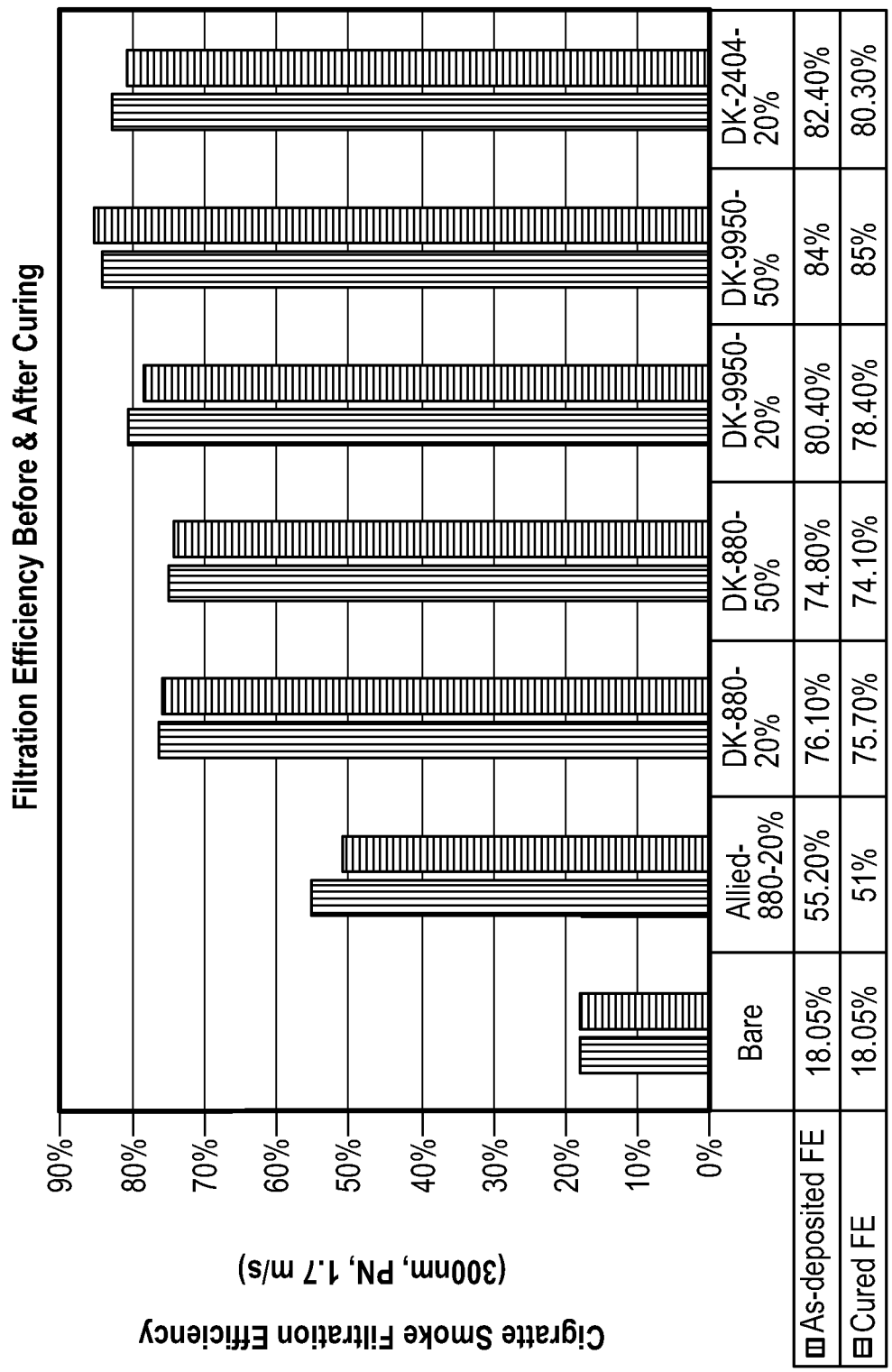
FIG. 12 is a graph showing filtration efficiency before and after curing for various samples prepared according to embodiments disclosed herein.
Figure 13:
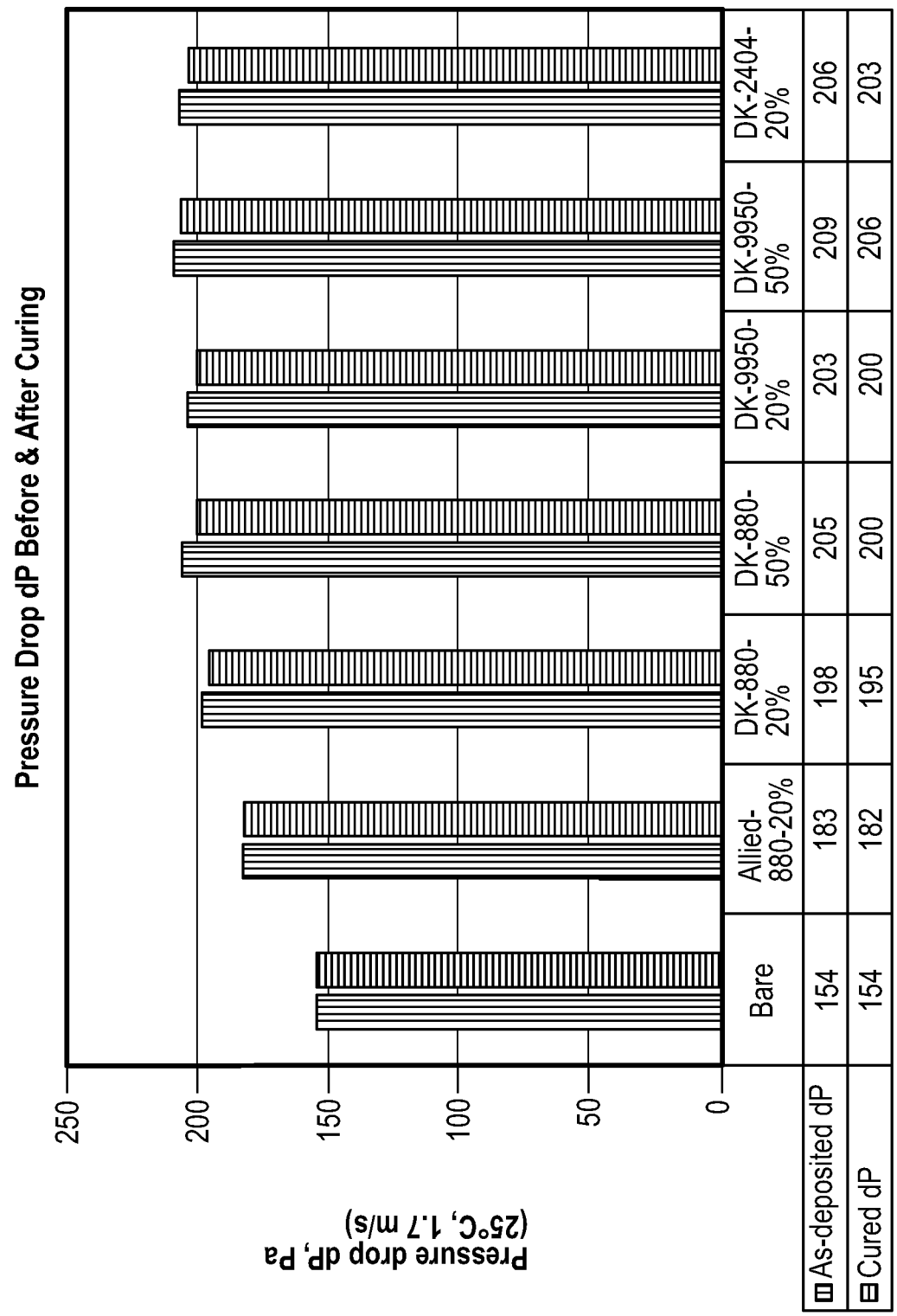
FIG. 13 is a graph showing pressure drop before and after curing for various samples prepared according to embodiments disclosed herein.
Figure 14B:
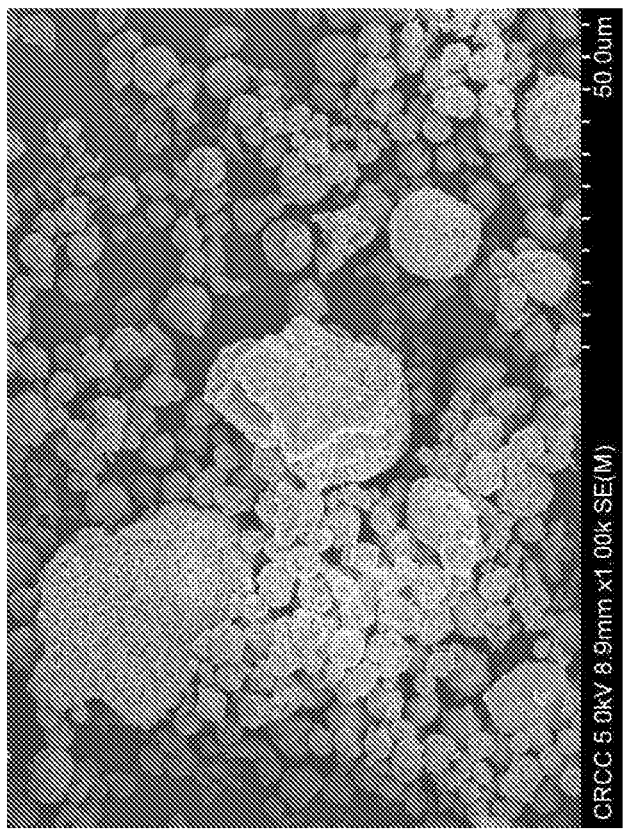
FIG. 14B is an SEM photograph showing alumina agglomerates generated from an aqueous-based suspension (Allied-880-20%)
Figure 14A:
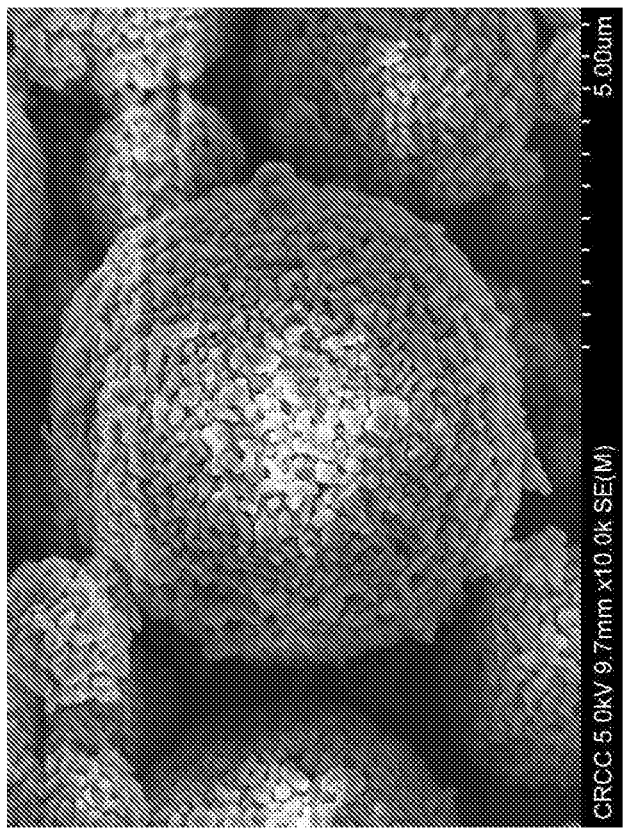
FIG. 14A is an SEM photograph showing alumina agglomerates generated from ethanol-based suspension (DK-2405-5%)
Figure 14D:
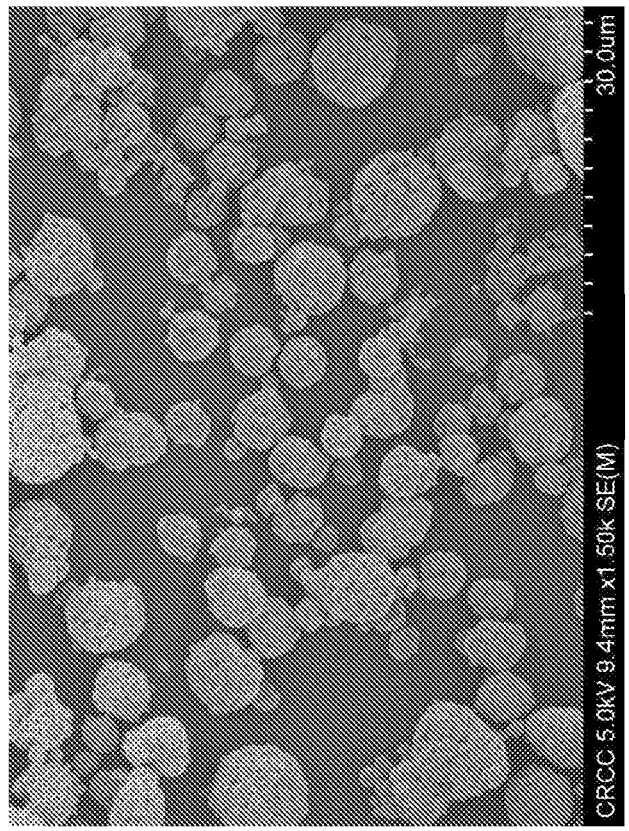
FIG. 14D is an SEM photograph showing alumina agglomerates generated from an aqueous-based suspension (DK-880-50%)
Figure 14C:
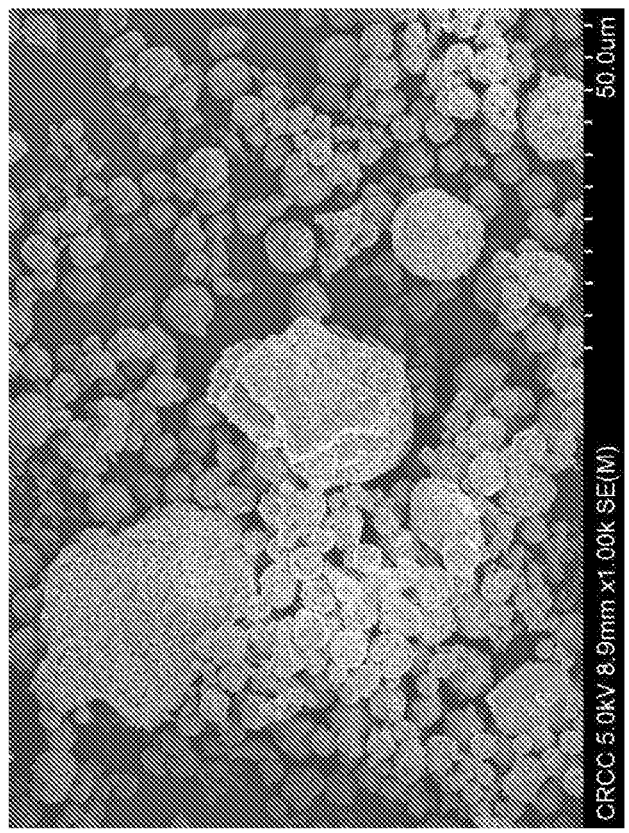
FIG. 14C is an SEM photograph showing alumina agglomerates generated from an aqueous-based suspension (DK-880-20%)
Figure 14F:
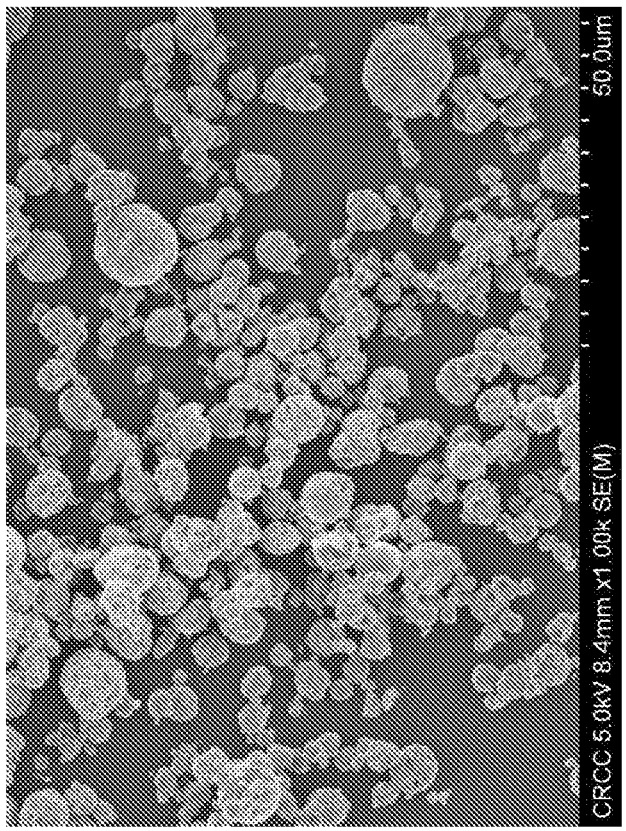
FIG. 14F is an SEM photograph showing alumina agglomerates generated from an aqueous-based suspension (DK-2404-20%)
Figure 14E:
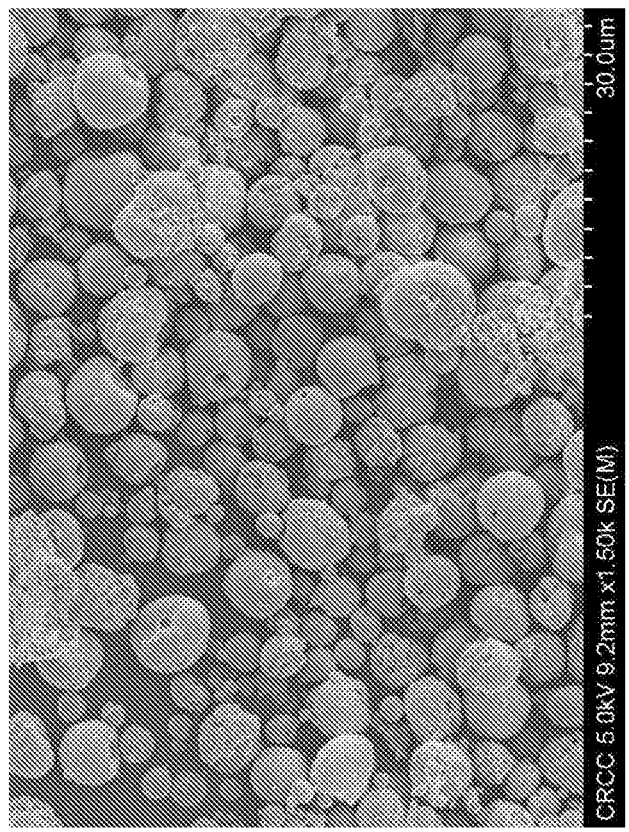
FIG. 14E is an SEM photograph showing alumina agglomerates generated from an aqueous-based suspension (DK-9950-50%)

After deposition, the parts were cured for 1 hour at temperature listed in table 3. Filtration efficiency was measured using 300 nm median particle size cigarette smoke particulate. The procedure was described above, and the FE and dP comparison are illustrated in FIGS. 12 and 13. All of the samples had higher filtration efficiency compared to the uncoated honeycomb body. There were few differences before and after cure.

ated agglomerates that were less than 10 μm, similar to the ethanol based process (e.g, DK-2405-5%). The agglomerate sizes were controlled for the aqueous-based samples made using the DK binders, especially the samples made by DK suspensions through adjusting batch formulation (such as lowering alumina concentration) and atomization conditions (such as lowering liquid flow rate).

Example 5

Sodium silicate solution purchased from Sigma-Aldrich is reagent grade and contains about 10.6% $Na_2O$ and about 26.5% $SiO_2$. It has density of 1.39 g/mL at 25° C. and a pH value of 12.9. An alumina suspension purchased from Beijing DK Nano technology Co. LTD ("DK suspension") has a solid concentration of 21.7% and pH of about 9 and alumina nanoparticles of around 150 nm in size. Seven samples were prepared by mixing 5 grams of the DK suspension with different quantities of sodium silicate solution as shown in Table 1, followed by Vortex mixing for 10 seconds at a speed of 3000 rpm. The resulting suspensions were applied on glass slides to form a thin layer coating

TABLE 3

Alumina aerosol depositing and curing conditions

| Sample ID | $Al_2O_3$ suspension | Solid content of $Al_2O_3$ (wt %) | Binder Composition | Binder Loading vs $Al_2O_3$ (wt %) | Atomization $N_2$ pressure (psi) | Atomization Liquid flow rate (g/min) | Loading (g/part) | Cure Temp and Time |
|---|---|---|---|---|---|---|---|---|
| DK-2405-5% | DK 0.15 um (ethanol-based) | 11% | Dow sil 2405 | 5% | 91.5 | 18 | 4.4 | 200° C.*1 h |
| Allied-880-20% | Allied 0.3 um (aqueous-based) | 5% | Ceramabind™ 880 | 20% | 91.5 | 10 | 7.0 | 230° C.*1 h |
| DK-880-20% | DK 0.15 um (aqueous-based) | 5% | Ceramabind™ 880 | 20% | 92.5 | 10 | 5.5 | |
| DK-880-50% | DK 0.15 um (aqueous-based) | 5% | Ceramabind™ 880 | 50% | 90.9 | 12 | 6.0 | |
| DK-9950-20% | DK 0.15 um (aqueous-based) | 5% | BINDZIL 9950 | 20% | 91.6 | 10 | 4.7 | 250° C.*1 h |
| DK-9950-50% | DK 0.15 um (aqueous-based) | 5% | BINDZIL 9950 | 50% | 91.5 | 10 | 5.5 | |
| DK-2404-20% | DK 0.15 um (aqueous-based) | 5% | Dow Corning® IE-2404 | 20% | 92.4 | 11 | 4.7 | 200° C.*1 h |

FIGS. 14A-D show SEM images of the morphology of alumina agglomerates formed from ethanol-based and aqueous-based suspensions. The aqueous-based process generfollowed by a thermal drying step. The tape test showed that the samples without or with 5.1% binder didn't pass the test, and the samples with 7.7% or more binder passed the test.

TABLE 4

Binder test on sodium silicate for DK alumina suspension

| Sample ID | #8-1 | #8-2 | #8-3 | #8-4 | #8-5 | #8-6 | #8-7 |
|---|---|---|---|---|---|---|---|
| 21.7% DK aqueous suspension, g | 5.01 | 5.01 | 5.06 | 5.05 | 5.05 | 5.01 | 5.01 |
| Sodium silicate solution, g | 0 | 0.15 | 0.23 | 0.29 | 0.38 | 0.38 | 0.78 |

TABLE 4-continued

Binder test on sodium silicate for
DK alumina suspension

| Sample ID | #8-1 | #8-2 | #8-3 | #8-4 | #8-5 | #8-6 | #8-7 |
|---|---|---|---|---|---|---|---|
| Binder concentration (by wt % of alumina) | 0% | 5.1% | 7.7% | 9.8% | 12.9% | 13.1% | 26.6% |
| Tape test | Failed | Failed | Passed | Passed | Passed | Passed | Passed |

Example 6

A series of aqueous-based aerosol deposition experiments was performed on wall-flow filters. The wall-flow filters had a diameter of 4.055 inches (10.3 cm), length of 5.47 inches (13.9 cm), cells per square inch (CPSI) of 200, wall thickness of 8 mils (203 µm), and average pore size of 14 µm. The same 0.15 µm alumina suspension (21.7 wt. % solids, Beijing DK Nano technology Co. LTD http://www.nanoinglobal.com/en/ProductShow.asp?ID=189) was used for each sample shown in Table 5. The suspension was diluted with DI water and mixed with binder to form a solution composition as shown in Table 5.

A two-phase fluid nozzle (2050/70, ¼J-SS+SU11-SS, Spraying Systems Co.) was used to atomize the suspension and the atomizing gas was nitrogen. The suspension was delivered to the nozzle at a flow rate of 10 ml/min by a syringe pump as listed in Table 5.

The droplets were formed and dried into alumina agglomerates in the deposition chamber as shown in FIG. 3. A heat source 606 in the form of electrical resistance heating tapes was positioned in the evaporation section 653 before the outlet end 625. The drying gas was heated to 220° C. by the heating transmitter and the chamber mixing temperature was maintained at 120° C. to evaporate water, while chamber surface heating tapes were set at 130° C. Gas flow was driven by a fan (TBR R11Q CL.HP from Twin city fan (Shanghai) Co. Ltd.) at a RPM of 2518. The total flow rate is 40 Nm³/h. Additional air was sucked in the system to make up the total flow required. After deposition, the parts were then thermally treated at the different temperatures in the range of 250° C. to 1100° C. for 1 hour.

TABLE 5

Suspension composition and deposition process parameters used for making one set of embodiments of filters by ethanol-based process and aqueous-based process.

|  | Ethanol-based | Aqueous-based |
|---|---|---|
| Alumina solids loading wt. % | 11% | 5% |
| Binder | 2405 | sodium silicate |
| Binder concentration wt. % (vs. Alumina) | 15% | 10%~30% |
| Suspension flow rate (ml/min) | 10 | 10 |
| Atomizing gas flow rate (Nm³/h) | 5.00 | 5.00 |
| Total carrier gas flow (Nm³/h) | 40 | 40 |
| Heating transmitter setting temperature (° C.) | 220 | 220 |
| Chamber surface heating tape setting temperature (° C.) | 130 | 130 |

Figure 15B:
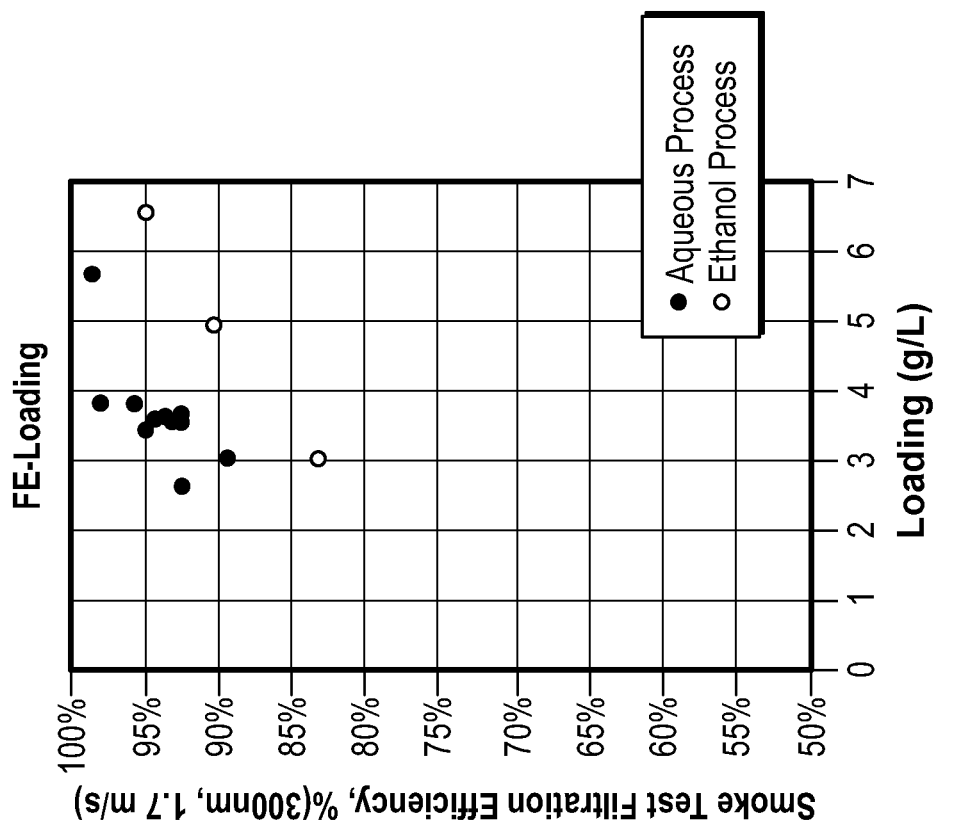
FIG. 15B is a graph showing an aqueous process and ethanol-based process in terms of FE versus deposit loading for various samples prepared according to embodiments disclosed herein.
Figure 15A:
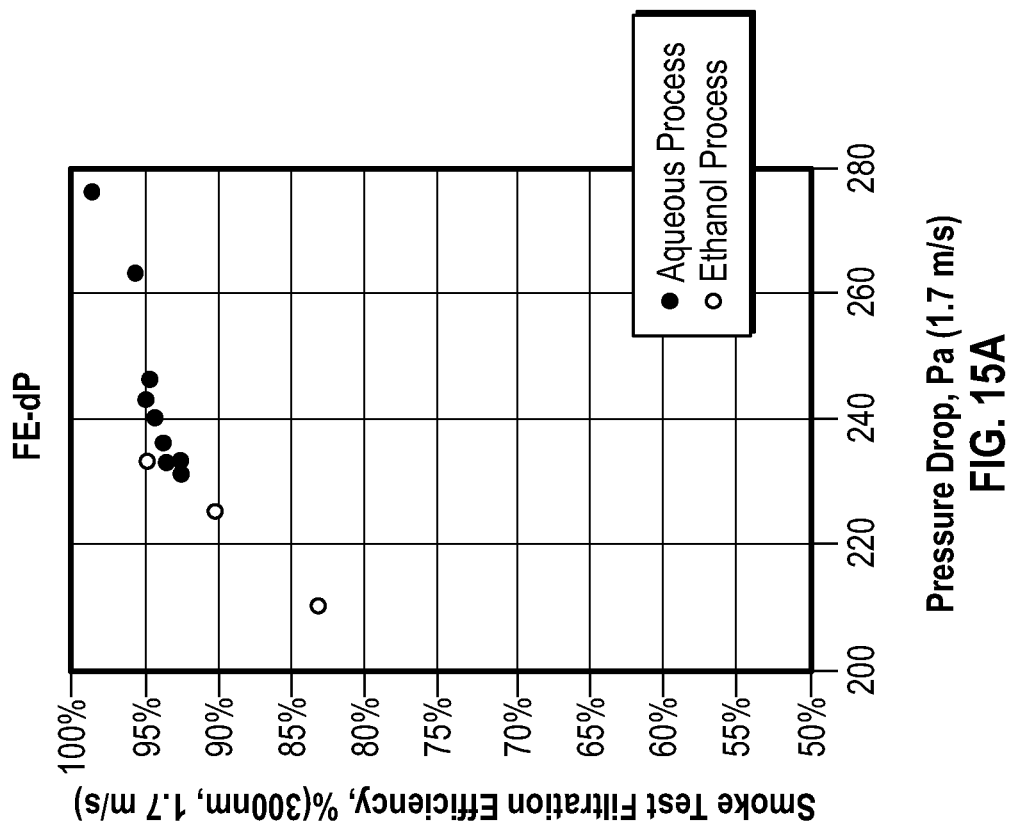
FIG. 15A is a graph showing an aqueous process and ethanol-based process in terms of FE/dP performance for various samples prepared according to embodiments disclosed herein.

Filtration efficiency was tested with 300 nm median particle size cigarette smoke particulate. The procedure was described above, and the FE vs. dP and FE vs. Loading are illustrated in FIG. 15A and FIG. 15B. All of the samples had higher filtration efficiency compared to the uncoated wall-flow filter. There were differences for the samples before and after cure. The pressure drop penalty was comparable with ethanol-based process at similar filtration efficiency level.

A two-stage water resistance test was performed using a two-stage water nebulization test and full water immersion FE/dP performance was measured before and after mist soaking or full water immersion followed by full drying. The water nebulization test was conducted in such way that deposited channels faced the flow of mist so deposited agglomerates directly contact water droplets (mist) and suction and keep the water droplets in the pores due to pore capillary force. The two-stage water nebulization test included a first stage with 15-20 g water takeup and a second stage with 60-70 g water takeup if the first stage test passed. The full water immersion test was conducted by fully immersing the filter into a tank of water for several minutes and water takeup was at least 300 g for the substrates.

FIGS. 15A and 15B show performance of parts with deposits from the aqueous-based process and from the ethanol-based process in terms of FE/dP performance as well as FE as a dependence of deposit loading. The suspension and processing conditions are compared in Table 5. FIG. 15A shows similar FE-dP trend for the two processes. FIG. 15B indicates that at the same deposit loading, the aqueous process gave higher FE value. As an example, a 3 g/L loading of deposits, the aqueous-based process produced 90% FE, while ethanol-based process resulted in 84% FE.

Figure 16B:
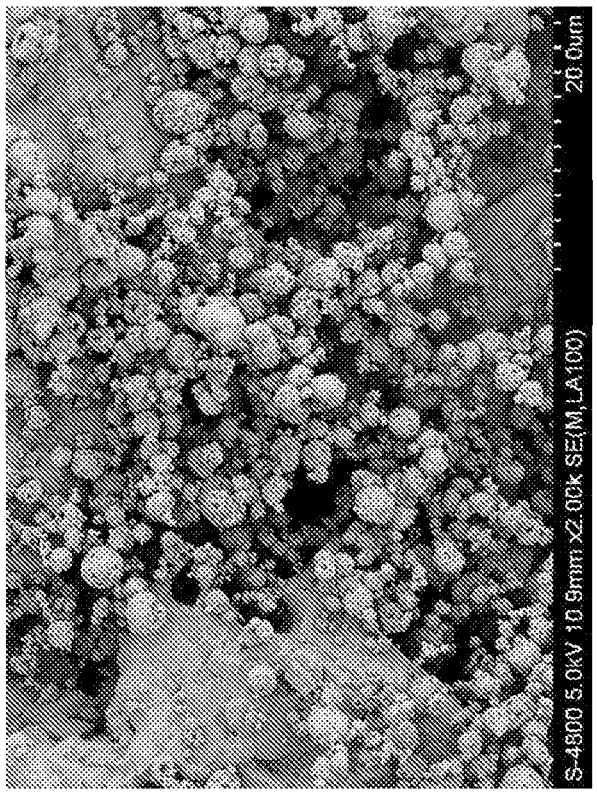
FIG. 16B is an SEM photograph showing alumina agglomerates generated from an aqueous-based suspension and deposited on a porous ceramic wall.
Figure 16A:
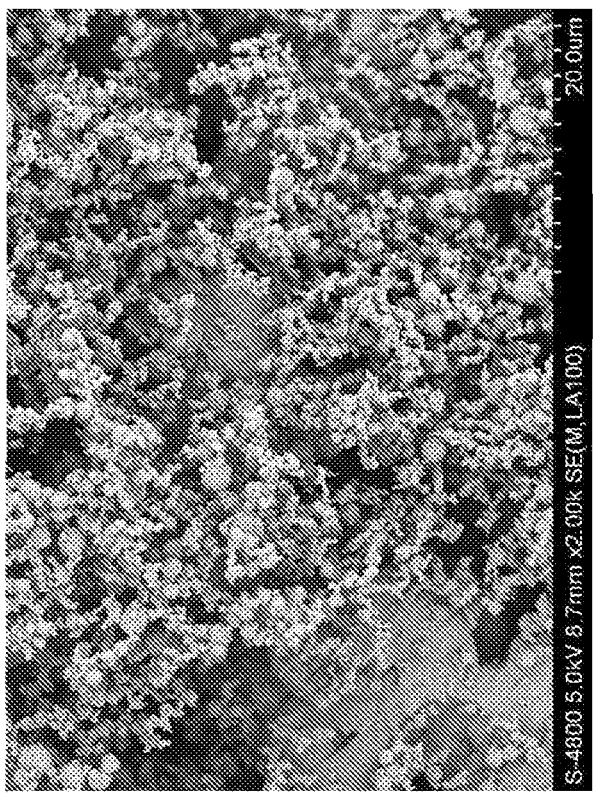
FIG. 16A is an SEM photograph showing alumina agglomerates generated from ethanol-based suspension.

FIGS. 16A and 16B show morphology and size of alumina agglomerates formed on the surface of wall-flow filter for the aqueous-based process deposits and ethanol-based process. It can be seen that aqueous-based process forms a deposit microstructure of packed spherical agglomerates with some partially penetrating into pores of the honeycomb wall.

For these specific examples and these specific process conditions, another difference that was observed is that aqueous process led to larger agglomerates than ethanol-based process. As shown in FIG. 16B, the agglomerate sizes respectively were 1.72 um and 1.78 µm for ethanol-based process and aqueous process. However, further experimentation with fluid flows (gas and suspension) and nozzle design changes indicated that similar agglomerate sizes could be achieved between the two processes.

Table 6 lists FE/dP performance of filters made with different quantities of sodium silicate binder, 10 wt %, 20 wt %, and 30 wt %, respectively.

TABLE 6

As-deposit FE/dP performance of the filter parts made with 10%, 20%, and 30% sodium silicate binder (by weight of alumina)

|  | Aluminum conc. | Binder conc. | Chamber temp. ° C. | Deposit loading, g/L | 300 nm smoke FE | dP, Pa |
|---|---|---|---|---|---|---|
| L-190411-01 | 5% | 10% | 20 | 4.05 | 89.2% | 232 |
| L-190411-02 | 5% | 10% | 120 | 3.45 | 87.8% | 233 |
| L-190408-01 | 5% | 20% | 120 | 3.79 | 95.7% | 263 |
| L-190408-02 | 5% | 20% | 120 | 3.45 | 94.7% | 246 |
| L-190408-03 | 5% | 20% | 120 | 3.28 | 91.2% | 238 |

TABLE 6-continued

As-deposit FE/dP performance of the filter parts
made with 10%, 20%,
and 30% sodium silicate binder (by weight of alumina)

| Sample ID | Aluminum conc. | Binder conc. | Chamber temp. ° C. | Deposit loading, g/L | 300 nm smoke FE | dP, Pa |
|---|---|---|---|---|---|---|
| L-190408-04 | 5% | 20% | 120 | 3.28 | 90.1% | 234 |
| L-190409-01 | 5% | 30% | 120 | 4.31 | 92.9% | 245 |
| L-190409-02 | 5% | 30% | 20 | 4.31 | 92.6% | 237 |

Figure 16C:
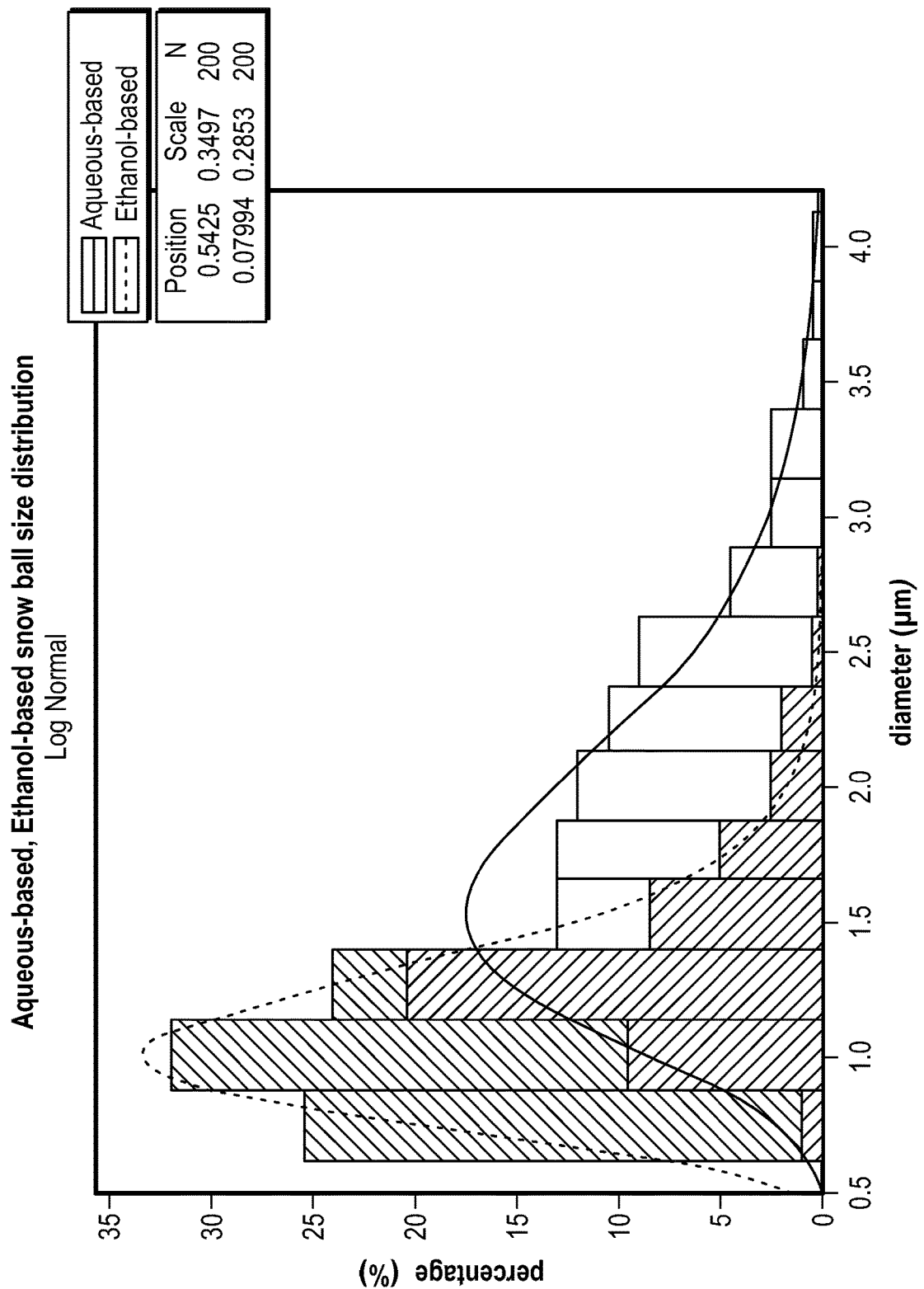
FIG. 16C is a graph showing particle size of agglomerates for agglomerates produced by an ethanol-based process and an aqueous-based process.
Figure 16D:
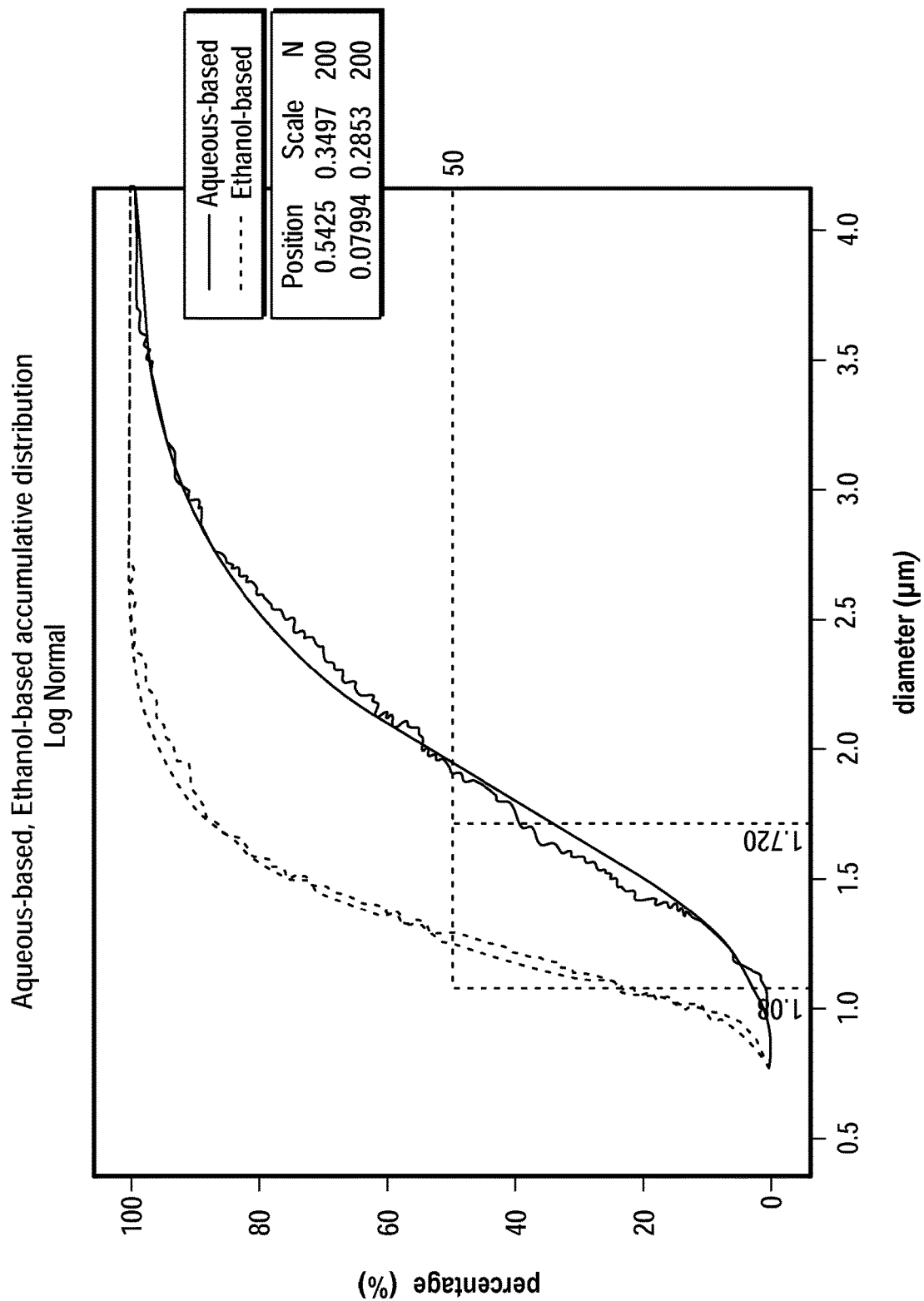
FIG. 16D is a graph showing agglomerate accumulative size distribution produced by an ethanol-based process and an aqueous-based process.

FIG. 16C is a graph showing the agglomerate size distribution of the aqueous-based and ethanol based examples. The agglomerate size was measured using scanning electron microscope. FIG. 16D is a graph showing agglomerate accumulative size distribution between embodiments of the two processes. Data for the ethanol-based process is shown in the dotted lines, and data for the aqueous-based process is shown in the solid line. Table 7 shows further details of the particle size for both processes. The values d10, d50 and d90 refer to the diameter at which 10%, 50% and 90% of the sample's deposited mass is comprised of particles with a diameter less than the provided value.

TABLE 7

| | Ethanol-Based | Aqueous-Based |
|---|---|---|
| d10, μm | 0.752 | 1.099 |
| d50, μm | 1.083 | 1.72 |
| d90, μm | 1.561 | 2.693 |

Figure 17A:
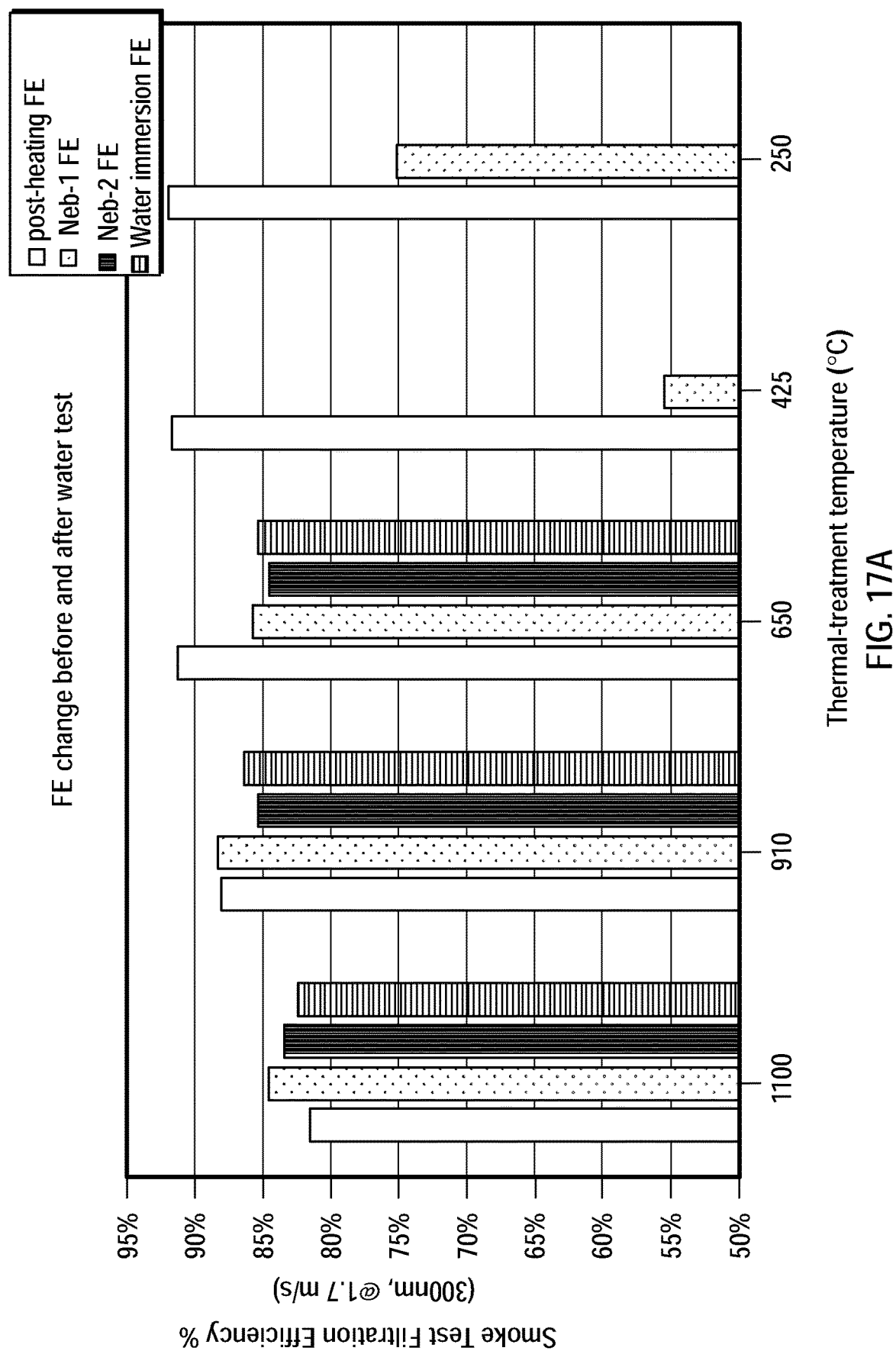
FIG. 17A is a graph showing the impact of different thermal treatment temperatures on the durability of filtration efficiency with respect to water resistance for samples prepared according to embodiments disclosed herein.
Figure 17B:
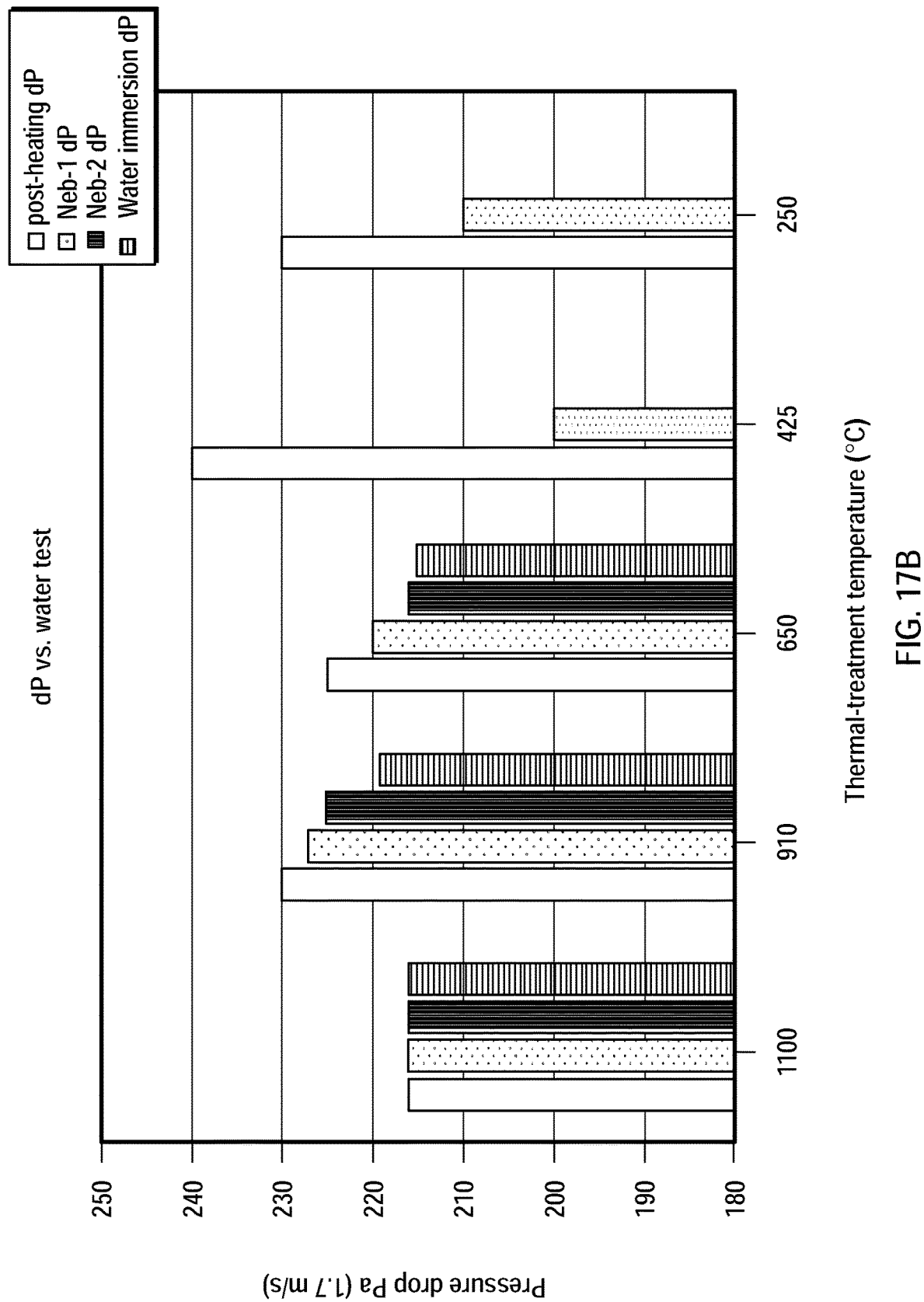
FIG. 17B is a graph showing the impact of different thermal treatment temperatures on pressure drop with respect to water resistance for samples prepared according to embodiments disclosed herein.

FIGS. 17A and 17B show the impact of thermal treatment temperature on water resistance. The samples were made with the same 5 wt % alumina suspension with 20 wt % sodium silicate binder except for one sample, L-0411-02 as shown in Table 8. It can be seen that thermal treatment at temperature of 600° C. or higher, preferably 650° C. or higher, significantly improves the water resistance of FE performance, preferably with FE drop less than 6% after exposure to one of the water resistance tests (Neb-1, Neb-2, Water Immersion). Higher temperature thermal treatments resulted in less reduction in FE after being exposed to a water test. For example, there was no FE drop for 1100° C.-treated filter, and net total drop by 5.9% for 650° C.-treated sample, after completion of a two-stage nebulization test and full water immersion test. The 425° C.-treated filter lost 36% in net FE after exposure to water immersion. In some embodiments, the porous ceramic honeycomb body comprising agglomerates comprised of 1-15 wt % alumina nanoparticles and 5-25 wt % binder is heat treated by raising the temperature of the honeycomb body comprising alumina nanoparticles to a maximum temperature of 600 to 1200° C., for example 650 to 1100° C. for a period of 1 to 24 hours.

TABLE 8

List of the samples made from aqueous-based process and
thermally treated at different temperature after deposition.

| Sample ID | Aluminum conc. | Binder conc. | Chamber temp. ° C. | Deposit loading, g/L | Thermal treatment temp. ° C. |
|---|---|---|---|---|---|
| L-190411-02 | 5% | 10% | 120 | 3.96 | 1100 |
| L-190416-01 | 5% | 20% | 120 | 3.99 | 910 |
| L-190416-02 | 5% | 20% | 120 | 4.10 | 910 |
| L-190416-03 | 5% | 20% | 120 | 4.21 | 650 |
| L-190416-04 | 5% | 20% | 120 | 4.07 | 650 |
| L-190416-05 | 5% | 20% | 120 | 4.23 | 425 |
| L-190416-06 | 5% | 20% | 120 | 4.10 | 425 |
| L-190408-04 | 5% | 20% | 120 | 3.26 | 250 |

Figure 18A:
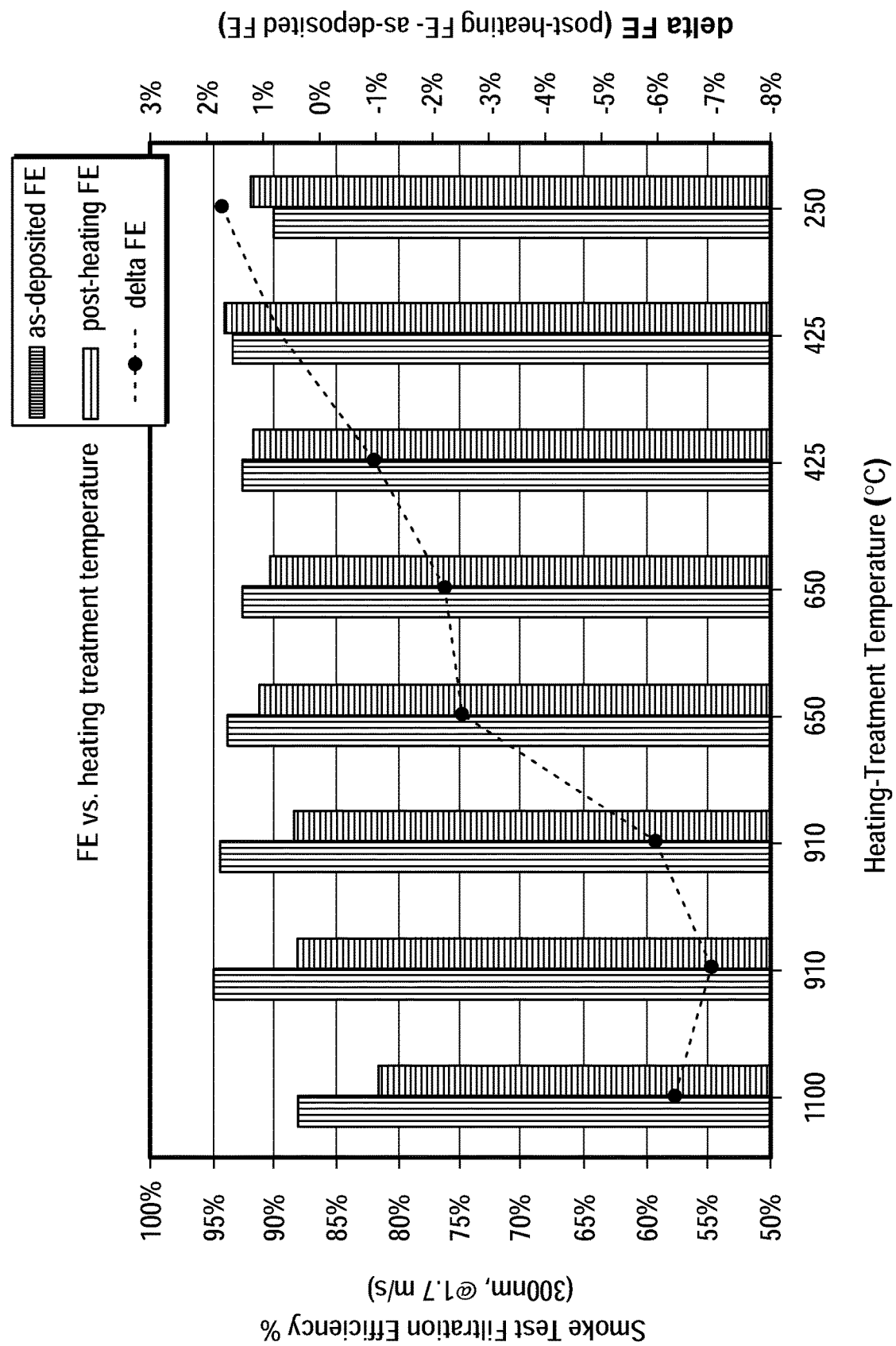
FIG. 18A is a graph showing the impact of thermal treatment on filtration efficiency at different heat treatment temperatures on water resistance for samples prepared according to embodiments disclosed herein.
Figure 18B:
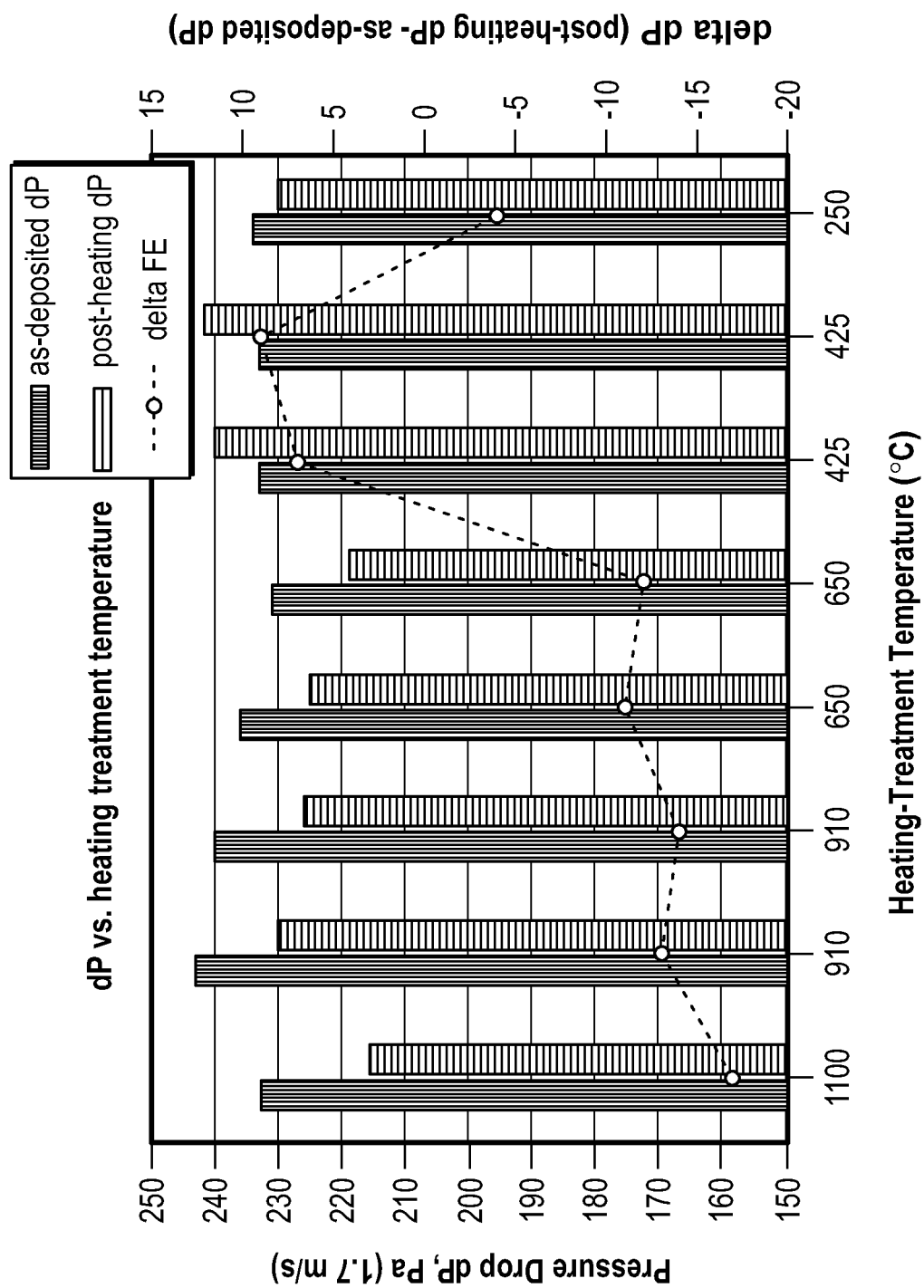
FIG. 18B is a graph showing the impact of thermal treatment on pressure drop at different for samples prepared according to embodiments disclosed herein.

We have found that thermal treatment after deposition might reduce FE, dP, or both FE and dP, as shown in FIGS. 18A and 18B. As shown in FIG. 18A, lower treatment temperatures for the Examples from Table 8 caused lower drops in filtration efficiency due to the thermal treatment (less FE drop); for example, an 1100° C.-treatment reduced FE value of the filter by 6.3%, and after 650° C.-treatment a similarly alumina loaded filter experienced a drop in FE of about 2% (the two examples in FIG. 18A showing net decrease in FE of 2.2%-2.5%). As shown in FIG. 18B, lower treatment temperatures for the Examples from Table 8 showed an increase in pressure drop across the filter for lower thermal treatment temperatures (below 600° C., or in the range of 400-600° C. wherein FIG. 18B shows two examples at thermal treatment temperatures of 425° C.), whereas higher thermal treatment temperatures resulted in reductions in pressure drop as compared to the as-deposited state, with the examples in FIG. 18B showing a reduction in pressure drop of 10 Pa or more for thermal treatment temperatures of greater than 600 C, with examples in FIG. 18B corresponding to 650, 910, and 1100° C. Thus, a maximum thermal treatment temperature of 600-700° C., and preferably 625-675° C., showed a small reduction in FE, along with an advantageous reduction in pressure drop, after thermal treatment.

Figure 19:
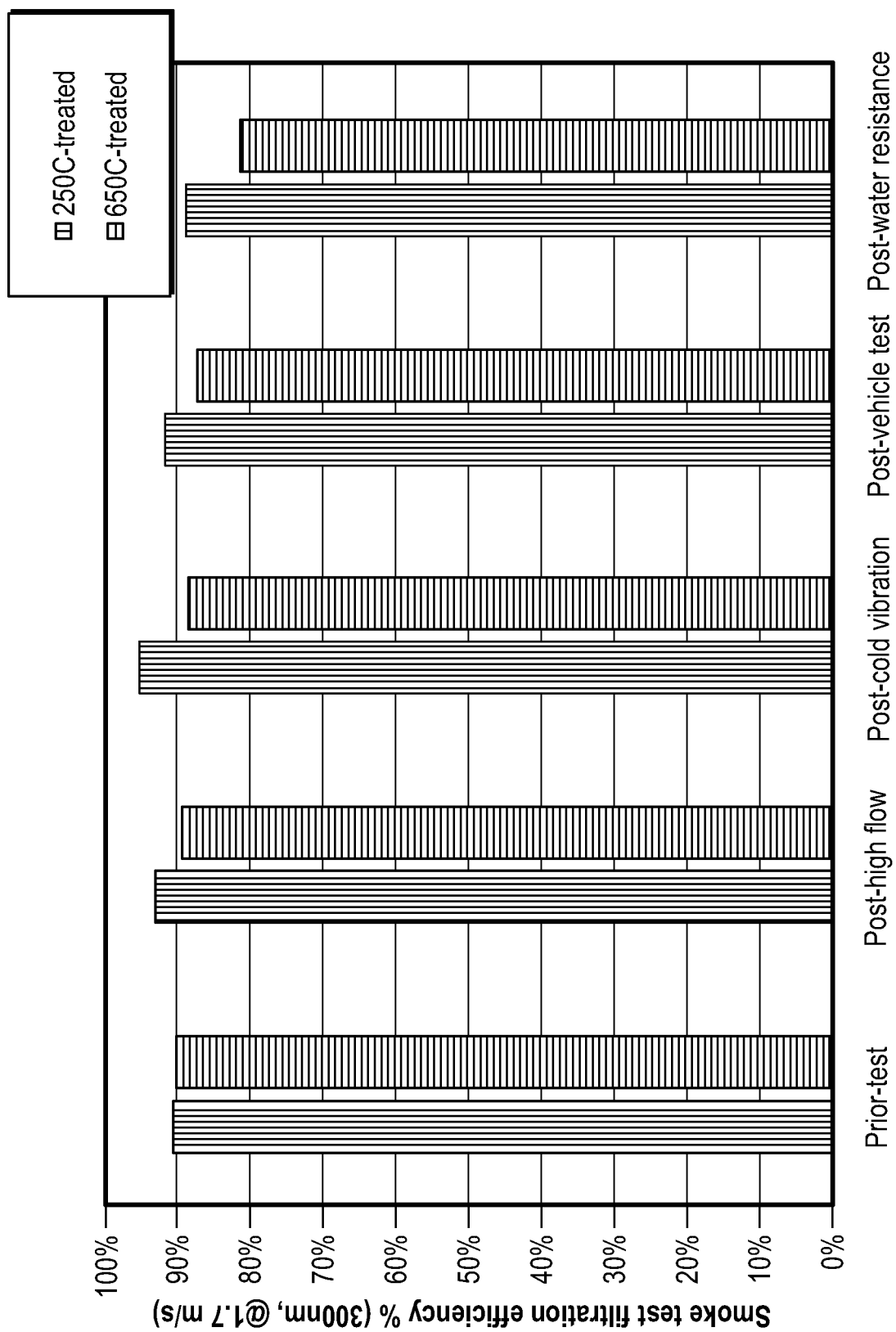
FIG. 19 is a graph showing filtration efficiency after various durability tests including a high flow test, a cold vibration test, a vehicle test, and a two stage water resistance test.

FIG. 19 shows the smoke FE data measured after thermal treatment and each of the durability (e.g. water resistance) tests. The water resistance tests include 3-steps: 1) a first nebulizer test with 15-20 g water loading; 2) a second water nebulizer test with 60-70 g water loading; 3) a water soak test with water loading >300 g. The total FE net loss during the tests was 1.66% for a 250° C.-treated filter and 8.74% for a 650° C.-treated filter. It should be noted that the 250° C.-treated sample had exposure to 650° C. for 10 hours during hot canning before the vehicle test and the water test, which benefitted deposit strength and water resistance.

Example 7—Morphology of Inorganic Deposits

This example demonstrates the morphology of filtration articles, for example, a plugged honeycomb body having inorganic material deposited on or in or on and in the porous walls of the plugged honeycomb body. Such a morphology is achieved by an aerosol deposition process of inorganic material.

An ethanol-based aerosol deposition experiment was performed on wall-flow filter substrates having a diameter of 4.252" and a length of 4.724" having 200 CPSI, a wall thickness of 8 mils, and an average pore size of 13.5 μm and average porosity of 55%. Inorganic material was deposited to a loading of 6.95 g/L. A co-flow type chamber similar to the chamber shown in FIG. 5 was used with 11% solids alumina (DK-2405), 15% Dow 2405 binder, the spraying nozzle an external mix nozzle (SU1A, 2050/7). The liquid flow rate was 24 g/min with 8 g/min through three nozzles.

Atomizing gas flow rate was 30 Nm³/hour total, with 10 Nm³/hour through each of 3 nozzles. Carrier gas flow rate was 70 Nm³/hour. A heat transmitter 706a was used to increase the inlet temperature above the nozzle 720. The setpoint of the heat transmitter 706a was 230° C. to provide a measured temperature of about 150° C. A first heater 706b was set at 270° C. (150° C. actual), a second heater 706c was set at 300° C. (155° C. actual) and a third heater 706d was set at 300° C. (120° C. actual).

SEM photographs of the wall flow filter containing the aerosol-deposited alumina were obtained on the wall flow filter were obtained as follows.

Figure 20:
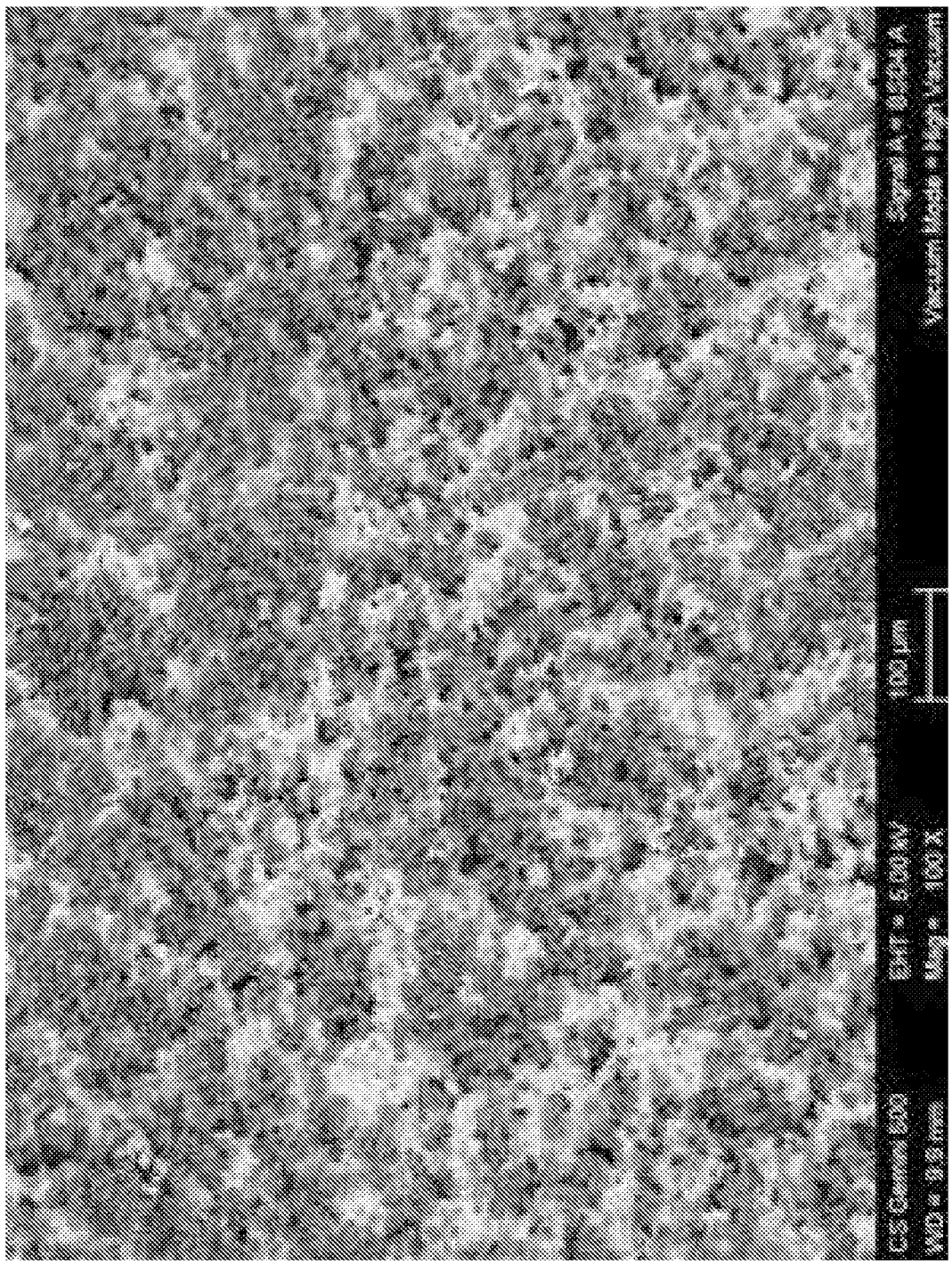
FIG. 20 is an SEM photograph of a top view of an inlet region of an inlet channel of a plugged honeycomb body prepared according to embodiments disclosed herein.
Figure 21:
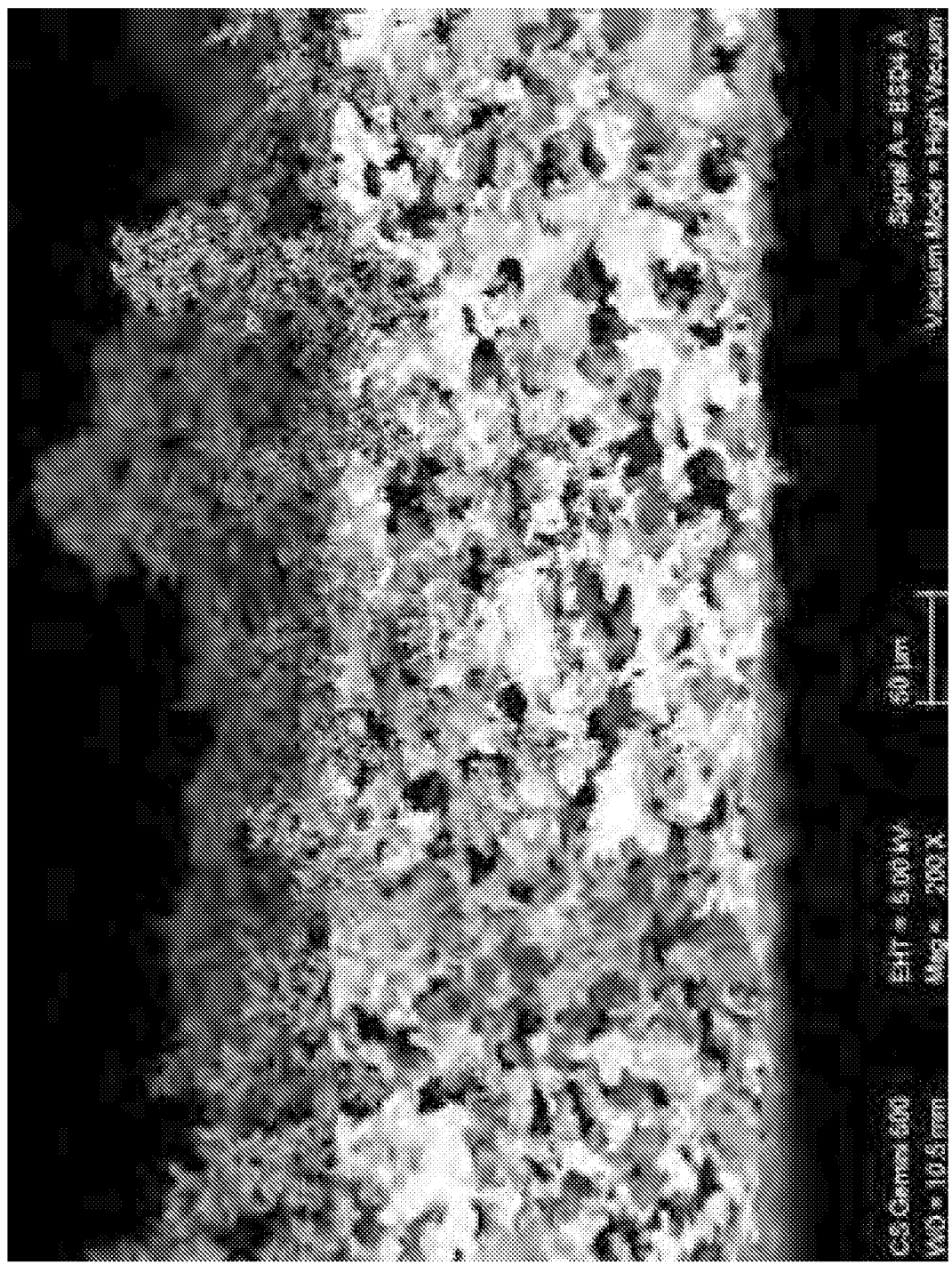
FIG. 21 is an SEM photograph of a cutaway side view of an inlet region of an inlet channel of a plugged honeycomb body prepared according to embodiments disclosed herein.
Figure 22:
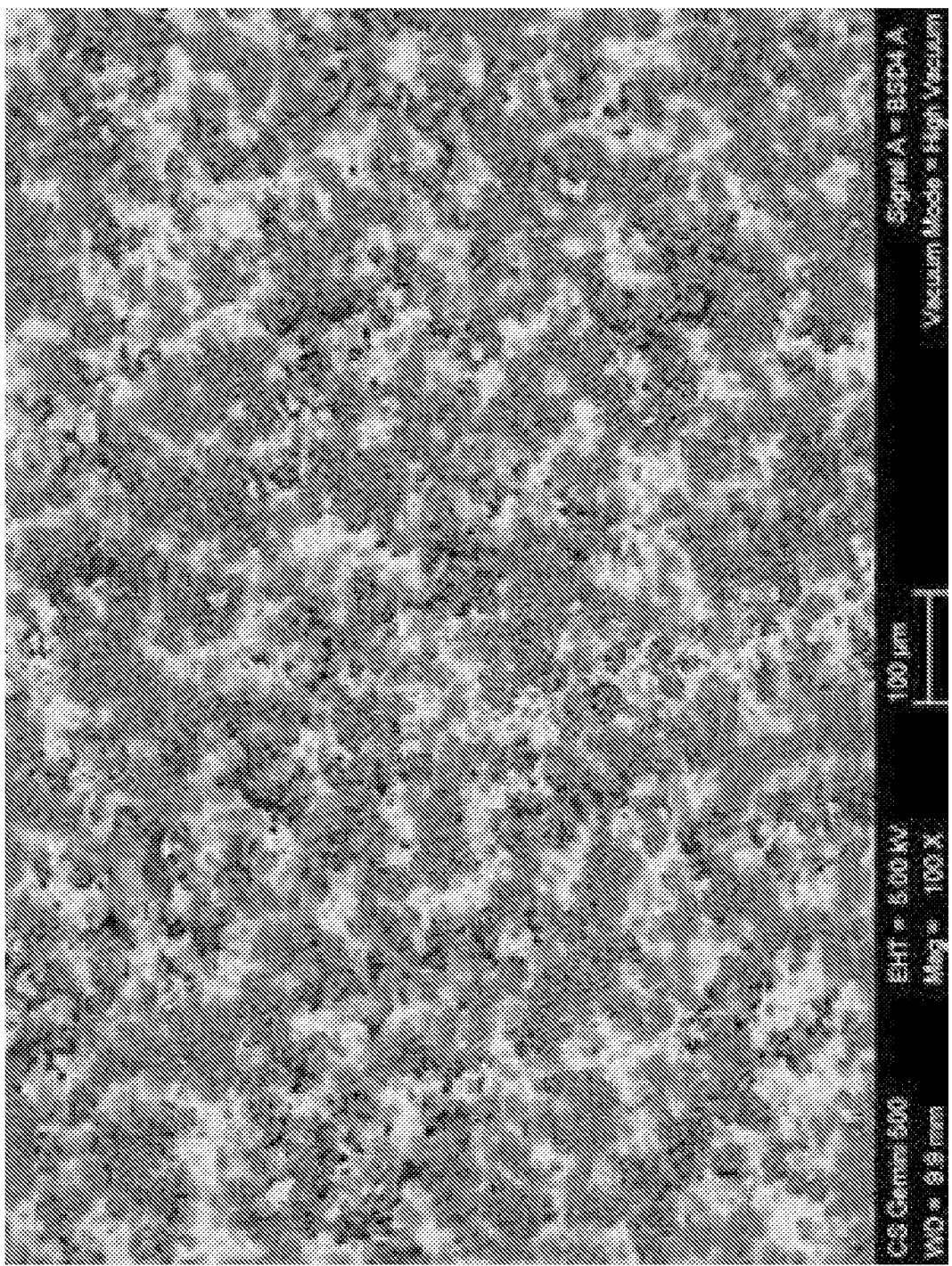
FIG. 22 is an SEM photograph of a top view of a middle region of an inlet channel of a plugged honeycomb body prepared according to embodiments disclosed herein.
Figure 23:
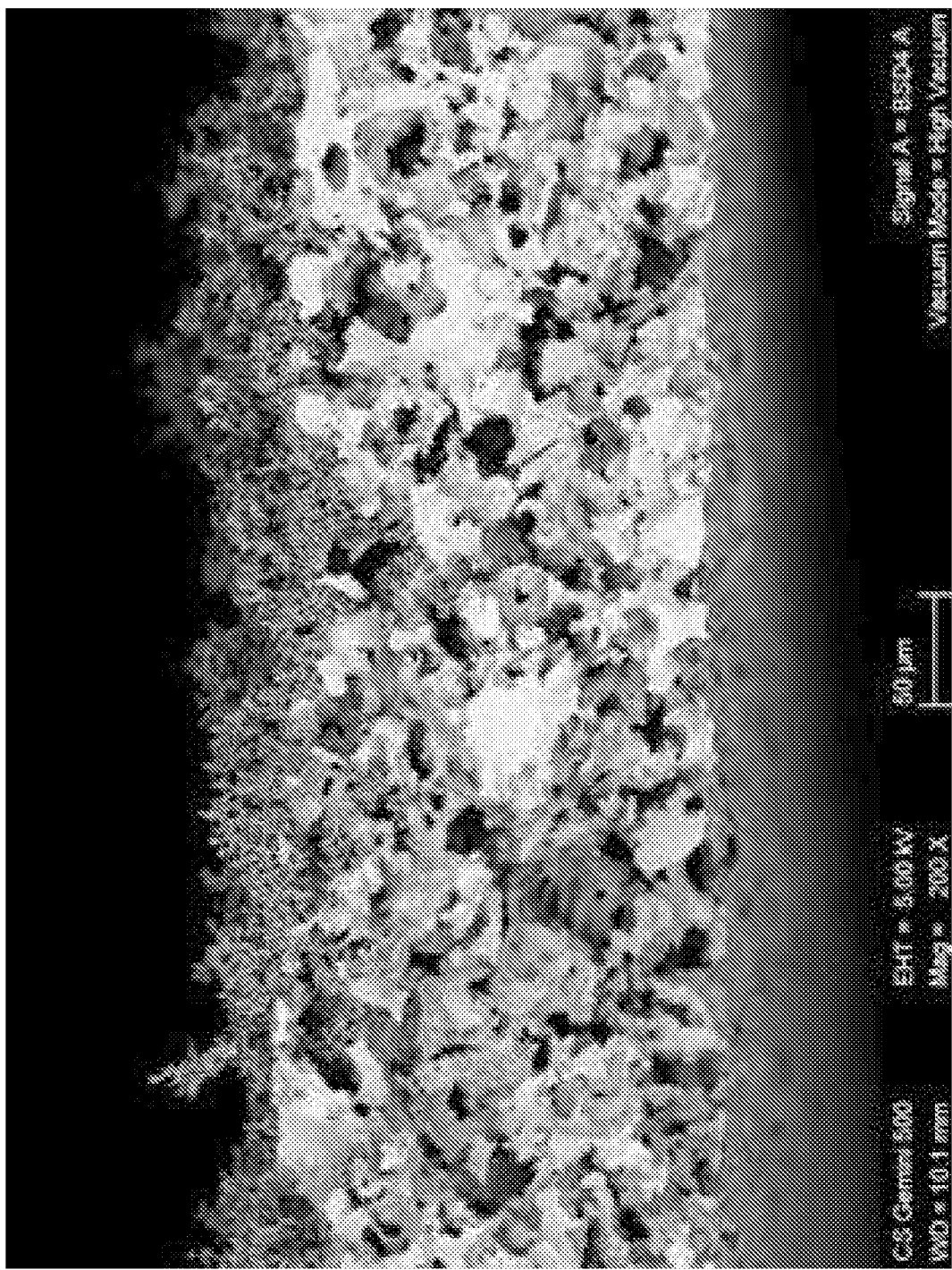
FIG. 23 is an SEM photograph of a cutaway side view of a middle region of an inlet channel of a plugged honeycomb body prepared according to embodiments disclosed herein.
Figure 24:
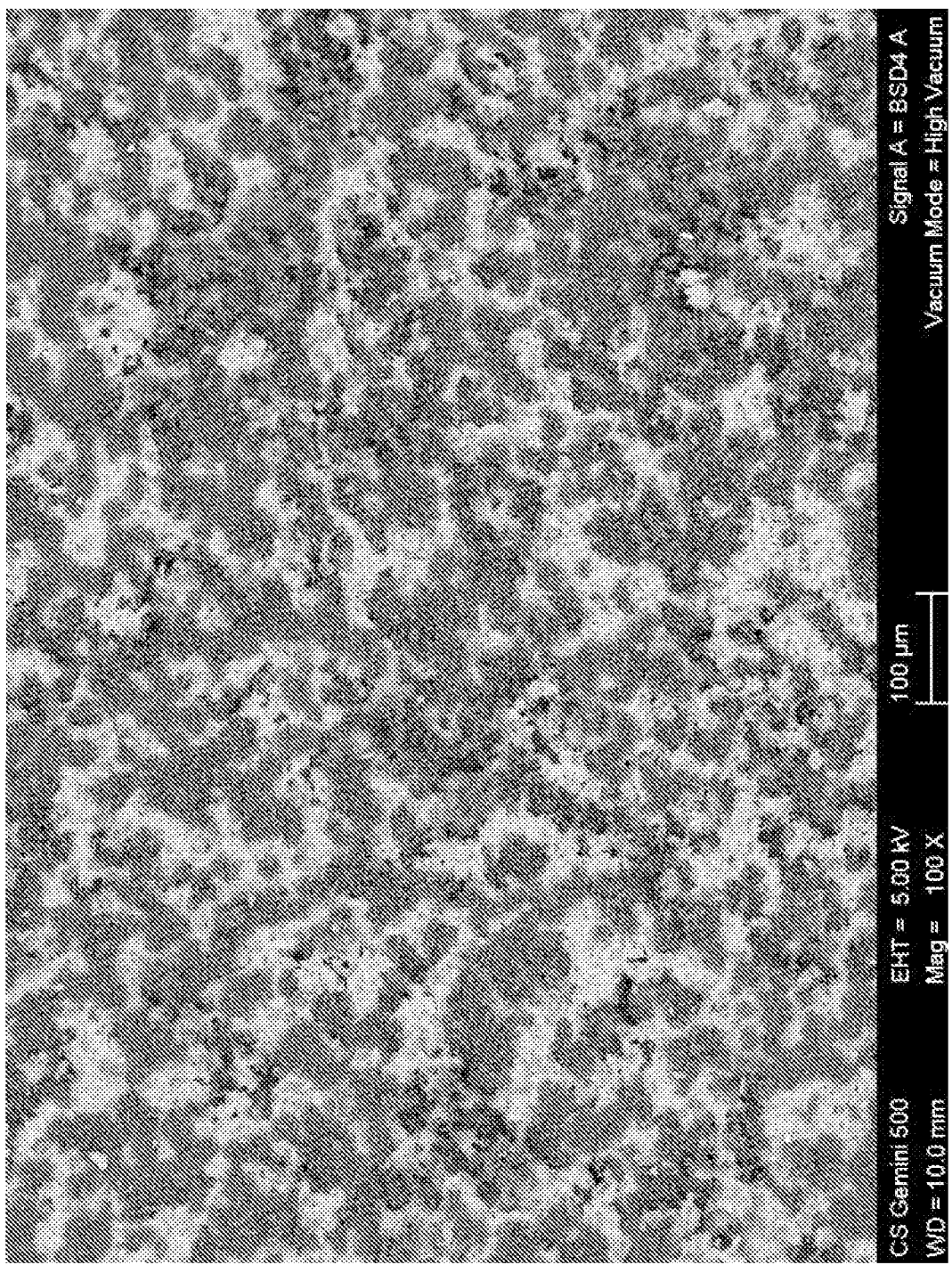
FIG. 24 is an SEM photograph of a top view of an outlet region of an inlet channel of a plugged honeycomb body prepared according to embodiments disclosed herein.
Figure 25:
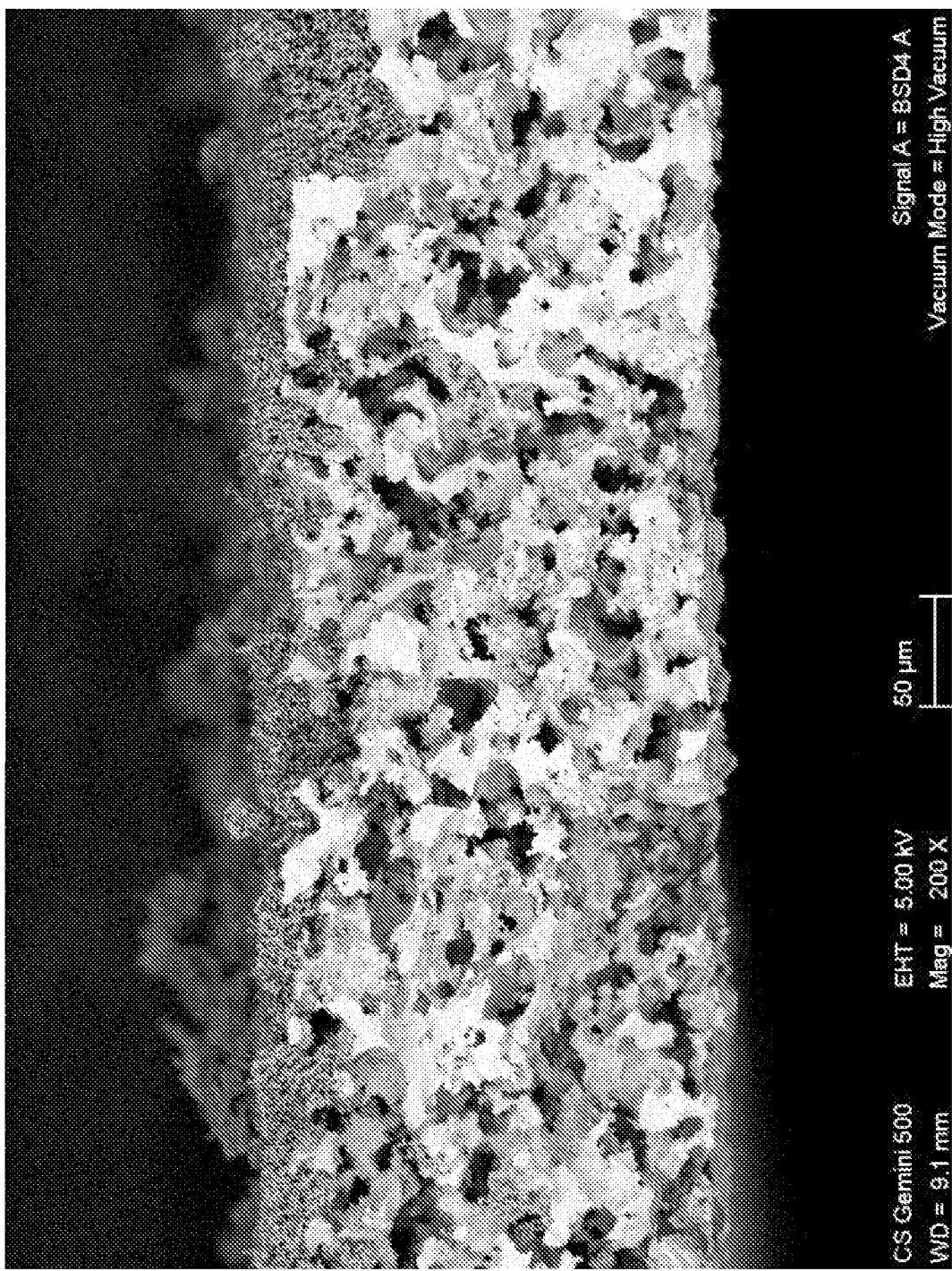
FIG. 25 is an SEM photograph of a cutaway side view of an outlet region of an inlet channel of a plugged honeycomb body prepared according to embodiments disclosed herein.
Figure 26:
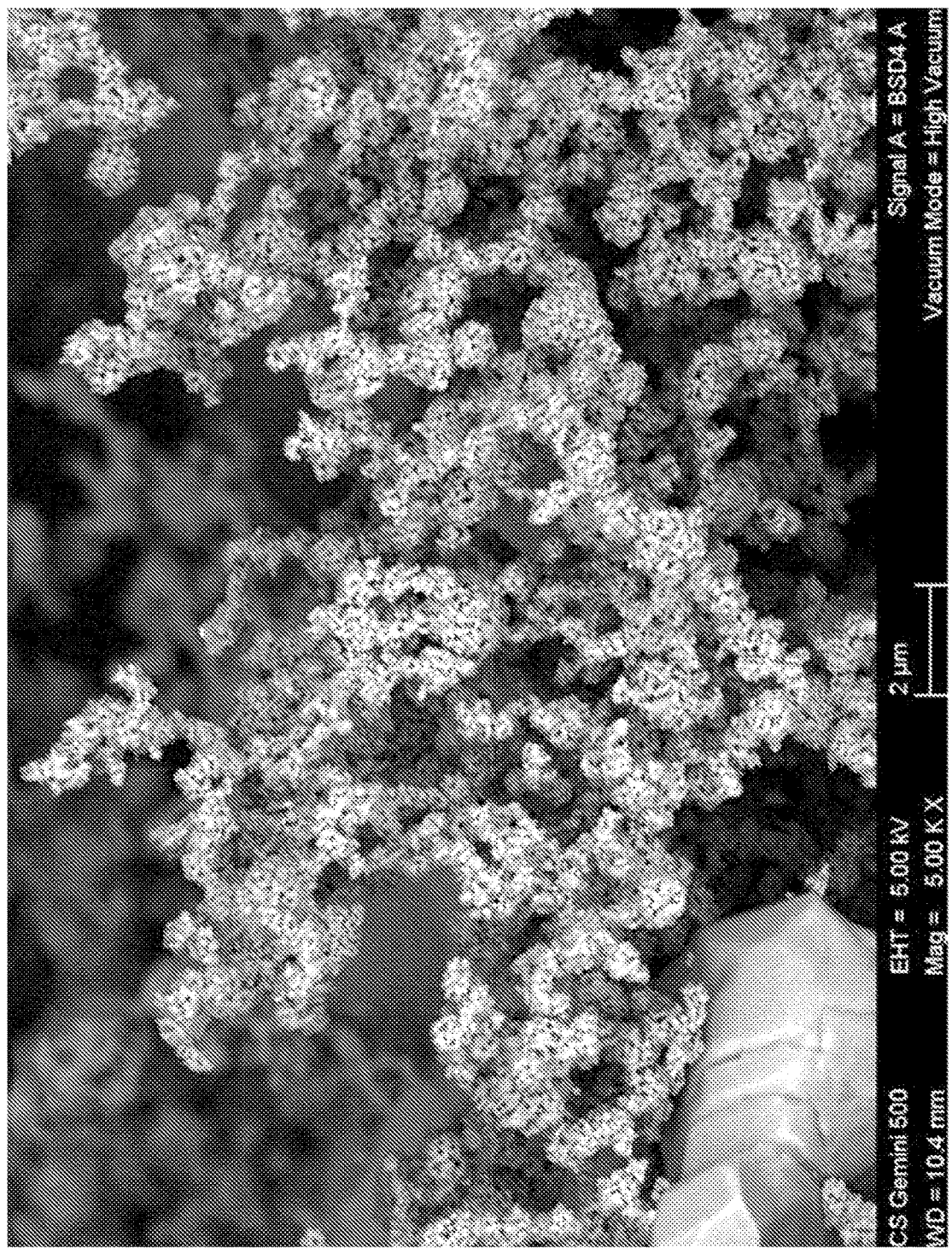
FIG. 26 is an SEM photograph of a magnified cutaway side view of an outlet region of an inlet channel of a plugged honeycomb body prepared according to embodiments disclosed herein.
Figure 27:
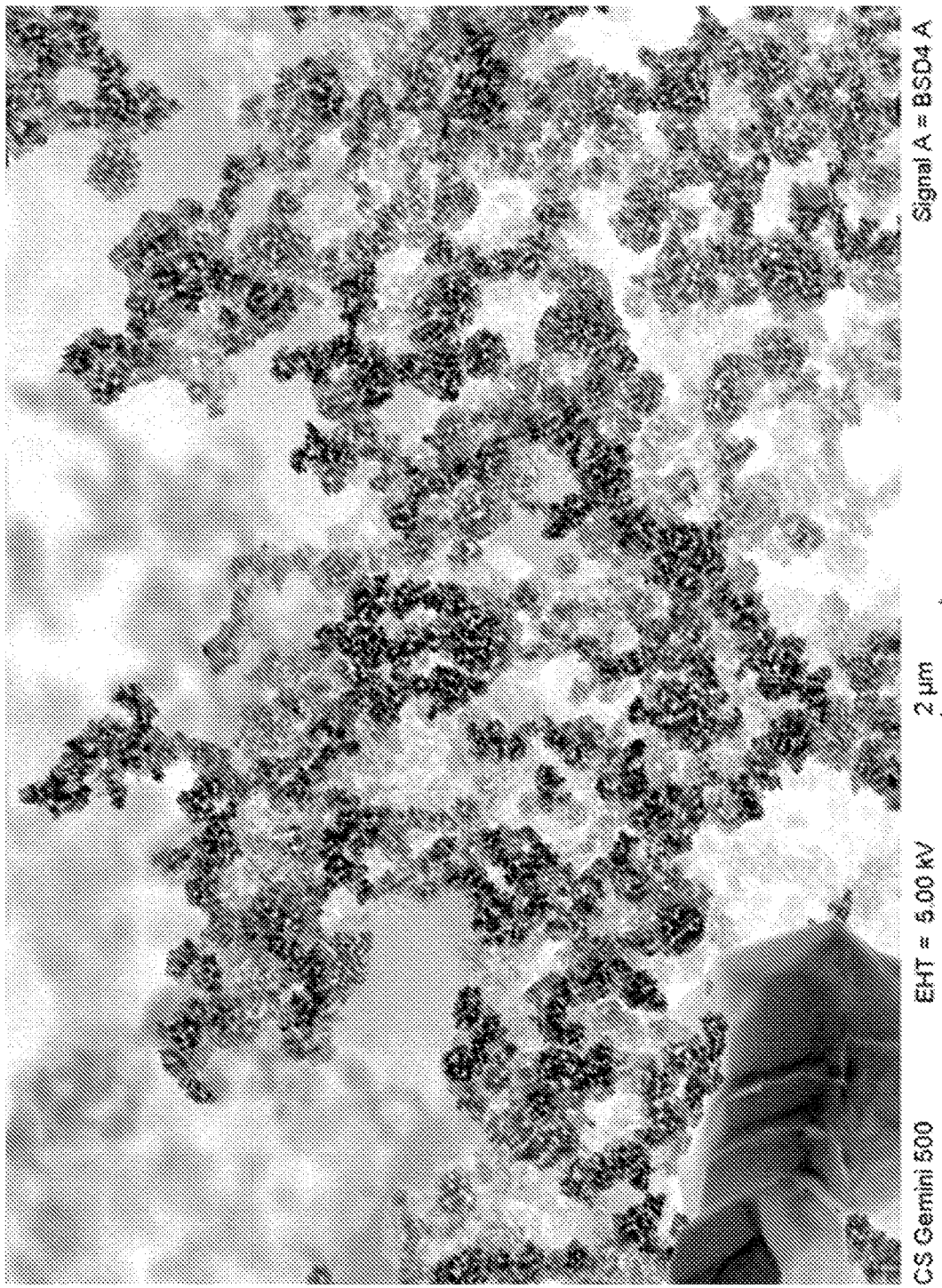
FIG. 27 is the SEM photograph of FIG. 26 with the colors reversed.
Figure 28:
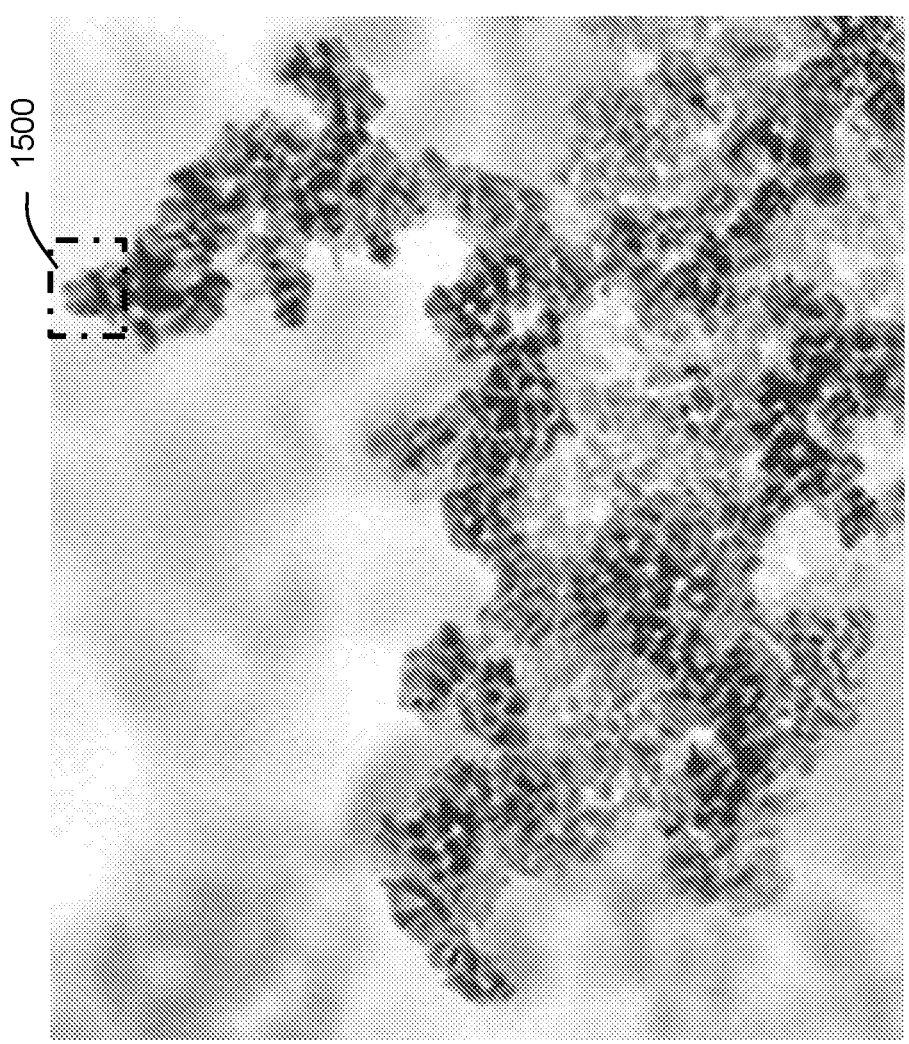
FIG. 28 is a portion of the SEM photograph of FIG. 27 with dashed lines surrounding an aggregate 1500.
Figure 29:
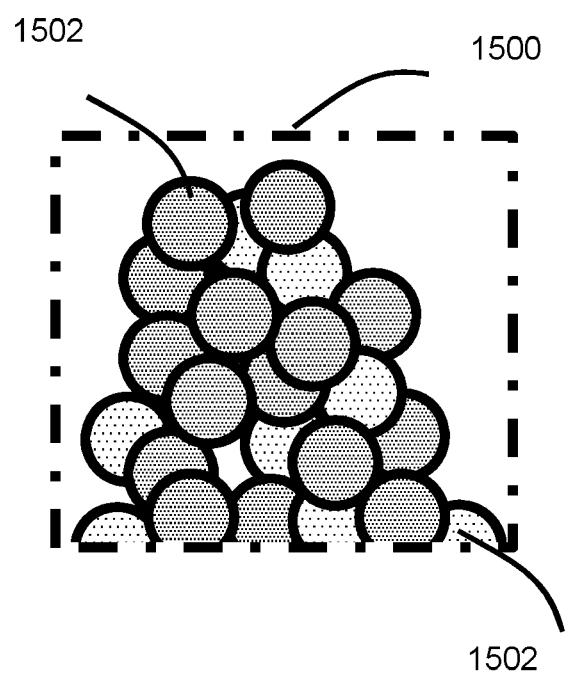
FIG. 29 is a schematic representation of the agglomerates 1502 forming the aggregate 1500 region outlined by the dashed lines in FIG. 28A.

FIG. 20 is an SEM photograph of a top view of an inlet region of an inlet channel;

FIG. 21 is an SEM photograph of a cutaway side view of an inlet region of an inlet channel;

FIG. 22 is an SEM photograph of a top view of a middle region of an inlet channel;

FIG. 23 is an SEM photograph of a cutaway side view of a middle region of an inlet channel;

FIG. 24 is an SEM photograph of a top view of an outlet region of an inlet channel;

FIG. 25 is an SEM photograph of a cutaway side view of an outlet region of an inlet channel;

FIG. 26 is an SEM photograph of a magnified cutaway side view of an outlet region of an inlet channel;

FIG. 27 is the SEM photograph of FIG. 26 with the colors reversed;

FIG. 28 is a portion of the SEM photograph of FIG. 27 with dashed lines surrounding an aggregate 1500; and FIG. 29 is a schematic representation of the agglomerates 1502 forming the aggregate 1500 region outlined by the dashed lines in FIG. 28.

As best seen in FIGS. 26, 27, and 28-29, the inorganic material on the porous walls comprises particulate or primary particles of inorganic material (in this specific example, alumina), particulate-binder agglomerates comprised of the particles and the binder material and aggregates of particulate-binder agglomerates. The inorganic material in or on or in and one the porous walls of the filtration article in the form of a plugged honeycomb body is present "clusters" or "chains" of agglomerates and/or aggregates. In some embodiments, the cluster or chains provide an inorganic material morphology that is one or more of finger-shaped, fibril-shaped, or sponge-like, such as for example, a morphology resembling a sea wool sponge. As can be seen the morphology of the inorganic material in FIGS. 26, 27, and 28-29 has a morphology that is sponge-like with aggregates that have a morphology that are one or more of finger-shaped, fibril-shaped, or sponge-like.

Examples 8-14

The exemplary process depicted in the flowchart of FIG. 30 and the apparatus shown in FIGS. 31A-D, cordierite honeycomb filters used were having a diameter of 4.055 inches (10.3 cm) and a length of 5.47 inches (13.9 cm). The cells per square inch (CPSI) and wall thickness were 200 and 8 mils. The average pore size was 14 μm.

Particles made from $Al_2O_3$ and having 150 nm average primary particle size were used and a suspension was formed with ethanol (30 wt. % solids, Beijing Dk Nano technology Co. Ltd. The suspension was diluted to 11 wt. % by ethanol (AR, Sinopharm Group Co. LTD). Dowsil™ US-CF-2405 and TnBT were added as binder and cure reaction catalyst. The binder to $Al_2O_3$ ratio was 5 wt %. The catalyst to binder ratio was 1 wt %.

A two-phase fluid nozzle (¼J-SS+SU11-SS, Spraying systems Co.) was used to atomize the solution. The atomizing gas was nitrogen at 116 psi, and the liquid pressure was 78 psi. The liquid atomizing speed is about 32 ml/min.

The droplet was dry in a deposition chamber as shown in FIGS. 31A and 31B. FIG. 31A illustrates a pressure control system that was utilized in the examples. FIG. 31B illustrates a flow control system which was not used in the Examples. The gas flow and the droplets were heated up by the heaters placed around the setting temperatures of zone T1-2 and T1-1 were 350° C. and 200° C.

The flow was driven by a (TBR R11Q CL.HP from Twin city fan (Shanghai) Co. Ltd.) at 2518 RPM. The total flow rate was 20 Nm³/h (Normal cubic meter per Hour). Additional air was sucked in the system to make up the total flow required. The deposition onto the honeycomb filter was performed for 173 seconds, and the final $Al_2O_3$ loading was 5.6 g/L.

After deposition, the parts were cured at in a temperature range of rom 40° C. to 200° C. for 10 minutes to 48 hours.

FIG. 31A illustrates a schematic of an exemplary embodiment of a deposition system. The components include a solution container, and liquid pressure was applied and controlled by nitrogen gas cylinder. Atomization gas was supplied by a nitrogen gas cylinder. Further components in FIG. 31A shows an atomization nozzle, a deposition chamber; a heater 1 and heater 2 and a honeycomb body sample holder. The apparatus further comprises a fan, and sensors and control components, including pressure gage for atomizing gas and liquid pressure, differential pressure gage for cross GPF pressure drop monitor, flow meter for overall flow monitor and control, valves.

Figure 32:
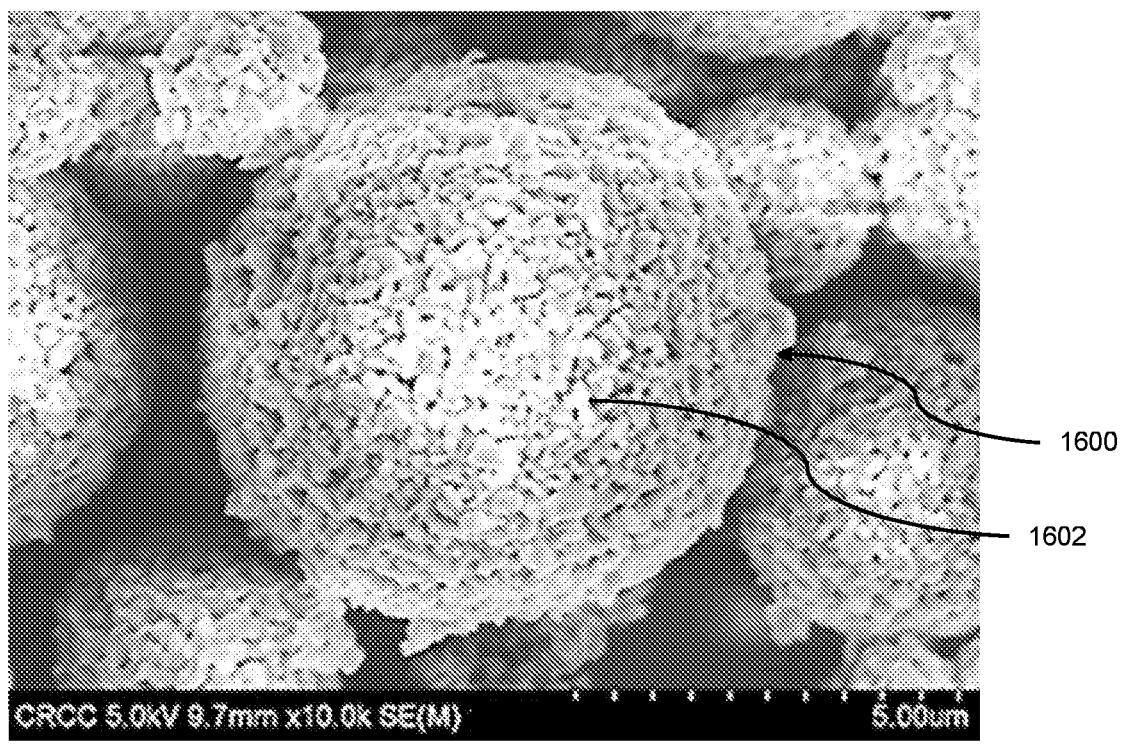
FIG. 32 is a close-up SEM photograph of $Al_2O_3$ aggregates or agglomerates according to embodiments disclosed and describe herein.

FIG. 32 illustrates typical aggregates or agglomerates 1600 morphology according to one or more embodiments. The primary particles 1602 were bonded together to form spherical aggregates or agglomerates 1600. In one or more embodiments, the primary particles 1602 are non-spherical. In some embodiments, the primary particles 1602 are oblong and non-spherical. In some embodiments, the primary particles 1602 comprise a closed curve that is non-spherical. In some embodiments, the primary particles 402 comprise multiple lobes. The surface of each aggregate or agglomerate 1600 is rough, providing friction between aggregates and aggregate to the honeycomb pores. FIGS. 33A-F show the material, which may be an inorganic layer, morphology and distribution at different depths. The ratio is the distance to inlet face over the total honeycomb body length. The honeycomb body can have a first end and second end. The first end and the second end are separated by an axial length. The aggregates are deposited from the first end and form material, which may be an inorganic layer on the inlet channel walls of the honeycomb body. In some embodiments, the material, which may be an inorganic layer extends the entire axial length of the honeycomb body (i.e., extends along 100% of the axial length). In some embodiments, the layer on the walls of the honeycomb body is not uniform, the thickness is different from 10% of the axial length, 50% of the axial length and 90% of the axial length. The material, which may be an inorganic layer, is thinner at the inlet end (10% axial length from inlet end) and thicker at the outlet end (90% axial length from inlet end). The aggregates or agglomerates 400 block the surface pore and effectively decrease the pore size.

The aggregate 400 size distribution and the relative pore size distribution from SEM image analysis are listed in Table 1. The average diameter, Q1, Q3 and sample numbers are listed. The average aggregate size is in the range of from about 1 µm to about 3 µm. The average pore size at end of channels (90% axial length from inlet end) was smaller than that at inlet (10% axial length from inlet end), because the material was thicker, and the pores were formed by more layer of aggregates. The average pore size was less than 2.5 µm, and significantly smaller than the average pore size of the honeycomb body, which was 14 µm. The pore size was measured from SEM images, as the distance between two adjacent aggregates on the surface. Because the porous inorganic layer is built by multi layers of aggregates, the average pore size in the three dimensional should be less than what measured from a two dimensional measurement.

TABLE 9

Aggregate size and relative pore size distribution

| | Aggregate Size (µm) | | | Surface Pore Size (µm) | | |
|---|---|---|---|---|---|---|
| | 10% depth | 50% depth | 90% depth | 10% depth | 50% depth | 90% depth |
| Q1 | 1.24 | 1.3375 | 1.51 | 0.99925 | 0.92975 | 0.896 |
| Median | 1.6 | 1.76 | 1.93 | 1.46 | 1.31 | 1.19 |
| Q3 | 2.12 | 2.4425 | 2.47 | 2.3725 | 1.8175 | 1.69 |
| Sample Number | 215 | 202 | 218 | 210 | 216 | 206 |

Q1 = first quartile;
Q3 = third quartile.

Due the smaller pore size and small thickness, the $Al_2O_3$ provided high filtration efficiency without a large clean pressure drop penalty. The clean pressure drop is the part pressure drop without soot loading. The soot loaded pressure drop can be even improved by mitigate soot deep bed penetration.

Figure 34:
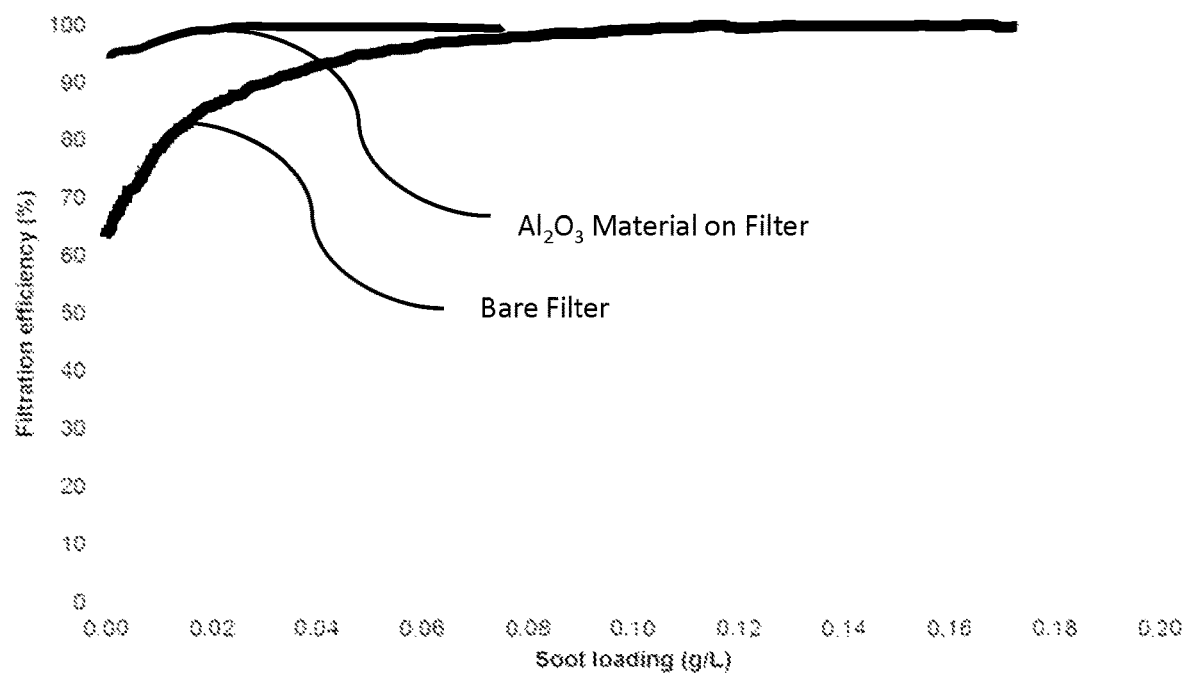
FIG. 34 is a graphical depiction of filtration efficiency vs. soot loading comparing a "bare" honeycomb body with no filtration material deposits with a honeycomb body comprising alumina filtration material deposits according to embodiments disclosed and described herein.

FIG. 34 compares the filtration efficiency evolving with soot loading between a bare honeycomb body and a honeycomb body with $Al_2O_3$ material, which may be an inorganic layer, coating. The filtration efficiency at 0.01 g/L soot loading was increased from 78.4% to 97.6%. The simulated lab particle number emission was decreased by about one magnitude. It was also one magnitude lower than the Euro6 regulation on GDI vehicle emission. The coating could effectively accelerate the filtration efficiency evolving to 100%, and reduce particle emission significantly. The filtration efficiency of honeycomb bodies is measured herein using the protocol outlined in Tandon et al., 65 CHEMICAL ENGINEERING SCIENCE 4751-60 (2010).

Figure 35:
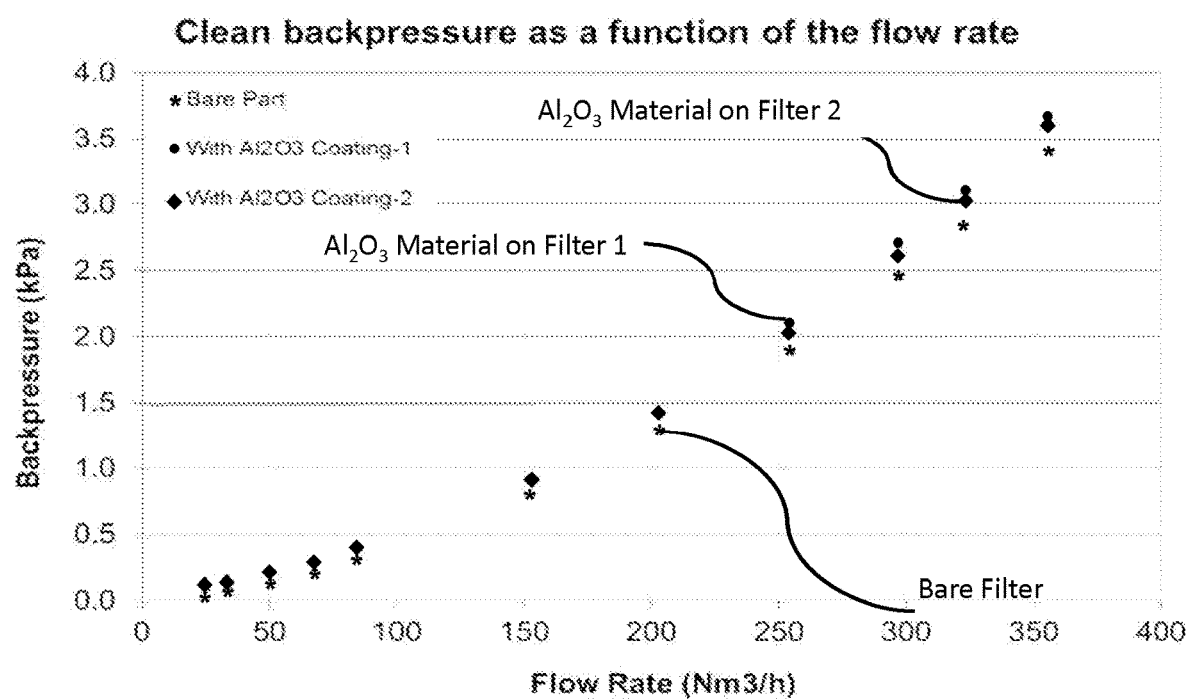
FIG. 35 is a graphical depiction of "clean" backpressure (no soot or ash load) versus honeycomb flow rate comparing a "bare" honeycomb body with no filtration material deposits with two different honeycomb bodies comprising alumina filtration material deposits according to embodiments disclosed and described herein.
Figure 36:
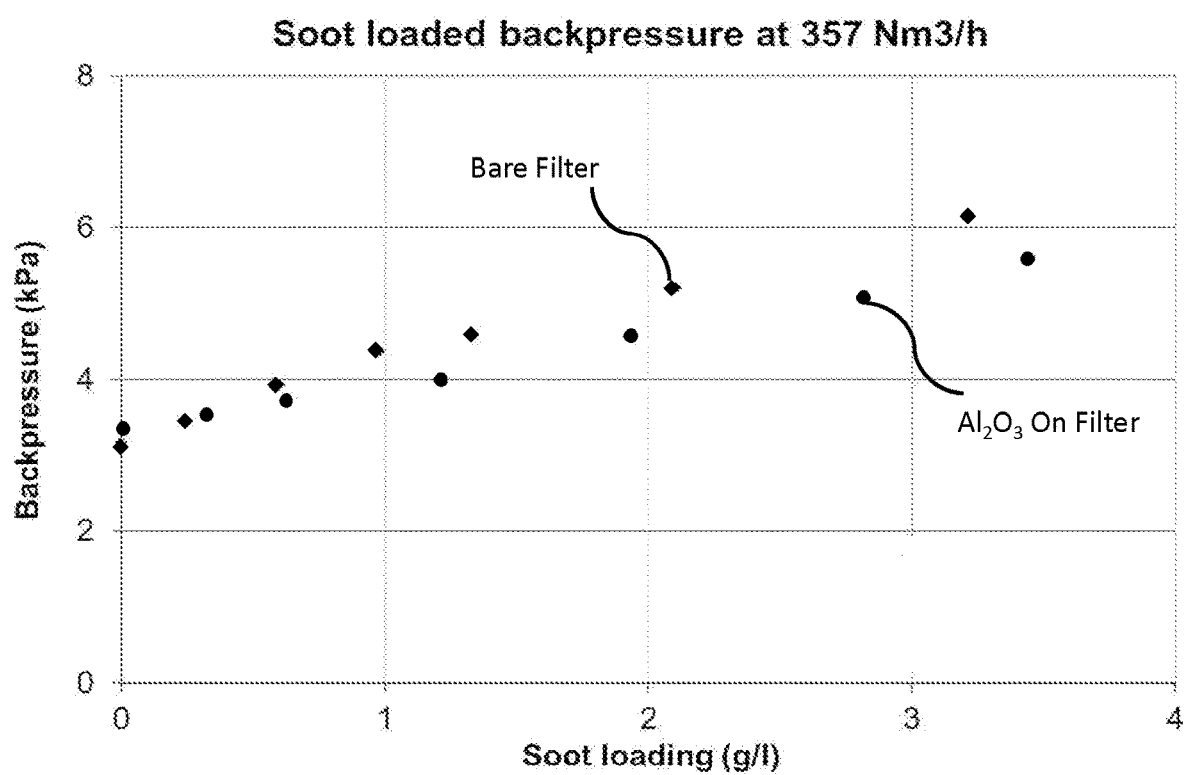
FIG. 36 is a graphical depiction of backpressure versus soot load of a "bare" honeycomb body with no filtration material deposits compared with a honeycomb body comprising alumina filtration material deposits according to embodiments disclosed and described herein.
Figure 37A:
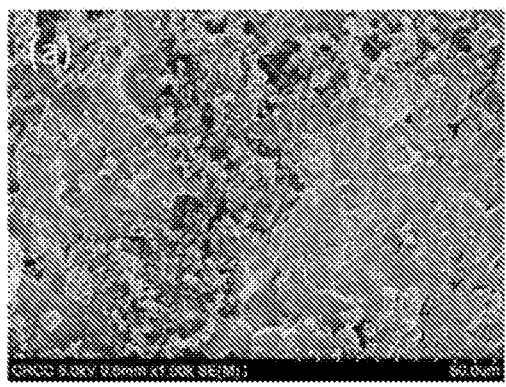
FIG. 37A is an SEM photograph of a top view of a wall of a honeycomb body comprising discrete regions of filtration material deposits formed on a wall at an axial distance of 50% from the inlet end of the honeycomb body.
Figure 37B:
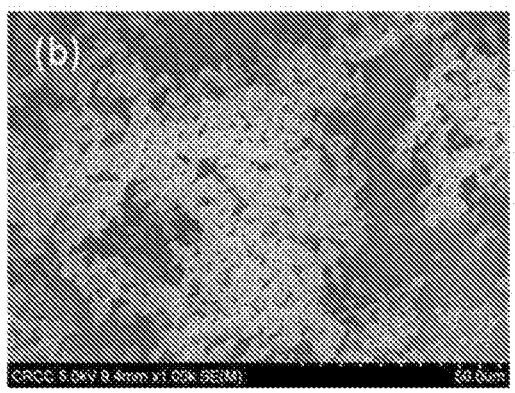
FIG. 37B is an SEM photograph of a top view of a wall of a honeycomb body comprising discrete regions of filtration material deposits formed on a wall at an axial distance of 50% from the inlet end of the honeycomb body.
Figure 37C:
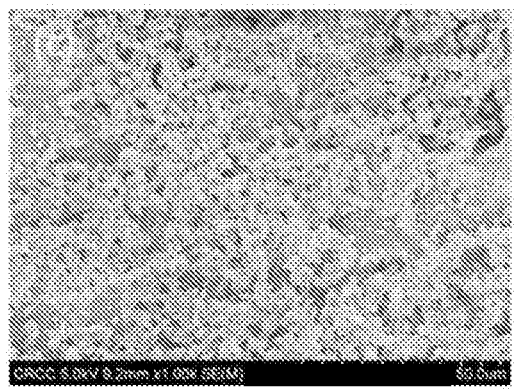
FIG. 37C is an SEM photograph of a top view of a wall of a honeycomb body comprising discrete regions of filtration material deposits formed on a wall at an axial distance of 90% from the inlet end of the honeycomb body.
Figure 37D:
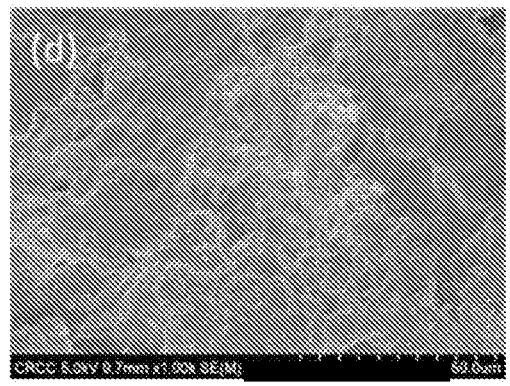
FIG. 37D is an SEM photograph of a top view of a wall of a honeycomb body comprising discrete regions of filtration material deposits formed on a wall at an axial distance of 10% from the inlet end of the honeycomb body.
Figure 37E:
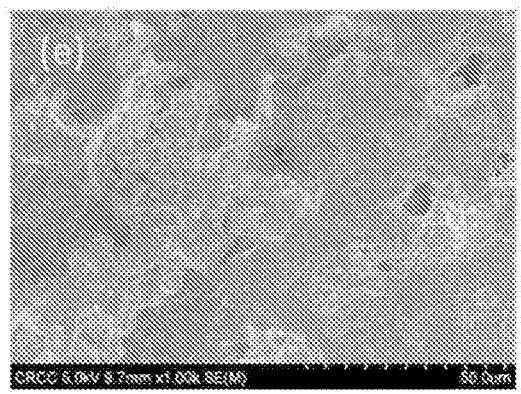
FIG. 37E is an SEM photograph of a top view of a wall of a honeycomb body comprising discrete regions of filtration material deposits formed on a wall at an axial distance of 50% from the inlet end of the honeycomb body.
Figure 37F:
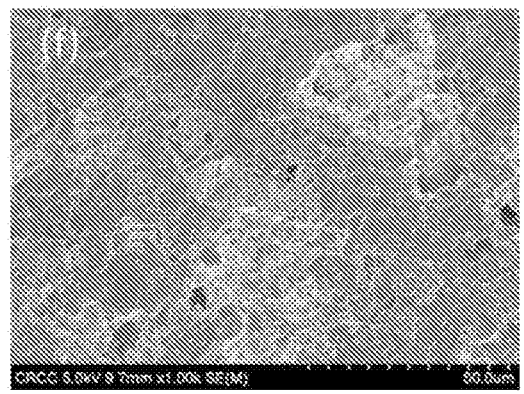
FIG. 37F is an SEM photograph of a top view of a wall of a honeycomb body comprising discrete regions of filtration material deposits formed on a wall at an axial distance of 90% from the inlet end of the honeycomb body.

FIG. 35 plots the clean pressure drop versus flow rate. The pressure drop penalty at 357 $Nm^3/h$ from the $Al_2O_3$ coating is only 7%. The soot loaded pressure drop in FIG. 11 illustrates the improvement from the $Al_2O_3$ coating, which reduces the pressure drop at 3 g/L by 9%.

A process flow was followed as shown in FIG. 30. A suspension (30 wt. % solids) of 150 nm average primary particle size $Al_2O_3$(Beijing Dk Nano technology Co. Ltd.) was formed in ethanol and was stirred for 1 hour before preparing the diluted suspension to prevent the sedimentation of $Al_2O_3$ primary particles. The raw material components and contents for Examples 1-7 are listed in Table 10. For Example 8, the raw suspension was directly diluted to be 11 wt. % solids in ethanol (AR, Sinopharm Group Co. Ltd.)

A two-phase fluid nozzle (¼J-SS+SU11-SS, Spraying systems Co.) was used to form droplets during the atomizing step. A schematic diagram of the deposition process was shown in FIG. 31A. For Examples 8-11, atomization was achieved by the pressure control system. The pressure was supplied by a $N_2$ gas cylinder and adjusted by pressure regulator. Atomizing gas was supplied by a nitrogen supply cylinder and with pressure maintained at 116 psi, while the mixing suspension was delivered by high pressure nitrogen from a separate pipeline maintained at a pressure of 78 psi. For Examples 11-14, atomization was achieved by flow rate control system using a mass flow controller and the liquid flow rate was controlled by a syringe pump. The atomizing gas was also supplied by the nitrogen cylinder, but it was controlled by the flow rate instead of pressure. The atomizing gas flow rate was fixed at 20 L/min. The mixing suspension was delivered by the injector pump and the liquid injecting rate was fixed at 1.4 ml/min.

In the drying step, the air flow was heated by the heating bands (resistance heaters) in the areas H, H1 and H2 which was marked red in FIG. 31A. The temperatures of H1 and H2 were set at 350° C. and 200° C., while the temperature of H was set at 350° C. The atomizing droplets were dried in the hot air flow and formed the secondary aggregate particles before the inlet of honeycomb filters. The diameter and length of honeycomb filters used in Examples 8-14 were 4.055 inches and 5.47 inches. The CPSI and wall thickness were 200 and 8 mils. In the depositing step, the flow was driven by a fan in the pressure control system, and a pump in the flow rate control system. The secondary aggregate particles were carried by the flow and deposited under the wall of the honeycomb filters to form the material, which may be an inorganic layer. In the curing step, the curing temperature and time are listed in the Table 2 for Examples 9-14.

TABLE 10

| | Mixing solution | | | | | | |
|---|---|---|---|---|---|---|---|
| | 150 nm $Al_2O_3$ suspension | | Content | | Content | Curing process | |
| Example No. | (solid contents %) | Binder | (wt. % vs. $Al_2O_3$) | Catalyst | (wt. % vs. binder) | Curing temperature (° C.) | Curing time (h) |
| 8 (Comp.) | 11% | — | — | — | — | — | — |
| 9 | 11% | 2405 | 5% | — | — | 40 | 48 |
| 10 | 11% | 2405 | 5% | Titanium butoxide | 1% | Room temperature | 4 |
| 11 | 11% | 2405 | 5% | — | — | 40 | 48 |
| 12 | 11% | 2403 | 5% | — | — | 40 | 12 |

TABLE 10-continued

| | Mixing solution | | | | | |
|---|---|---|---|---|---|---|
| | 150 nm Al$_2$O$_3$ suspension | | Content | | Content | Curing process | |
| Example No. | (solid contents %) | Binder | (wt. % vs. Al$_2$O$_3$) | Catalyst | (wt. % vs. binder) | Curing temperature (° C.) | Curing time (h) |
| 13 | 11% | 644A | 5% | — | — | 40 | 12 |
| 14 | 11% | 830 | 5% | — | — | 40 | 12 |

To evaluate robustness of the material, which may be an inorganic layer, Examples 8-14 were subjected to a high flow blowing test. The test flow rate was as high as 850 Nm³/h, which was much higher than the vehicle exhaust flow rate. The total test time was about 10 mins and the highest flow lasted for 1 min. The FE and pressure drop (dP) at 1.7 m/s velocity were measured after the high flow blowing and listed in Table 11.

TABLE 11

| Example No. | As-deposited | | After high flow test | |
|---|---|---|---|---|
| | FE % | dP(Pa) | FE % | dP(Pa) |
| 8 (Comp.) | | | | |
| 9 | 76.85% | 197 | 74.1% | 187 |
| 10 | 73.64% | 193 | 70.66% | 191 |
| 11 | 83.82% | 205 | 84.85% | 198 |
| 12 | 82.87% | 193 | 80.56% | 193 |
| 13 | 83.52% | 197 | 60.34% | 182 |
| 14 | 76.63% | 198 | 59.44% | 180 |

FE of Examples 9-12 was considered to be at a stable value within measurement error ranges. Although the FE of Examples 13 and 14 decreased about ¼ after the high flow test, they were still at 60% level. For Comparative Example 8 without binder, the FE reduced much more than that of material, which may be an inorganic layer, with binder examples. The Examples demonstrate that binders enhanced the material, which may be an inorganic layer, strength. Comparative Example 8 utilized a curing catalyst, and curing time was shortened to 4 hours at room temperature. However, other binder systems required a curing time of at least 12 hours, and the curing temperature was at 40° C. For Example 10, there was only a 3% FE drop after the high flow test, which was the same as Example 9. Thus, a small amount of an appropriate catalyst could obviously accelerate curing speed and not affect the strength of the material.

Figure 33A:
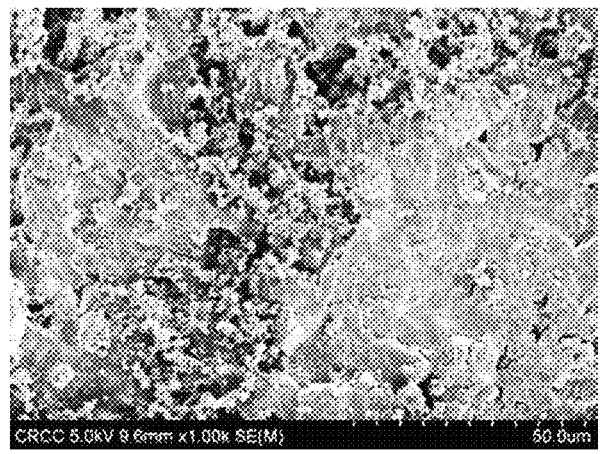
FIG. 33A is an SEM photograph of a top view of a wall of a honeycomb body comprising discrete regions of filtration material deposits formed on a wall at an axial distance of 10% from the inlet end of the honeycomb body.
Figure 33B:
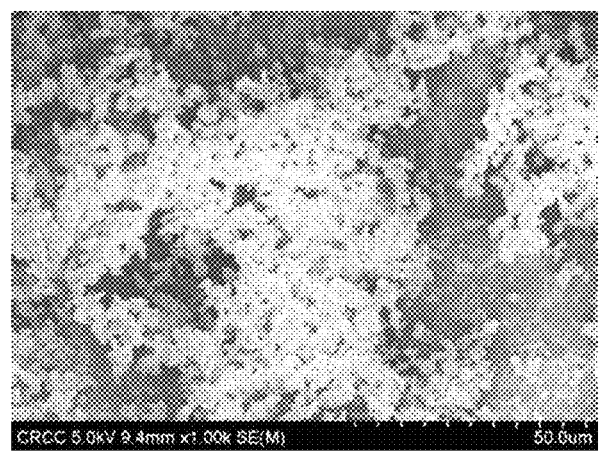
FIG. 33B is an SEM photograph of a top view of a wall of a honeycomb body comprising discrete regions of filtration material deposits formed on a wall at an axial distance of 50% from the inlet end of the honeycomb body.
Figure 33C:
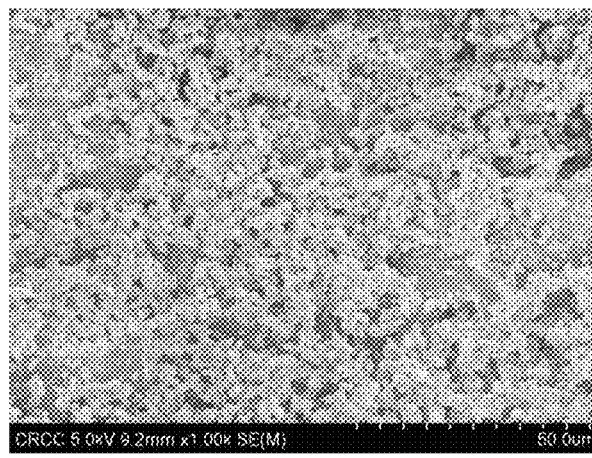
FIG. 33C is an SEM photograph of a top view of a wall of a honeycomb body comprising filtration material deposits formed on a wall at an axial distance of 90% from the inlet end of the honeycomb body.
Figure 33D:
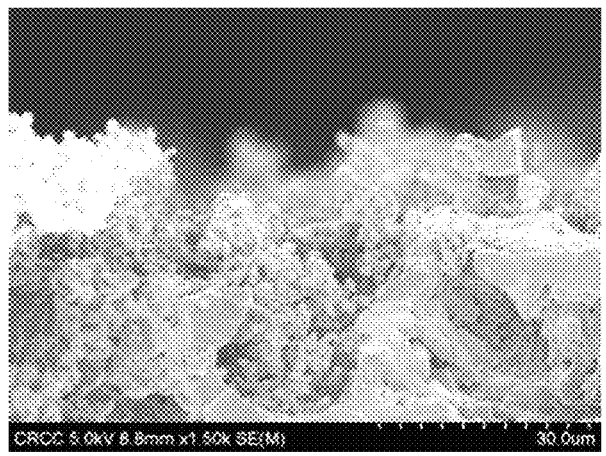
FIG. 33D is an SEM photograph of a close-up side view of a cross-section of a wall of a honeycomb body showing filtration material deposits at an axial distance of 10% from the inlet end of the honeycomb body.
Figure 33E:
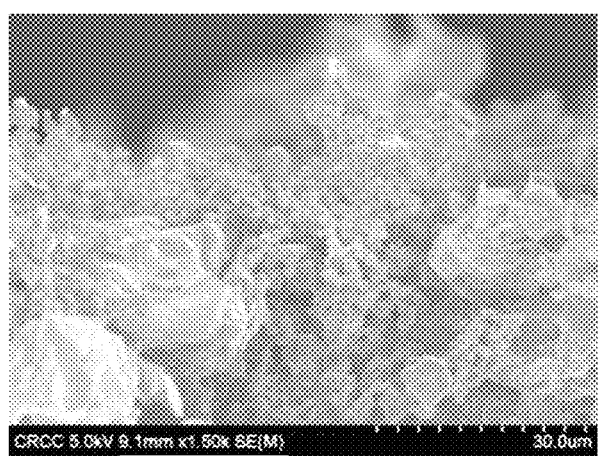
FIG. 33E is an SEM photograph of a close-up side view of a cross-section of a wall of a honeycomb body showing filtration material deposits at an axial distance of 50% from the inlet end of the honeycomb body.
Figure 33F:
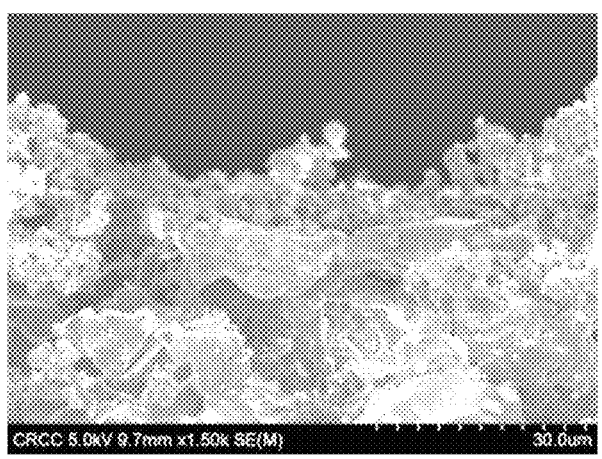
FIG. 33F is an SEM photograph of a close-up side view of a cross-section of a wall of a honeycomb body showing filtration material deposits at an axial distance of 90% from the inlet end of the honeycomb body.

FIGS. 33A-F are SEM photographs showing morphology of the filter wall surface at different depth from filter inlets. FIG. 33A shows 10% depth for Example 9. FIG. 33B shows 50% depth for Example 9. FIG. 33C shows 90% depth of Example 9. FIG. 33D shows 10% depth of Example 9. FIG. 33E shows 50% depth of Example 9. FIG. 33F shows 90% depth of Example 14.

FIGS. 33A-F show the morphologies at different depths from Examples 9 and 14 inlets after high flow tests. The material was not a continuous layer but that the particles filled the open pores under the surface of the filters. According to one or more embodiments, the material, which may be an inorganic layer, provided herein comprises a discontinuous layer formed from the inlet end to the outlet end comprising discrete and disconnected patches of material and binder comprised of primary particles in secondary aggregate particles or agglomerates that are substantially spherical. In one or more embodiments, the primary particles are non-spherical. In one or more embodiments, "substantially spherical" refers to an agglomerate having a roundness factor in cross section in a range of from about 0.8 to about 1 or from about 0.9 to about 1, with 1 representing a perfect circle.

With increasing the depth from the filter inlets, the material became thicker and thicker. Comparing microstructures of Examples 9 and 14, the material comprising Dowsil™ US-CF-2405 exhibited better adhesion than the high temperature inorganic binder 830. The particles existed in the surface pores contributed to the remaining FE after high flow blowing. The material morphologies were in accordance with FE measurements results.

To further validate the mechanical strength of the material with a binder system, various tests was performed with Example 11. After the high flow test, the filter was sealed in a can and then installed in the vehicle exhaust pipe (GEELY EmgrandGT, 1.8T GDI). The vehicle was run on the highway for about 1 hour. The filter was calcined in a muffle furnace at 650° C. for 5 hours to remove the soot after the vehicle test.

A vibration test (76 g, 200 Hz, 2 h) was performed, by fixing the canned filter in a metal box and then installed on a vibration bed. The vibration acceleration was up to 76 g acceleration, and the vibration frequency was 200 Hz. The canned filter was vibrated in the horizontal direction for 1 hour and then in the vertical direction for another 1 hour. The filter was treated at 1150° C. for 0.5 hour.

The tests were performed in the following order: high flow test, canning, first vehicle test, first vibration test, second vibration test, extreme thermal treatment and second vehicle test. The FE and dP was measured after each test. The FE results were maintained above 75% and the total largest variation was only 7%. After the first vehicle test, the material with binder was subjected to 650° C. calcination for 5 hours, but the filtration efficiency was reduced by only 5%. This result showed that binder 2405 and the material integrity were stable at high temperatures according to the tests, which is in the range of the normal temperature of the vehicle exhaust. The filtration efficiency and pressure drop did not change during two continuous vibration tests. The results indicated that the binder improved material mechanical integrity in various tests to simulate actual use and an actual vehicle test. As for the high temperature treatment, only 2% filtration drop was observed. The results demonstrated the thermal robustness of the material. Overall, a material with appropriate binders could obtain the advanced material mechanical strength to pass various conditions, such as high flow blowing, over gravitational acceleration vibration, high temperature treatment and real vehicle engine exhaust treatment.

Figure 38A:
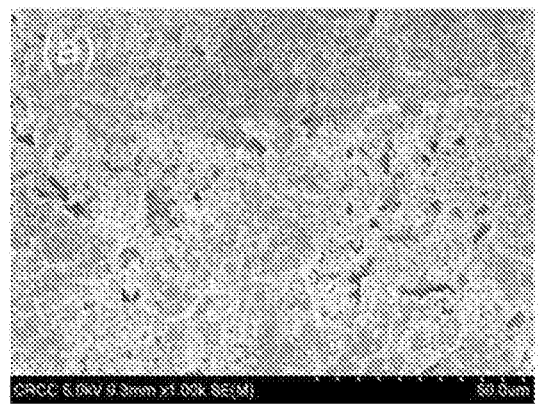
FIG. 38A is an SEM photograph of a top view of a wall of a honeycomb body comprising discrete regions of filtration material deposits formed on a wall at an axial distance of 10% from the inlet end of the honeycomb body.
Figure 38B:
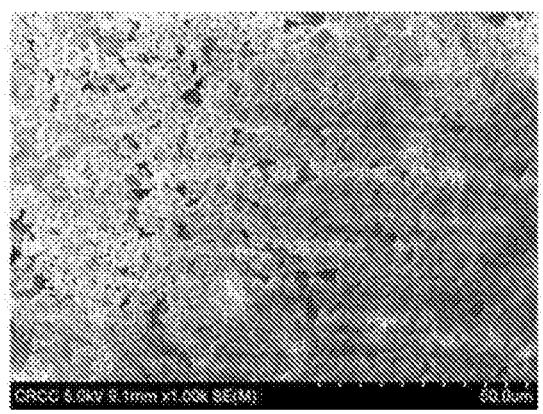
FIG. 38B is an SEM photograph of a top view of a wall of a honeycomb body comprising discrete regions of filtration material deposits formed on a wall at an axial distance of 50% from the inlet end of the honeycomb body;]
Figure 38C:
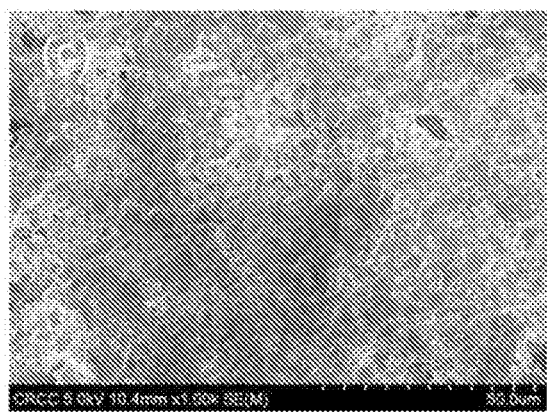
FIG. 38C is an SEM photograph of a top view of a wall of a honeycomb body comprising discrete regions of filtration material deposits formed on a wall at an axial distance of 90% from the inlet end of the honeycomb body.

After the various condition tests, the material of Example 11 was examined with a scanning electron microscope, and the microstructure of the material after use is shown in FIGS. 38A-C. As can be seen from FIGS. 38A-C, the material distribution on the wall is substantially similar to that of Examples 9 and 14. With the increasing the depth from filter inlets, the material became thicker. All the open pores under the surface were filled by the particles, which led to the high filtration efficiency of filters. The Examples demonstrated that the usage of high temperature binder was an effective way to build a stable material structure.

Circularity Measurements

Figure 39:
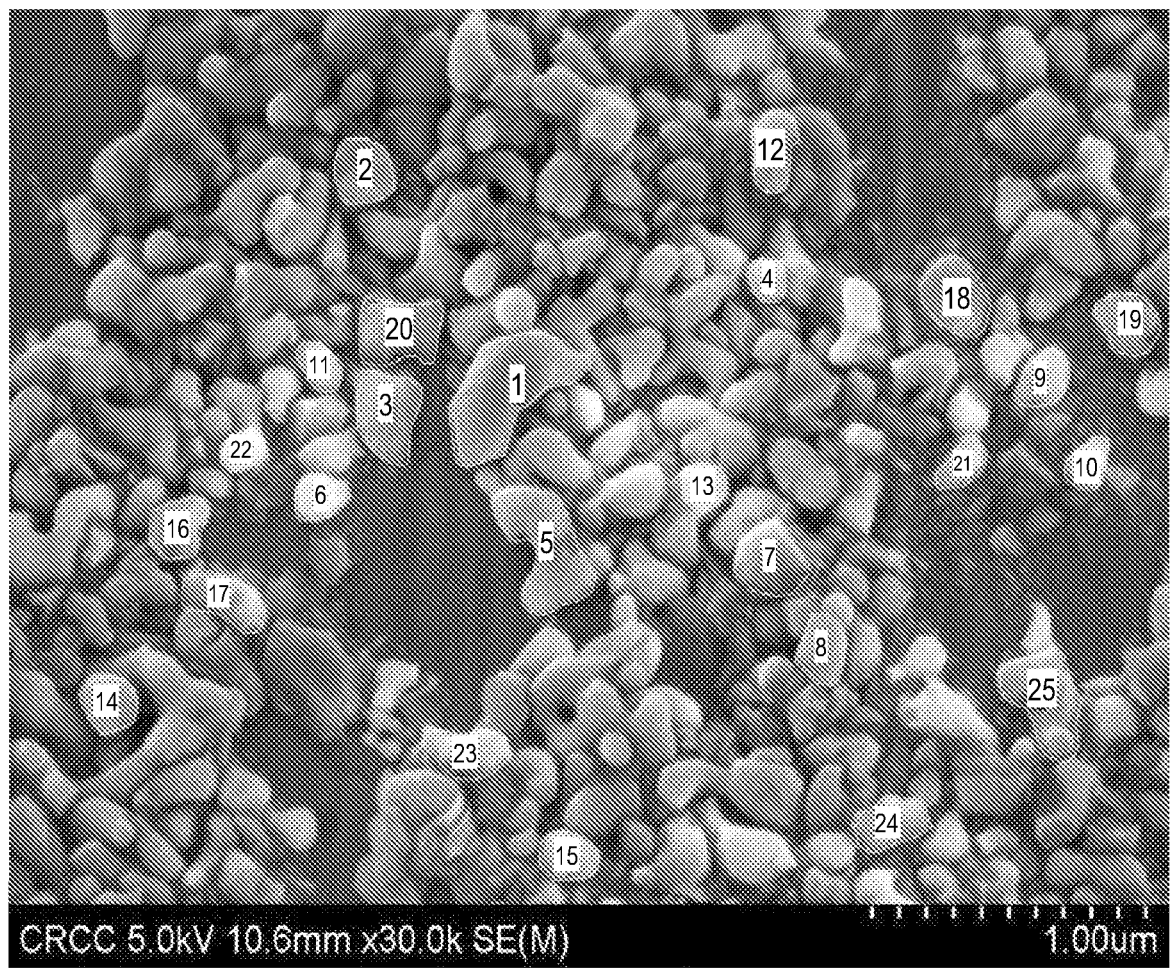
FIG. 39 is a close-up annotated SEM photograph of exemplary primary particles measured for circularity.

A sample made similar to Examples 9-14 was examined using a scanning electron microscope. Primary particles and aggregate particles (agglomerates) were measured for circularity. FIG. 39 shows primary particles measured by SEM. The measured primary particles were selected randomly from the individual particles. Table 12 provides a tabulation of the measured data of 25 particles.

TABLE 12

| Sampling ID | Area | Perim. | Circ. |
|---|---|---|---|
| 1 | 0.15 | 1.701 | 0.651 |
| 2 | 0.047 | 0.793 | 0.94 |
| 3 | 0.069 | 1.035 | 0.805 |
| 4 | 0.019 | 0.506 | 0.922 |
| 5 | 0.108 | 1.512 | 0.594 |
| 6 | 0.029 | 0.645 | 0.884 |
| 7 | 0.06 | 0.915 | 0.896 |
| 8 | 0.038 | 0.737 | 0.885 |
| 9 | 0.033 | 0.681 | 0.892 |
| 10 | 0.025 | 0.596 | 0.875 |
| 11 | 0.024 | 0.585 | 0.88 |
| 12 | 0.043 | 0.82 | 0.804 |
| 13 | 0.024 | 0.562 | 0.944 |
| 14 | 0.037 | 0.702 | 0.938 |
| 15 | 0.035 | 0.696 | 0.916 |
| 16 | 0.041 | 0.772 | 0.873 |
| 17 | 0.048 | 0.912 | 0.722 |
| 18 | 0.058 | 0.886 | 0.934 |
| 19 | 0.045 | 0.789 | 0.903 |
| 20 | 0.07 | 1.092 | 0.737 |
| 21 | 0.026 | 0.642 | 0.785 |
| 22 | 0.02 | 0.525 | 0.891 |
| 23 | 0.048 | 0.897 | 0.746 |
| 24 | 0.045 | 0.846 | 0.795 |
| 25 | 0.083 | 1.2 | 0.727 |
| Mean | | 0.049 | 0.842 |
| SD | | 0.03 | 0.29 |
| Min | | 0.019 | 0.506 |
| Max | | 0.15 | 1.701 |

Figure 40:
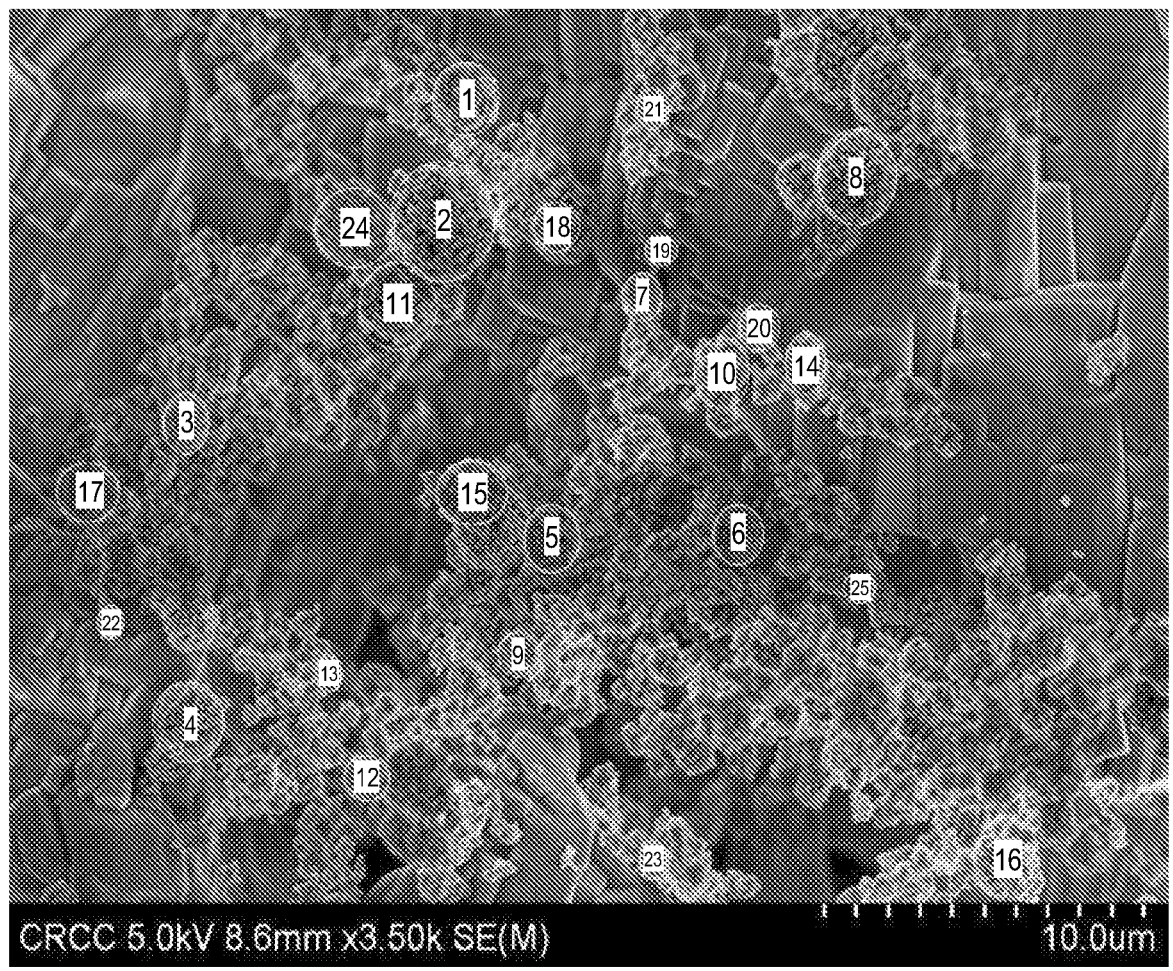
FIG. 40 is an SEM annotated photograph of exemplary agglomerates measured for circularity.

The agglomerates that were measured are shown in the SEM photograph of FIG. 40. The measured agglomerates were selected randomly. Table 13 provides a tabulation of the measured data of 25 agglomerates.

TABLE 13

| Sampling ID | Area | Perim. | Circ. |
|---|---|---|---|
| 1 | 3.25 | 6.382 | 1 |
| 2 | 8.404 | 10.273 | 1 |
| 3 | 1.86 | 4.852 | 0.993 |
| 4 | 3.844 | 6.951 | 1 |
| 5 | 2.528 | 5.639 | 0.999 |
| 6 | 2.007 | 5.027 | 0.998 |
| 7 | 1.289 | 4.022 | 1 |
| 8 | 5.032 | 7.956 | 0.999 |
| 9 | 1.205 | 3.891 | 1 |
| 10 | 2.63 | 5.77 | 0.993 |
| 11 | 4.557 | 7.562 | 1 |
| 12 | 1.368 | 4.153 | 0.997 |

TABLE 13-continued

| Sampling ID | Area | Perim. | Circ. |
|---|---|---|---|
| 13 | 0.616 | 2.798 | 0.989 |
| 14 | 1.664 | 4.634 | 0.974 |
| 15 | 3.042 | 6.207 | 0.992 |
| 16 | 3.64 | 6.776 | 0.996 |
| 17 | 2.481 | 5.595 | 0.996 |
| 18 | 1.526 | 4.371 | 1 |
| 19 | 0.638 | 2.841 | 0.993 |
| 20 | 1.288 | 4.022 | 1 |
| 21 | 0.87 | 3.322 | 0.99 |
| 22 | 0.606 | 2.754 | 1 |
| 23 | 0.711 | 3.016 | 0.982 |
| 24 | 4.287 | 7.344 | 0.999 |
| 25 | 0.616 | 2.798 | 0.989 |
| | 2.398 | 5.158 | 0.995 |
| | 1.833 | 1.939 | 0.007 |
| | 0.606 | 2.754 | 0.974 |
| | 8.404 | 10.273 | 1 |

Examples 15-18 Binder

In one or more embodiments, aerosol-deposited inorganic deposits on a honeycomb filter body create a filtration article that is water resistant.

Advantages. The articles made herein are highly water resistant, which can endure harsh water conditions repeatably without suffering detrimental filtration efficiency loss. Methods of making the formulations are simple, without sophisticated preparation procedure. Articles made of the honeycomb filter body and inorganic deposits are able to maintain original mechanical durability and chemical stability of the underlying honeycomb filter body.

Testing—Binder Examples

Smoke Filtration Efficiency (FE)—Modified

The smoke filtration efficiency performance for Examples 15-18 was modified from the SMOKE FILTRATION EFFICIENCY discussed above by using a concentration in the chamber of 211 particles/cm$^3$.

Water Soak Test—Modified.

The water soak performance for Examples 15-18 was modified from the WATER SOAK TEST discussed above by using nominally 50 grams of water for 5.2"×5" part (rather than nominally 300 grams).

Basic Water Nebulizer Test.

Another method for evaluating durability of a filtration article is a basic water nebulizer test, which is used to evaluate the impact of water vapor coming from an engine during vehicle cold start simulating a filter in a close-coupled position relative to the engine. The BASIC WATER NEBULIZER TEST is a variation of the WATER NEBULIZER TEST discussed above.

As used herein, "Basic Water Nebulizer Test" refers to testing an article as follows.

An article is first measured for baseline FE/dP measurement by the smoke filtration efficiency test. The article is placed in an oven at 650° C. and held at 650° C. for 9 hours for heat treatment.

The article is weighed at room temperature. The article is placed in a jog on a box opening with the honeycomb body inlet facing toward incoming water mist produced by a nebulizer. The article is exposed to a fine mist or spray of water using a nebulizer or atomizer as described in U.S. Pat.

No. 7,520,918. The nebulizer and a fan were turned on to a constant speed and let water mist run through the part long enough to reach a target amount of water on the part (e.g., 70 g). Then the sample is dried in oven at 150° C. until it reaches the original weight. Another FE/dP measurement is conducted to evaluate the filtration efficiency change after exposure to the water.

According to one or more embodiments, honeycomb bodies with inorganic material deposited thereon exhibit improved water resistance as a result of high binder loading. In the Examples, and according to one or more embodiments, improved resistance to water exposure refers to when there is no more than 5% loss in clean PN FE performance observed. In one or more embodiments, due to a selected binder's inherent hydrophobicity, increasing binder loading provides an additional benefit of improved resistance to water while maintaining a viable manufacturing process to provide a sprayable suspension. The suspension formulations described according to one or more embodiments are atomized during an aerosol deposition process to produce products with high temperature tolerance and structural stability.

Figure 41:
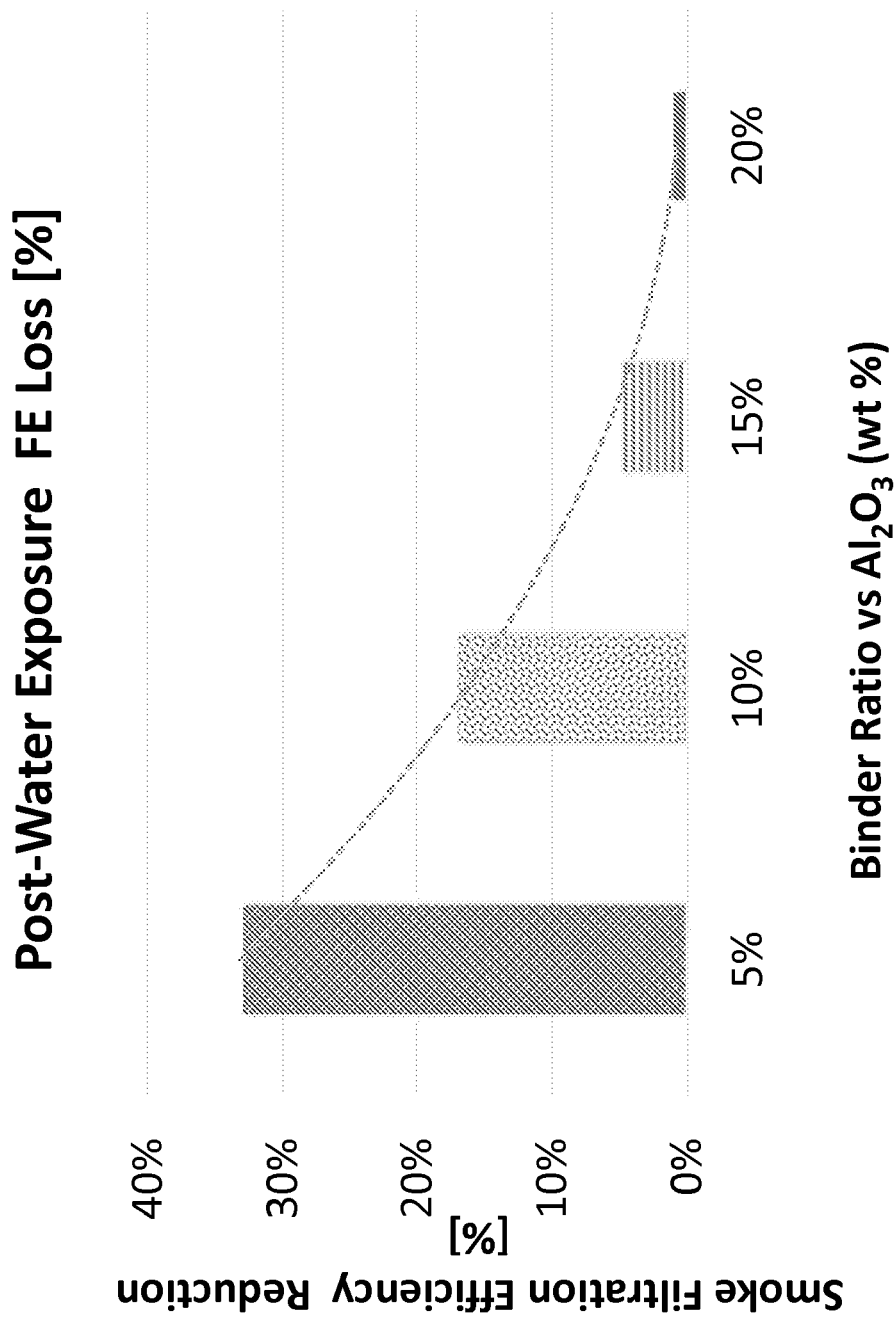
FIG. 41 is a graph depicting the effect of binder percentage on smoke filtration efficiency reduction after exposure to a basic water nebulizer test.

As demonstrated in FIG. 41 and the Examples, a correlation of binder amount added to the suspension and the water resistance of the honeycomb bodies containing aerosol-deposited inorganic material was demonstrated by the filtration articles retaining a high percentage of filtration efficiency after exposure to the basic water nebulizer test. Stated another way, the filtration efficiency of the filtration articles produced according to one or more embodiments was maintained after exposure to water. In one or more embodiments, the loss in filtration efficiency of the honeycomb bodies is less than 1%, less than 2%, less than 3%, less than 4%, less than 5%, less than 6%, less than 7%, less than 8%, less than 9% or less than 10% lower than the filtration efficiency of the honeycomb body prior to water exposure. According to embodiments, by increasing binder amount with respect to the inorganic material at average particle sizes ranging from 150 nm to 500 nm and surface areas ranging from 4 $m^2/g$ to 15 $m^2/g$, the inorganic material layer was shown to be more resilient to water exposure as is indicated by a reduction in loss filtration efficiency of the honeycomb body compared to the filtration efficiency of the honeycomb body prior to water exposure.

Example 15

Figure 42:
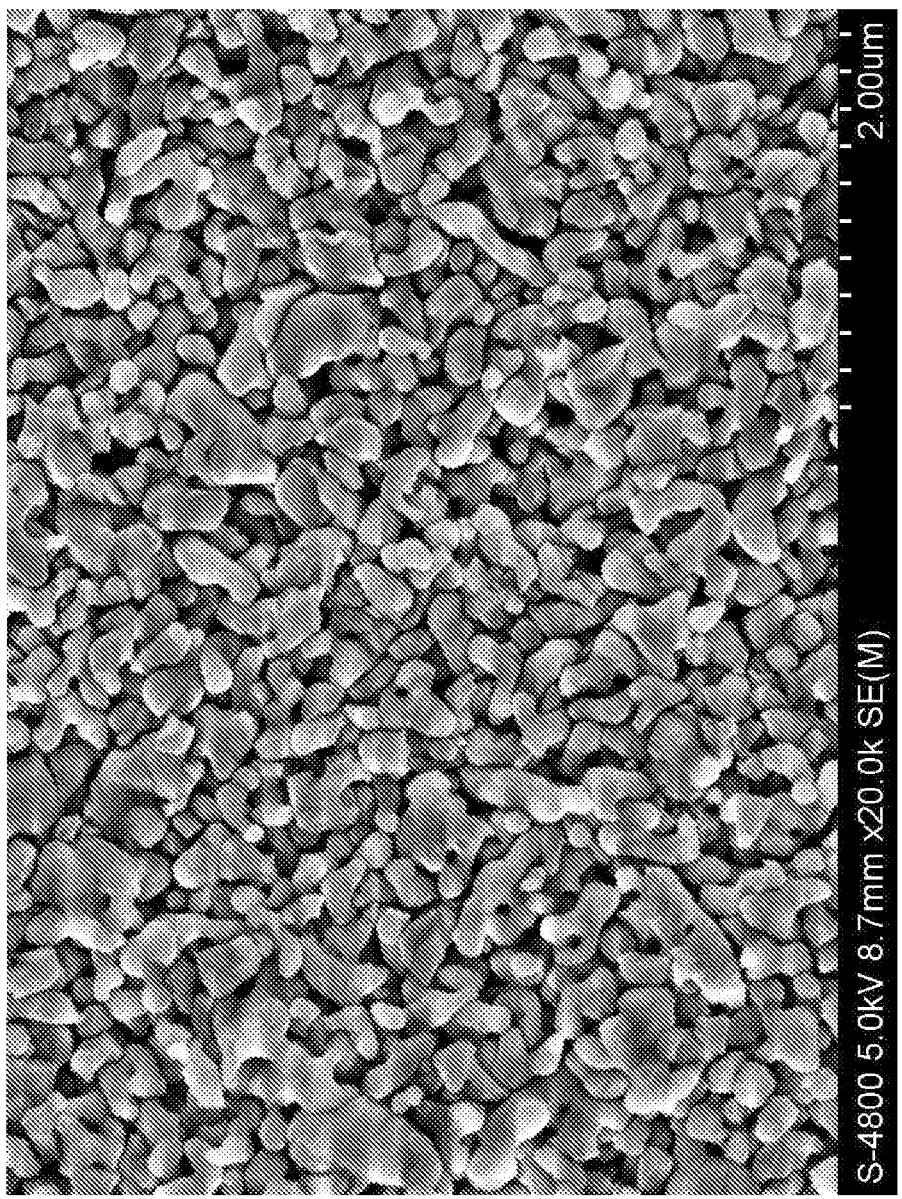
FIG. 42 is an SEM photograph showing alumina particles used to make suspensions according to an embodiment of the disclosure.

High purity alpha alumina (>99%) suspension was obtained from Beijing DK Nano technology Co. LTD. The average particle size of the alumina was 150 nm by SEM. A Scanning Electron Microscopy (SEM) image of the alumina in the suspension as-received is shown in FIG. 42. The suspension as-received contained about 20 wt % of alumina, dispersed in Analytical Grade Ethanol (AR, Sinopharm Group Co. LTD). An example composition is as follows. A raw powder of 150 nm median particle size alumina in suspension was 20 wt. % versus the total weight of the suspension in analytical grade ethanol (greater than 99.7%). The content (wt % versus total suspension) of the solvent was 76 wt. %. The solution contained other additives in amount of about 3 wt %. The suspension of alumina was then further diluted with ethanol to 11 wt % alumina. Dowsil 2405 binder was present at 15 wt. % versus the total weight of the alumina in the diluted suspension.

The silicone resin under designation Dowsil 2405 (Dimethyl Siloxane w/Me Silsesquioxanes & n-Octyl Silsesquioxanes, Methoxy-term, available from DOW) was added to the suspension formulation based on the alumina in the suspension. The binder amount to be used was based on the actual weight of area generated by the primary particle size used and in the case of 150 nm, the ratio was set to be 20:3 which is the specified to be "high binder loading" according to one or more embodiments.

The mixture of alumina, ethanol, and binder was mechanically stirred to obtain a uniform suspension before performing a multiple-step aerosol deposition process to deposit the desired inorganic layer onto the honeycomb filter wall. An aerosol deposition process was conducted as follows. A t-style chamber was used with a single nozzle. Heating bands were used at the top cone area and around the chamber body of deposition area.

A two-phase fluid nozzle (PF 1250+PA 64, Spraying systems Co.) was used to form the aerosol droplets during the atomization step. The atomizing gas was supplied by a nitrogen cylinder and adjusted by the gas mass flow controller to be 5 $Nm^3/hr$. The mixed suspension was delivered by the injector pump and the liquid injection rate was fixed at 10 ml/min.

In the drying step, the air flow provided by blower fan was sucked into the system through top inlet and heated up by both heating bands covering around the cone area at the inlet as well as the body of the deposition chamber. The temperatures of cone area and deposition body were set at 350° C. and 120° C. respectively. The atomizing droplets were dried in the hot air flow and formed secondary aggregate particles before the inlet of honeycomb filters. In the depositing step, secondary aggregates were carried by the flow and deposited under the wall of the honeycomb filters to form the layer.

The honeycomb filter body tested had the following characteristics: diameter of 4.055 inches (13.208 cm), Length of 5.47 inches 12.7 cm), cells per square inch (CPSI) of 200, wall thickness of 8 mils 203 μm), and average pore size of 13.5 μm. Average honeycomb filter body porosity was 55%.

| Type of chamber | T-style |
| --- | --- |
| Solids wt. % (alumina) | 11% |
| Dispersants wt. % | 0.5~2% |
| binder wt. % | 15% |
| spraying nozzle | External nozzle PF1250 + PA64 |
| liquid flow rate | 8.5 g/min (10 ml/min) |
| atomizing gas flow rate | 5 $Nm^3/hr$ |
| carrier gas flow rate | 21.5 $Nm^3/hr$ |
| Mixing area temperature (° C.) | 110-120° C. |
| Above parts temperature(° C.) | 90-110° C. |

Example 16

Figure 43B:
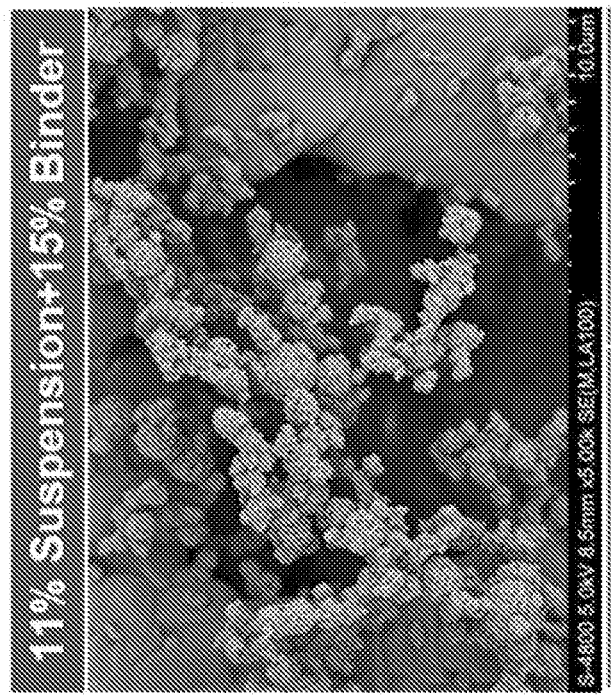
FIG. 43B is an SEM photograph showing alumina agglomerates generated from a suspension containing 15% binder according to an embodiment of the disclosure.
Figure 43A:
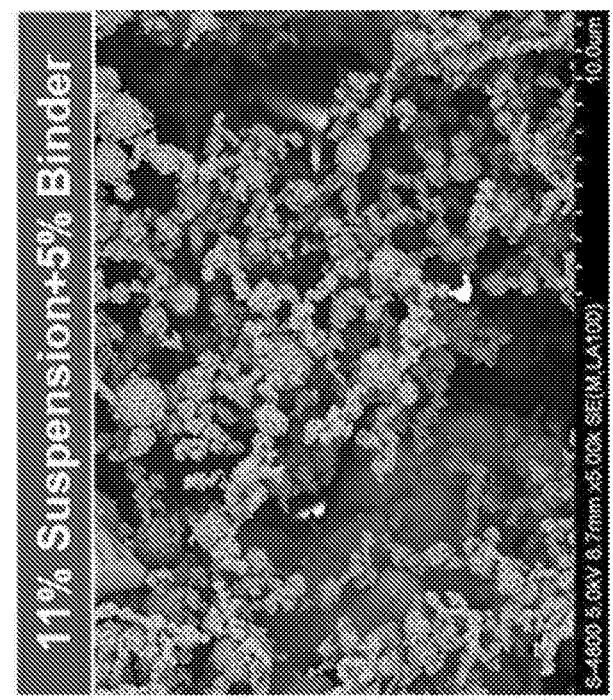
FIG. 43A is an SEM photograph showing alumina agglomerates generated from a suspension containing 5% binder according to an embodiment of the disclosure.

Referring to FIGS. 43A-43B and Table 14, it can be seen that the d50 of agglomerates shifted toward larger sized agglomerates (from 1.47 μm to 1.89 μm) as binder content increased. Agglomerates tended to form chain-like structure when the suspension was deposited on the surface of the porous walls of a honeycomb body or the inside of the pores. The addition of more binder had an impact on the characteristics of the dried agglomerates and the nature and strength of the inter-particles interactions produced by the process.

TABLE 14

| Particle Size Distribution (μm) | 11% Suspension/ 5% Binder | 11% Suspension/ 15% Binder |
|---|---|---|
| d10 | 1.02 | 1.45 |
| d50 | 1.47 | 1.89 |
| d90 | 2.48 | 2.67 |

Example 17

Figure 44:
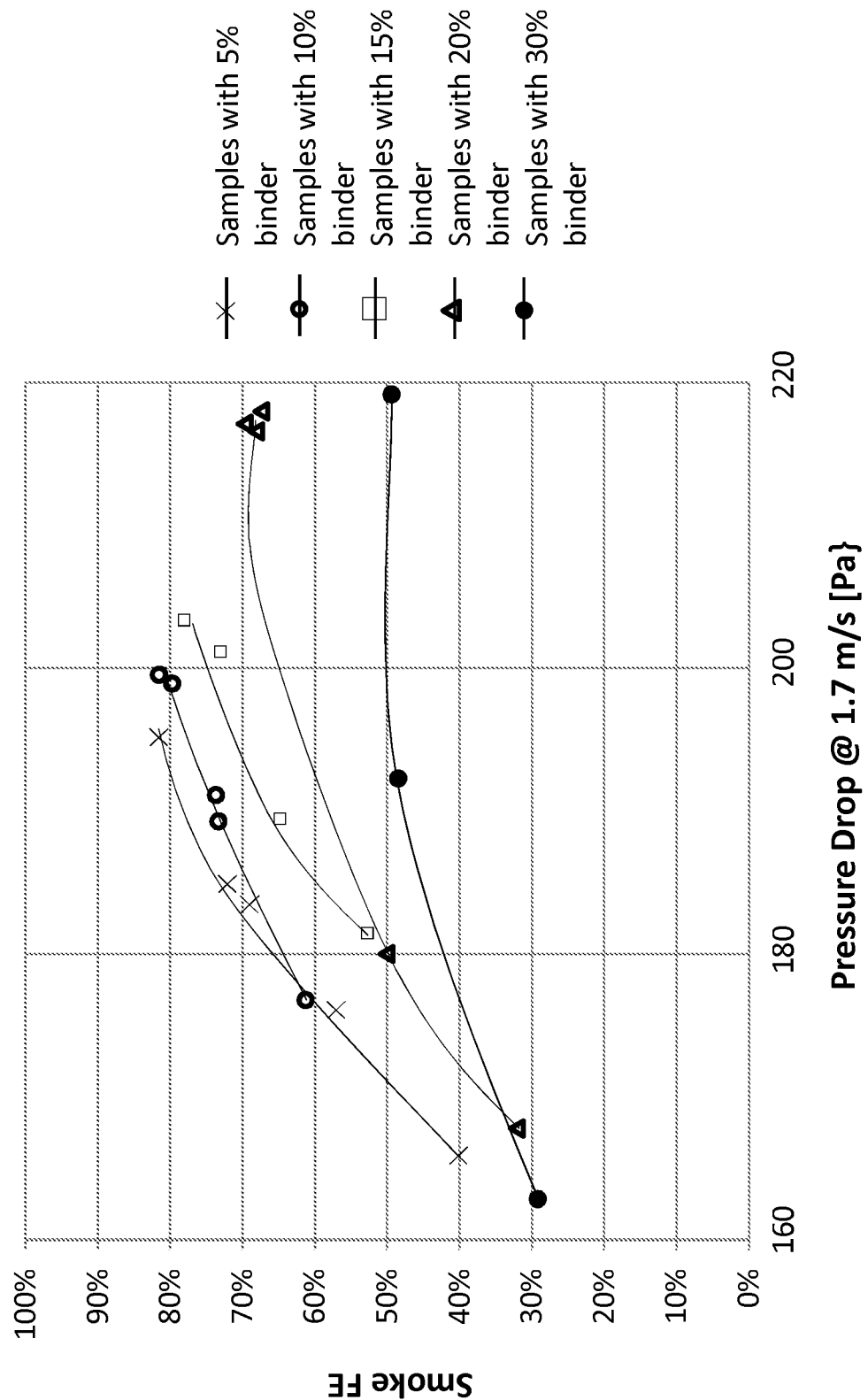
FIG. 44 is a graph of smoke filtration efficiency versus pressure drop for samples prepared in accordance with embodiments of the disclosure.

Referring now to FIG. 44, which is a graph of smoke filtration efficiency versus pressure drop for wall flow filters having alumina deposited thereon at different binder loadings, a trend is observed as the binder amount was increased. As the binder level in the suspension was increased, the filtration efficiency with respect to pressure drop tended to flatten out making it more difficult to add as filtration efficiency compared with low binder loading formulation.

A comparison of characteristics of a suspension having 5% binder level and a suspension having 15% binder level with respect to viscosity versus shear rate and surface tension versus temperature showed that increasing the binder amount had a negligible impact on these suspension properties. Therefore, increasing a binder amount would not be expected to negatively impact an aerosol deposition process.

Example 18

Water Test Impact on Inorganic Layer Structure

Figure 45B:
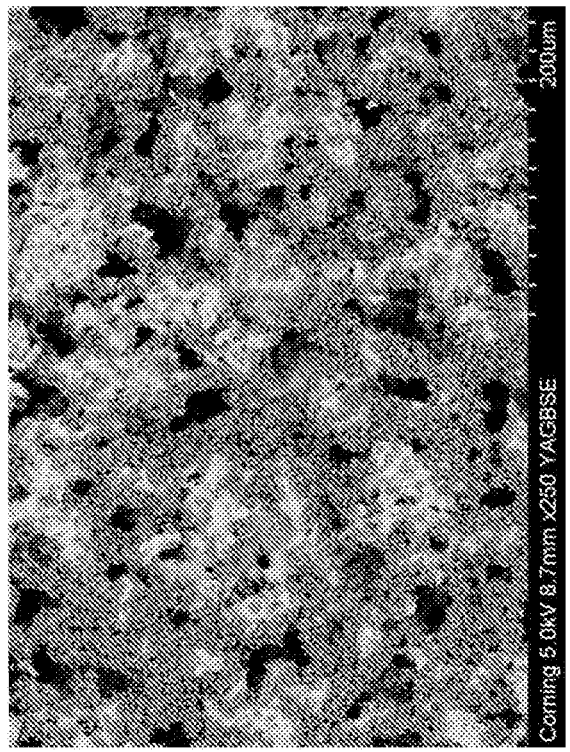
FIG. 45B is an SEM photograph showing alumina agglomerates generated from a suspension with 5% binder on a wall flow filter wall surface at 50% depth from inlet after water contact.
Figure 45A:
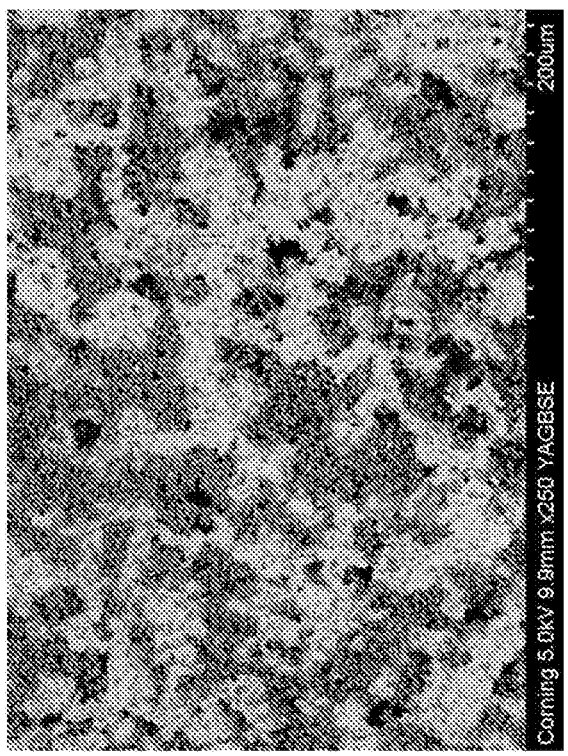
FIG. 45A is an SEM photograph showing alumina agglomerates generated from a suspension with 5% binder on a wall flow filter wall surface at 50% depth from inlet before water contact.

SEM images were taken on sample with 5% binder loading before and after the water soak test (50 grams). FIGS. 45A and 45B are a top view of the honeycomb porous channel wall at 50% depth. FIG. 45A shows the inorganic material structure before contact with water, where inorganic material was seen as uniformly distributed around the pores. After contact with water, as shown in FIG. 45B, the inorganic material showed a more exposed surface, suggesting that the agglomerates were shifted from their original location.

Figure 46B:
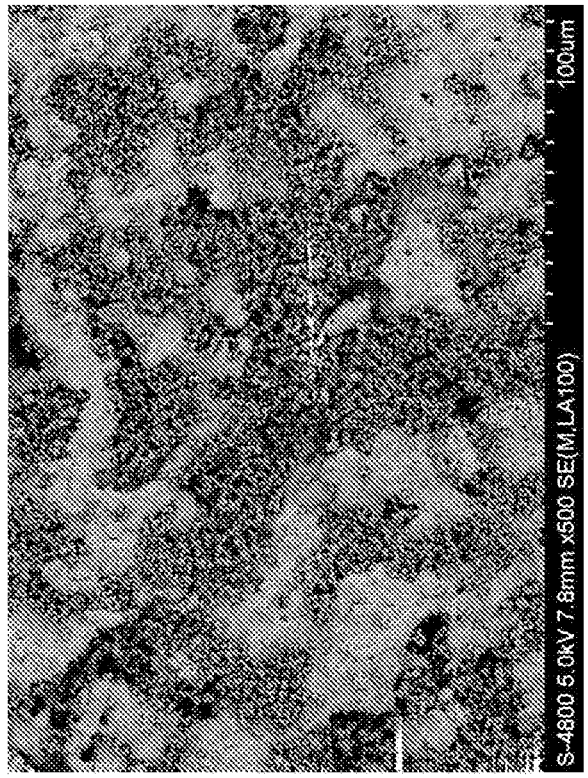
FIG. 46B is an SEM photograph showing alumina agglomerates generated from a suspension with 15% binder on a wall flow filter wall surface at 50% depth from inlet after water contact.
Figure 46A:
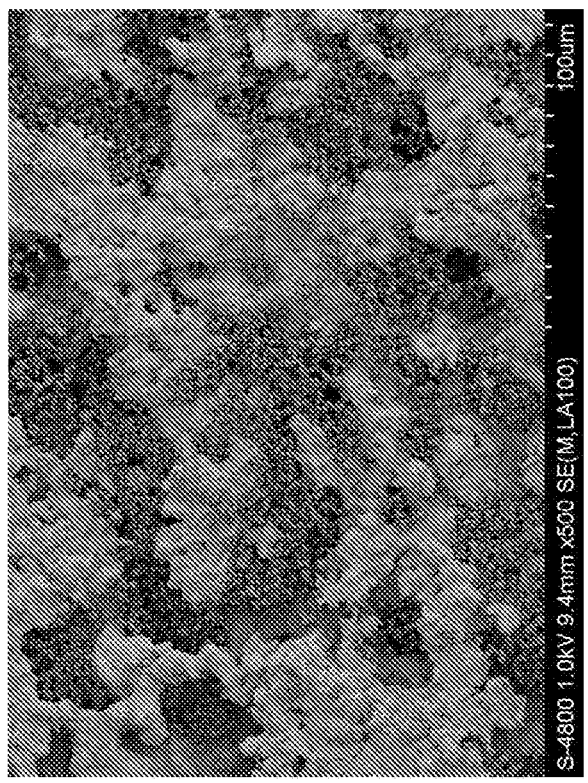
FIG. 46A is an SEM photograph showing alumina agglomerates generated from a suspension with 15% binder on a wall flow filter wall surface at 50% depth from inlet before water contact.

FIGS. 46A and 46B show the inorganic material morphology before and after the basic water nebulizer test (70 g) for a sample having 15 wt. % binder. The 15 wt. % binder resulted in improved inorganic material integrity against water, indicated by the reduction on exposed open pores. The inorganic material structure stayed relatively intact.

Figure 47:
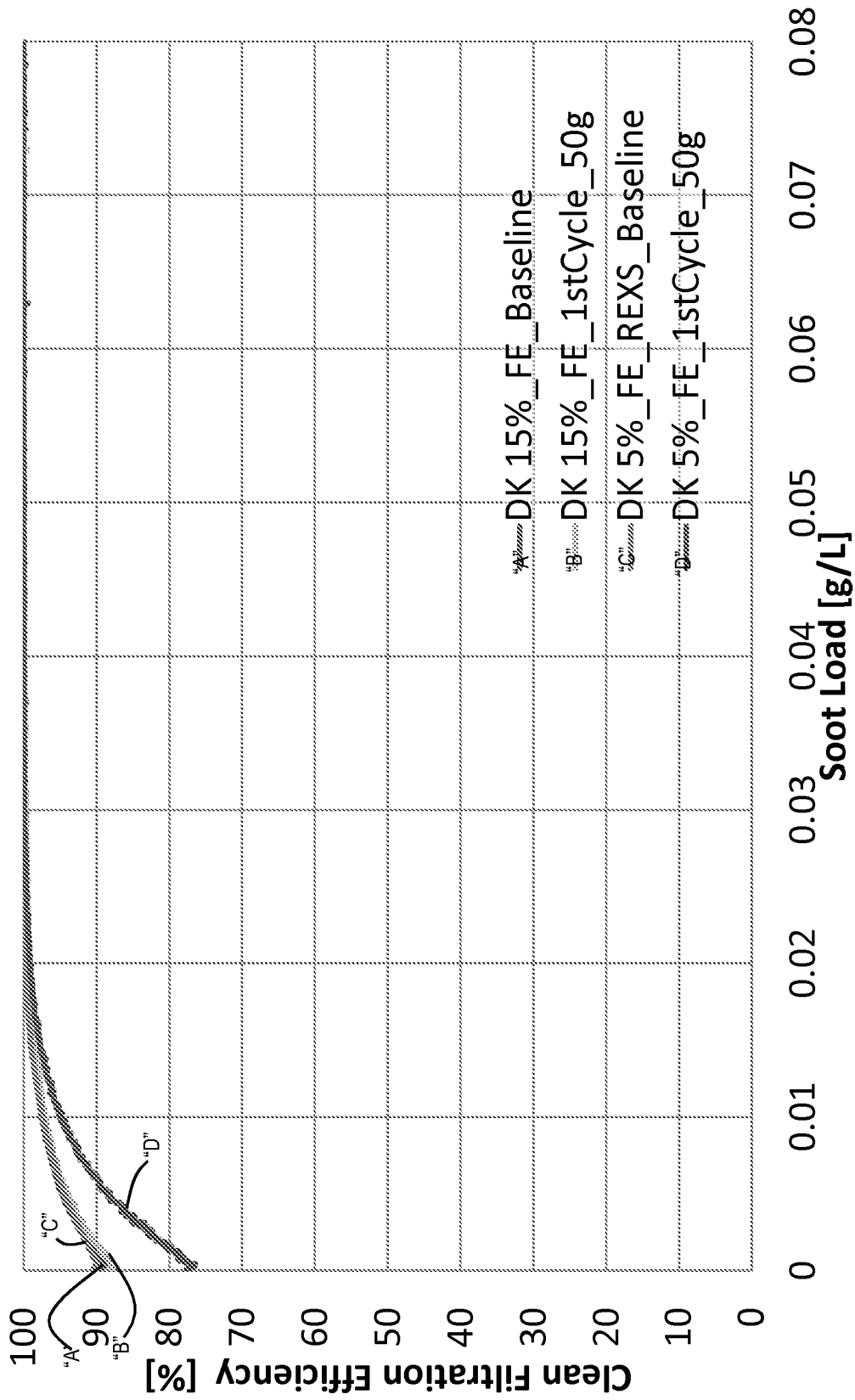
FIG. 47 is a graph of clean filtration efficiency versus soot loading for samples after exposure of samples to water.
Figure 48:
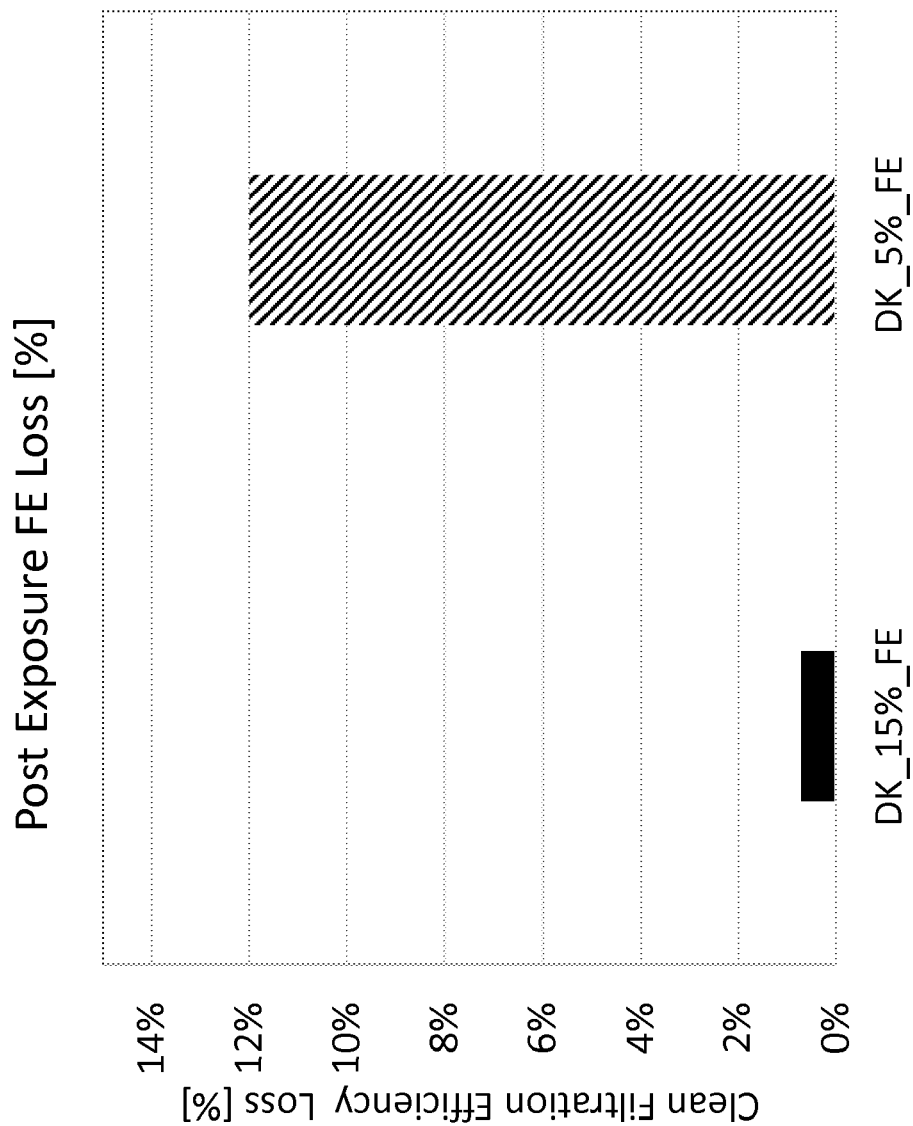
FIG. 48 is a graph showing loss of clean filtration efficiency after exposure of samples to water.

As shown in FIG. 47, performance of a honeycomb filter body with aerosol-deposited inorganic material after the water soak test (50 g) was evaluated based on the clean filtration efficiency test at different soot loading levels. Both the original binder (5 wt %) and high binder loading (15 wt %) parts exhibited similar starting filtration efficiency. As shown in FIG. 48, the article with 15 wt % binder showed better water durability with FE loss within 1% at 0 g/L soot loading while the 5 wt % binder part suffered more than a 10% drop in FE.

Figure 49:
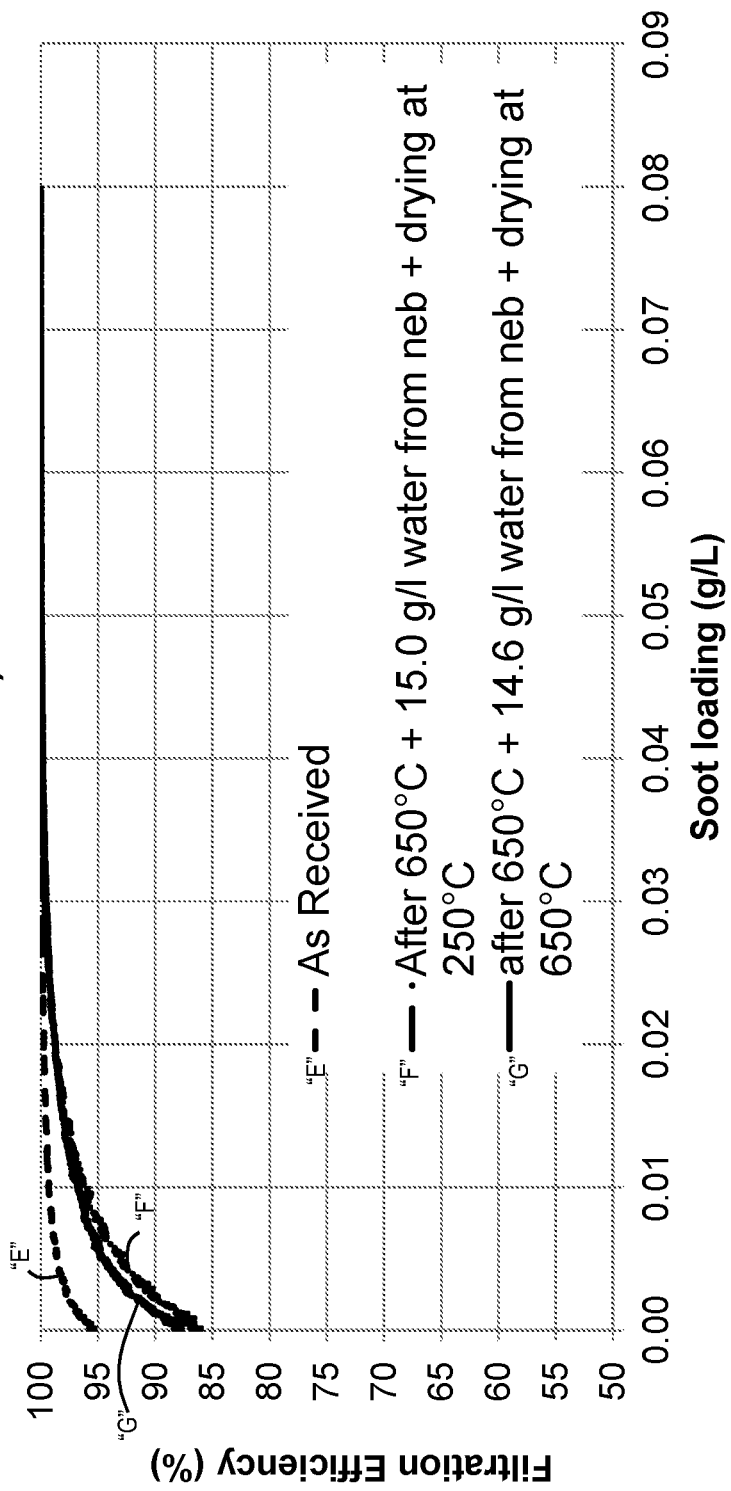
FIG. 49 is a graph of filtration efficiency versus soot loading after exposure of samples to water.
Figure 50:
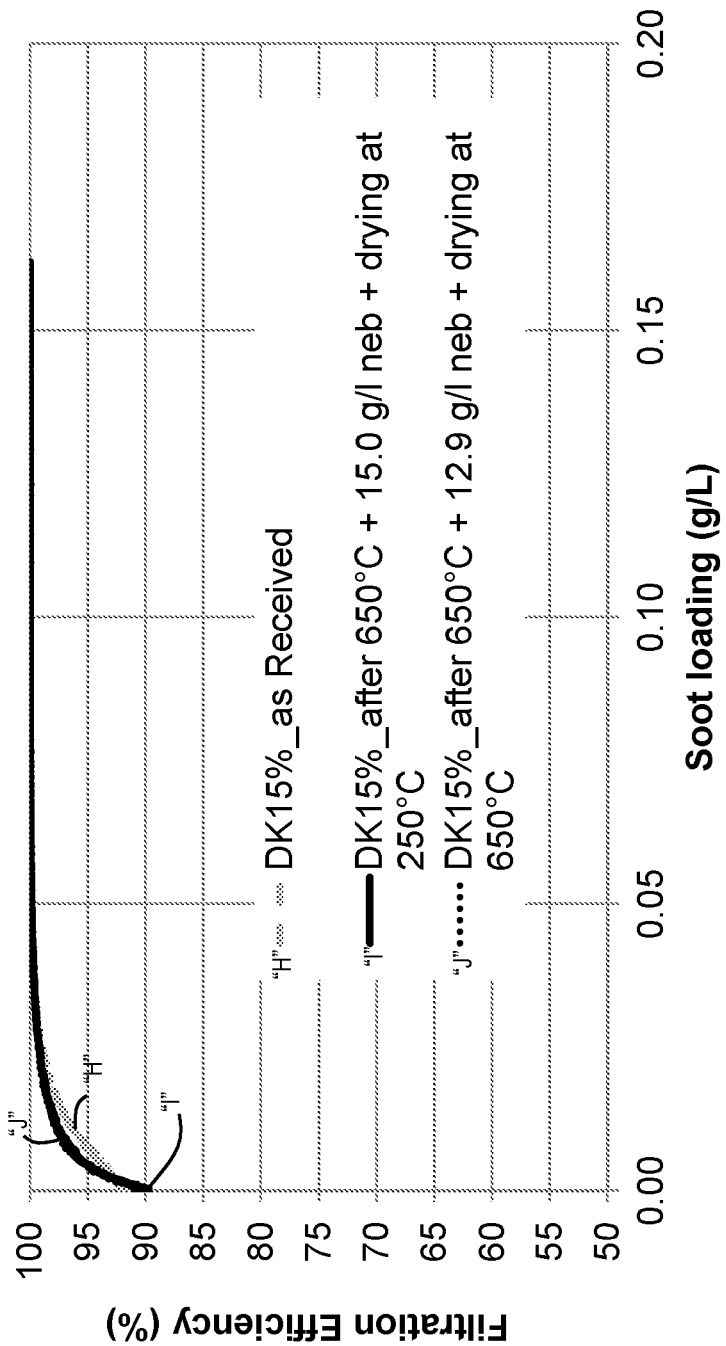
FIG. 50 is a graph of filtration efficiency versus soot loading after exposure of samples to water.
Figure 51:
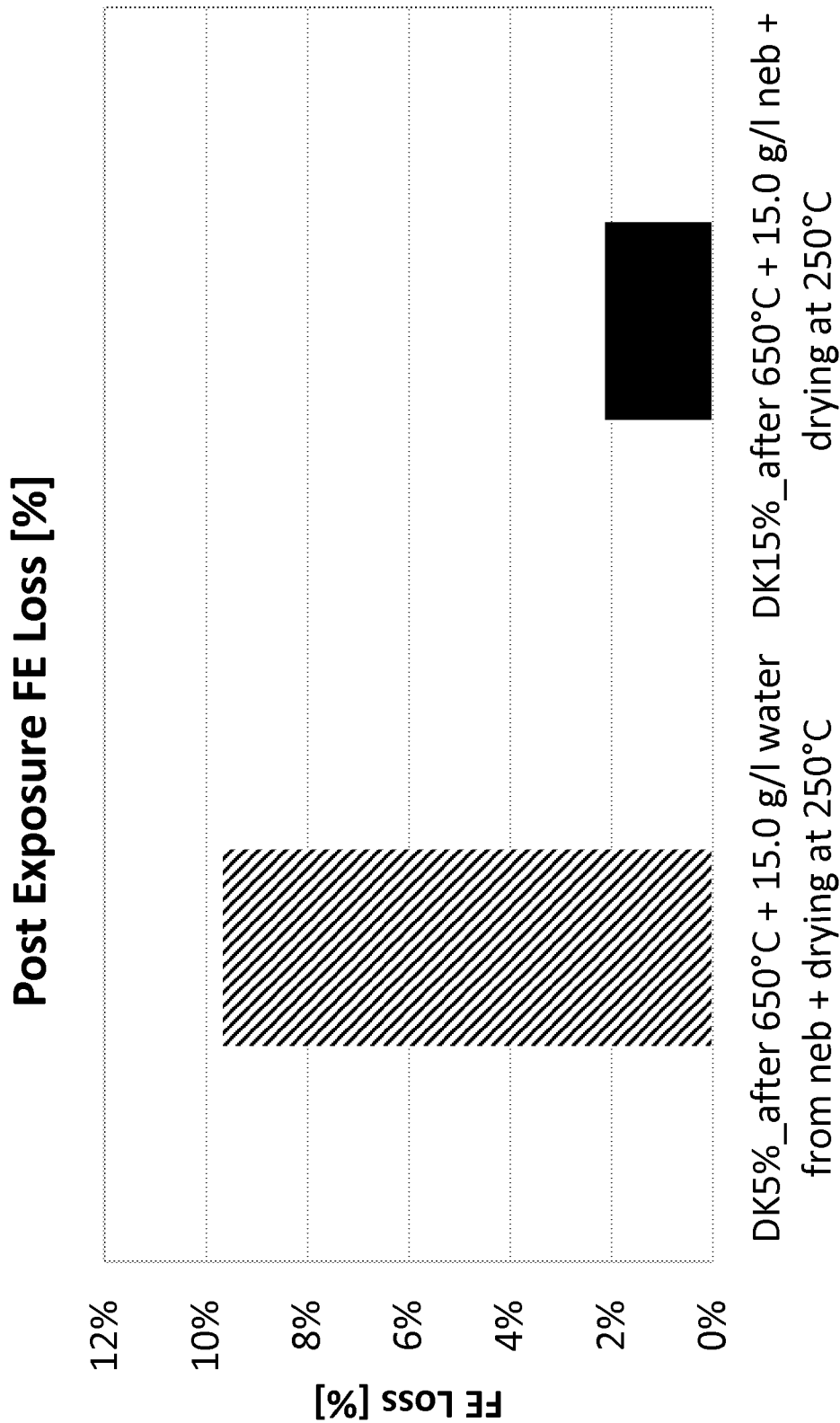
FIG. 51 is a graph showing loss of filtration efficiency after exposure of a sample to water.

The basic water nebulizer test was also conducted, comparing 5 wt. % and 15 wt. % binder. Smoke FE loss is illustrated in FIGS. 49 and 50. For the article made with 5 wt. % binder, FE dropped from as-received 95.4% to final 87% at 0 g/L soot loading with the addition of 15 g/L water loading, resulting in a FE loss of about 10%. For the article with 15 wt. % binder, the FE dropped from as-received 91.7% to final 90% at 0 g/L soot loading with addition of same water loading, resulting in a mere 2% FE drop. The comparison between FE drop after the basic nebulizer tests from two formulations are shown in FIG. 51.

Testing—Dispersant Example 19. In accordance with methods above.

Example 19 Dispersant

Effects of different dispersants were analyzed by testing various slurries for aerosol deposition.

The underlying wall flow filters had the following characteristics: diameter 5.2 inches (13.208 cm), Length of 5.07 inches (12.7 cm), cells per square inch (CPSI) of 200, wall thickness of 8 mils (203 μm), and average pore size of 13.5 μm.

The following alumina sources were tested: AL-022719-3-4400, AL-022719-1.5-4400-1.5-TEA, AL-022719-1.5-4400-1.5-TIPA, AL-022719-3.0 M600, as-received DK-11-15-190228-01. TEA is triethanol amine. TIPA is triisopropanol amine. M600 is Jeffamine 600 (molecular weight) monoamine. Reference to "1.5" means 1.5% addition to the slurry; and reference to "3.0" means 3.0% addition to the slurry. Table 15 provides a summary of the apparatus and operating parameters.

TABLE 15

| Type of chamber | T-style chamber |
|---|---|
| Solids wt. % (alumina) | ~11% |
| Dispersants wt. % | 1.5-3% |
| binder wt. % | ~15% |
| spraying nozzle | internal mix nozzle SU11 |
| liquid flow rate | 18 g/min |
| atomizing gas flow rate | 5 Nm³/h |
| carrier gas flow rate (Nm³/h) | 50 |
| heat transmitter (° C.) | 150 |
| "Arm" temperature (° C.) | 135 |
| "Body" temperature (° C.) | 135 |
| Above part temperature (° C.) | 130 |

Reference to "heat transmitter" is the temperature of preheated carrier gas that enters the duct. Temperature values in Table 15 given were based on measurements and not setpoints to achieve these temperatures.

The slurries were sprayed in accordance with Table 15. Filtration articles were created by deposition of the alumina into the underlying wall flow filter. Table 16 provides deposition time (seconds), loading (g/L), Smoke Filtration Efficiency, material utilization (MU), pressure drop (Pa), and efficiency, which is Smoke FE divided by loading.

TABLE 16

| Solution | Deposition Time [sec] | Loading [g/L] | Smoke Filtration Efficiency (FE) % | Material Utilization (MU) | dP at 1.7 m/s [Pa] | Efficiency |
|---|---|---|---|---|---|---|
| AL-022719-3-4400 | 359 | 7.01 | 86.0% | 93% | 154 | 12.3% |
| AL-022719-3-4400 | 328 | 6.90 | 86.2% | 92% | 150 | 12.5% |
| AL-022719-3-4400 | 310 | 6.83 | 86.0% | 91% | 155 | 12.6% |
| AL-022719-1.5-4400-1.5-TEA | 225 | 4.26 | 86.4% | 81% | 130 | 20.3% |
| AL-022719-1.5-4400-1.5-TEA | 232 | 4.19 | 84.7% | 79% | 121 | 20.2% |
| AL-022719-1.5-4400-1.5-TEA | 233 | 4.30 | 86.9% | 81% | 125 | 20.2% |
| AL-022719-1.5-4400-1.5-TIPA | 233 | 4.16 | 86.1% | 81% | 124 | 20.7% |
| AL-022719-1.5-4400-1.5-TIPA | 231 | 4.16 | 85.7% | 81% | 124 | 20.6% |
| AL-022719-1.5-4400-1.5-TIPA | 236 | 4.26 | 87.8% | 83% | 130 | 20.6% |
| AL-022719-3.0 M600 | 192 | 3.61 | 86.1% | 84% | 121 | 23.9% |
| AL-022719-3.0 M600 | 194 | 3.60 | 85.1% | 84% | 122 | 23.6% |
| AL-022719-3.0 M600 | 193 | 3.68 | 83.6% | 86% | 119 | 22.7% |
| As-Received DK-11-15-190228-01 | 257 | 4.97 | 82.9% | 92% | 135 | 16.7% |
| As-Received DK-11-15-190228-01 | 265 | 5.01 | 89.5% | 93% | 145 | 17.9% |
| As-Received DK-11-15-190228-01 | 265 | 4.72 | 83.4% | 88% | 129 | 17.7% |

The final smoke FE was targeted to approximately 85% for all the conditions. It was determined during experimentation that the loading to achieve the approximately 85% FE was different, depending on the slurry composition.

Figure 52:
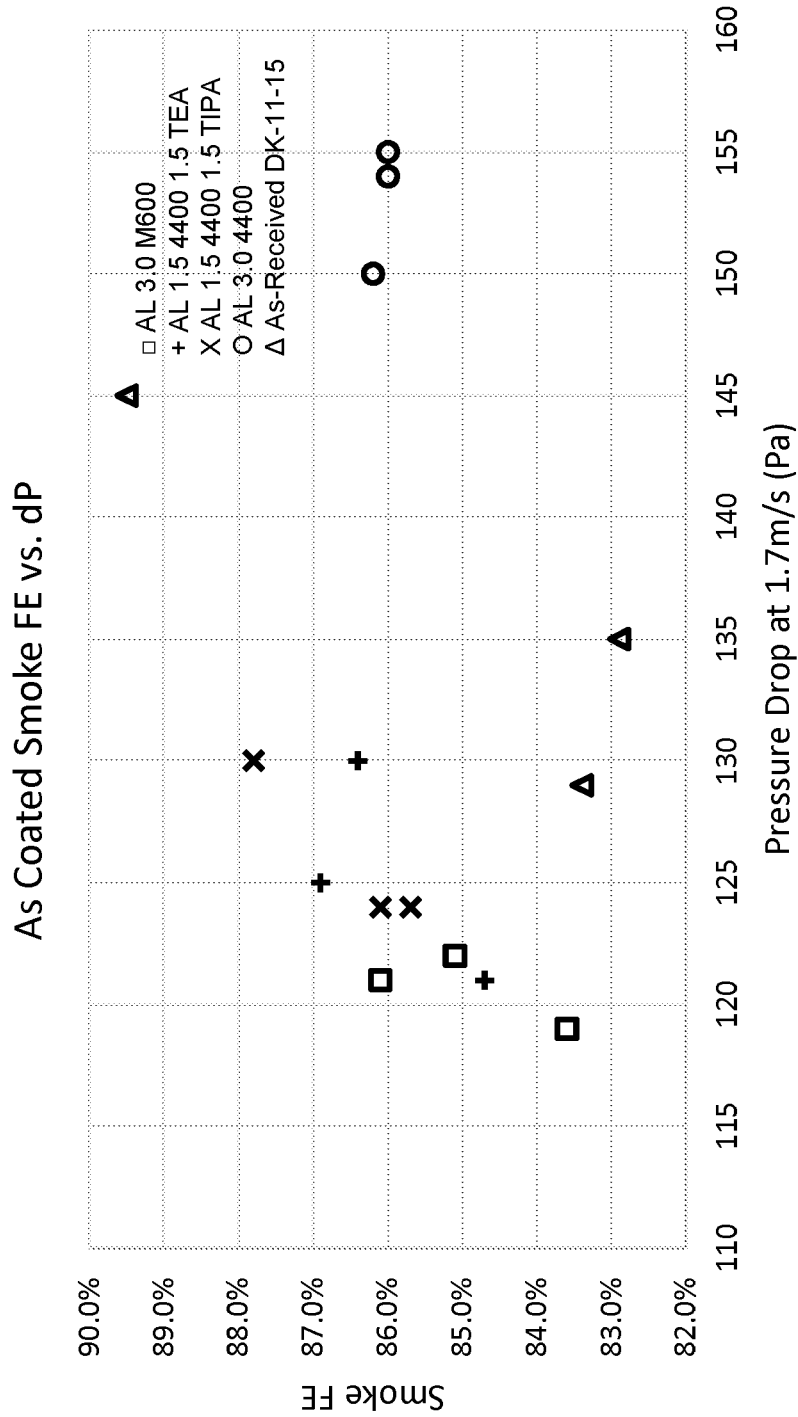
FIG. 52 is a graph of smoke FE versus pressure drop at 1.7 m/s (Pa) for different slurry compositions.

FIG. 52, which is a graph of smoke FE versus pressure drop, illustrates that there was a change in the pressure drop penalty as a function of the slurry composition.

Figure 53:
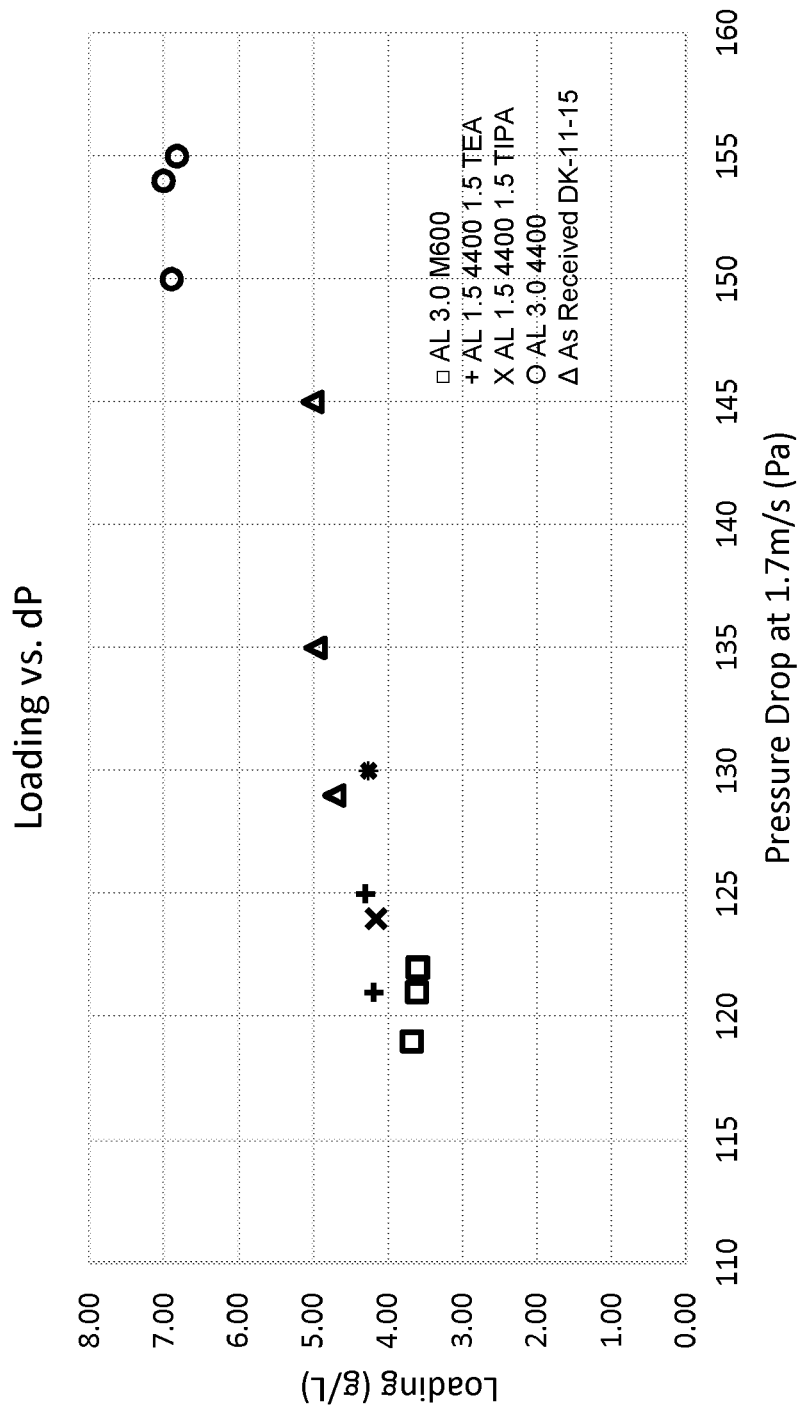
FIG. 53 is a graph of loading (g/L) versus pressure drop at 1.7 m/s (Pa) for different slurry compositions.

FIG. 53, which is a graph of loading (g/L) versus pressure drop, also illustrates that there was a change in the pressure drop penalty as a function of the slurry composition.

Figure 54:
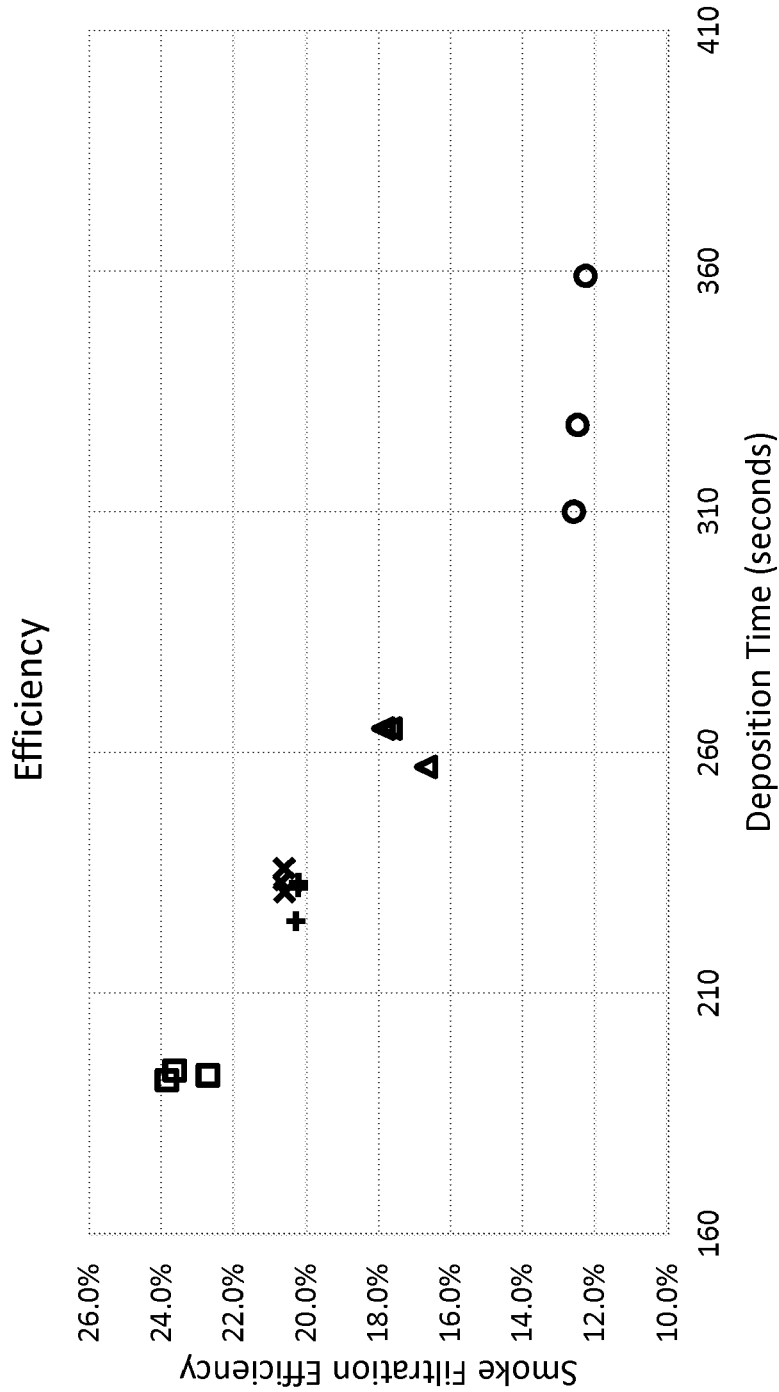
FIG. 54 is a graph of efficiency versus deposition time (seconds) for different slurry compositions.

FIG. 54, which is a graph of efficiency versus deposition time (seconds), again illustrates that there was a change in the pressure drop penalty as a function of the slurry composition.

Table 17 shows water soak test results.

Figure 56A:
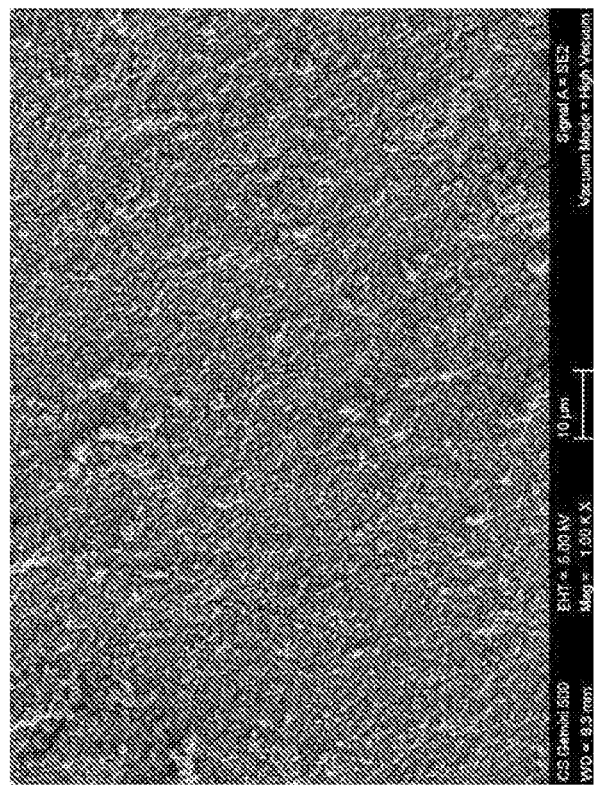
FIGS. 56A-56C provide SEM images of siloxane-alumina agglomerates spray-dried with PEG-PPG-PEG dispersant at 3% by weight in slurry.
Figure 55A:
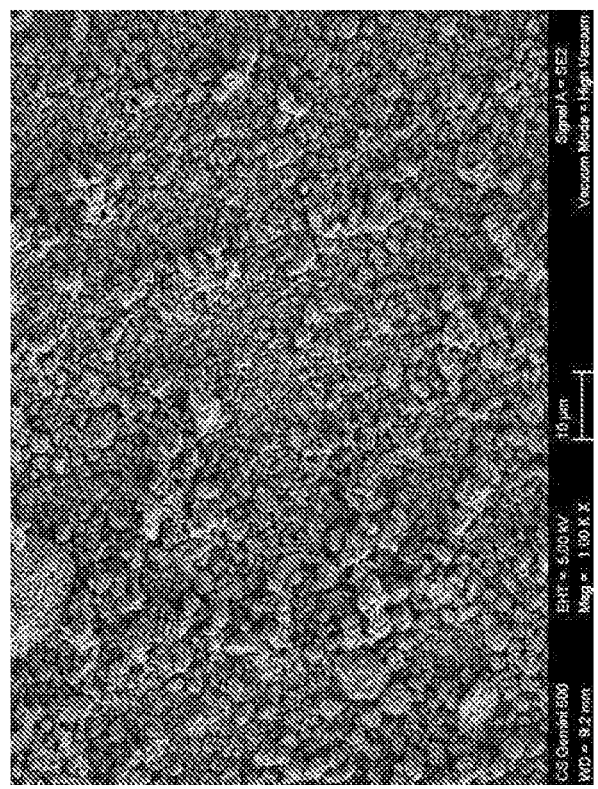
FIGS. 55A-55C provide SEM images of siloxane-alumina agglomerates spray-dried with PEG-PPG-PEG dispersant at 1% by weight in slurry.
Figure 56B:
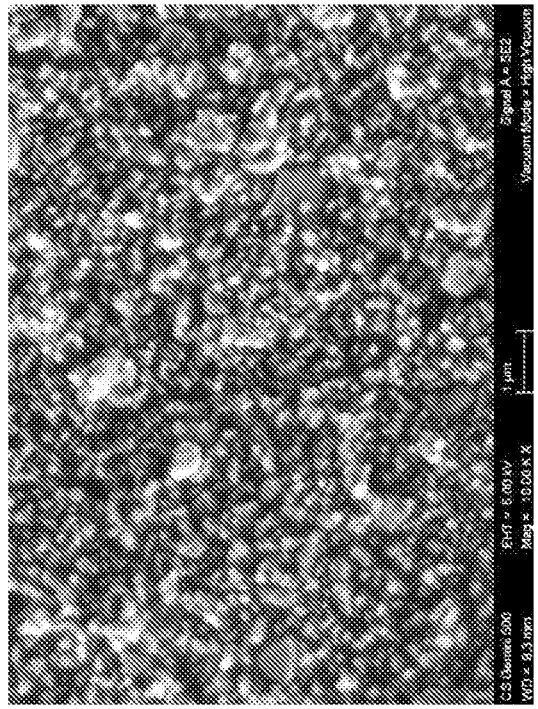
Figure 55B:
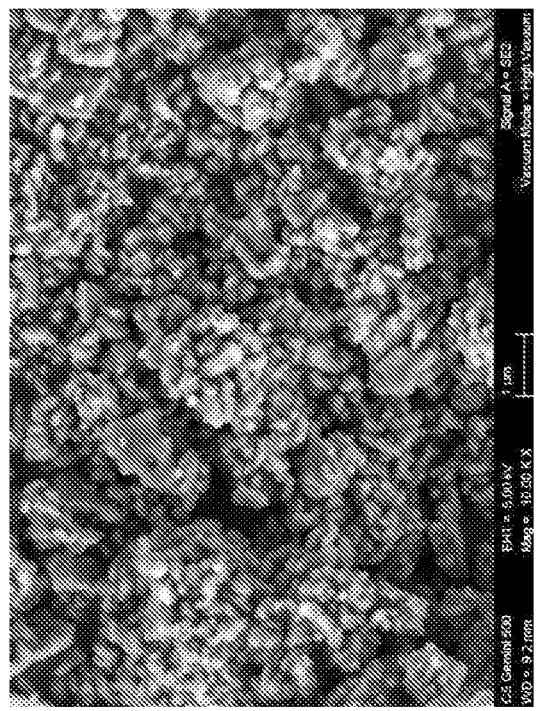
Figure 56C:
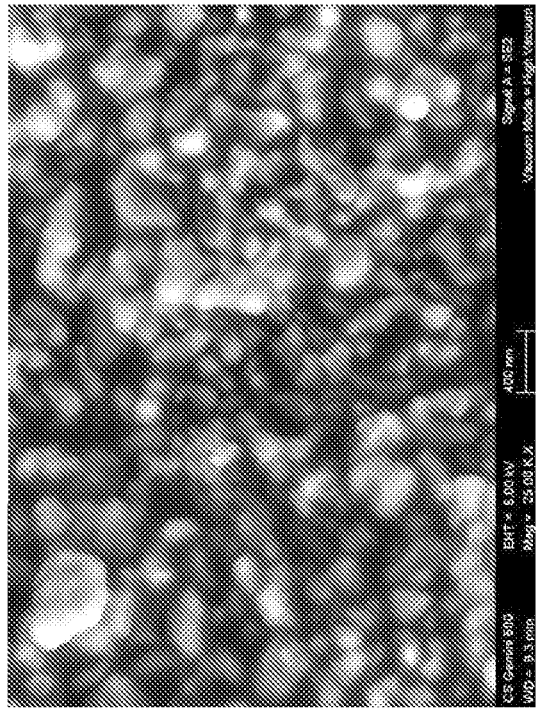
Figure 55C:
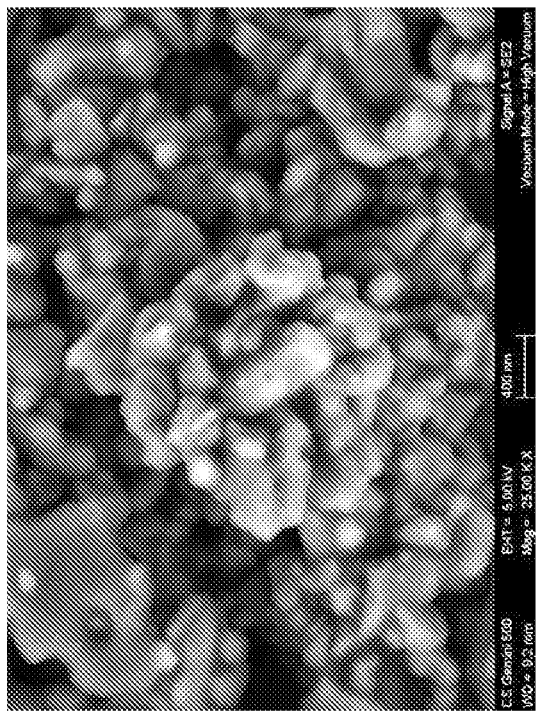

FIGS. 55A-55C and FIGS. 56A-56C provide SEM images of siloxane-alumina agglomerates spray-dried with PEG-PPG-PEG dispersant, where PEG is polyethylene glycol and PPG is polypropylene glycol. FIGS. 55A and 56A are at a magnification of 1K; FIGS. 55B and 56B are at a magnification of 10K; and FIGS. 55C and 56C are at a magnification of 25K. Agglomerates made with 3 wt. % co-polymer in the slurry appear to be finer than those made with 1 wt. % co-polymer in the slurry. The triblock copolymer of polyethylene-polypropylene glycols, 4400 g/mol, therefore, can increase the fineness and uniformity of siloxane-alumina agglomerates. Filters with agglomerates prepared with such co-polymers have been shown to lose <5% of the baseline FE after various durability testing.

Table 17 shows water soak test results.

| Solution | Quantity Loading [g/L] | Quantity of Water [g] | Baseline Clean PD [KPa] | Baseline FE @ 0 g/L | After Water Soak Test Clean PD | After Water Soak Test FE @ 0 g/L | FE loss @ 0 g/L [%] | DP penalty [%] |
|---|---|---|---|---|---|---|---|---|
| AL-022719-3-4400 | 7.01 | 361.7 | 1.49 | 95.0% | — | 93.5% | 1.5% | 33.36% |
| AL-022719-3-4400 | 6.90 | 366.4 | 1.46 | 94.1% | — | 92.4% | 1.7% | 30.48% |
| AL-022719-1.5-4400-1.5-TEA | 4.26 | 362.4 | 1.35 | 94.1% | — | 92.2% | 1.9% | 20.48% |
| AL-022719-1.5-4400-1.5-TEA | 4.19 | 334.5 | 1.30 | 92.6% | — | 91.2% | 1.5% | 16.05% |
| AL-022719-1.5-4400-1.5-TIPA | 4.16 | 349.0 | 1.32 | 93.1% | — | 90.3% | 2.8% | 17.70% |
| AL-022719-1.5-4400-1.5-TIPA | 4.16 | 316.2 | 1.31 | 93.4% | — | 89.8% | 3.6% | 17.14% |
| AL-022719-3.0 M600 | 3.61 | 337.7 | 1.30 | 93.2% | — | 86.4% | 6.9% | 16.13% |
| AL-022719-3.0 M600 | 3.60 | 318.5 | 1.32 | 92.9% | — | 85.2% | 7.6% | 17.79% |
| As-Received DK-11-15-190228-01 | 4.97 | 322.0 | 1.40 | 92.6% | — | 92.1% | 0.6% | 24.91% |
| As-Received DK-11-15-190228-01 | 5.01 | 328.5 | 1.41 | 94.2% | — | 93.4% | 0.8% | 26.18% |

In Table 17, the "FE Loss @ 0 g/L [%]" shows the change in the FE before and after the water test.

The addition of organic dispersants impacts the texture and morphology of agglomerates and the assemblies of agglomerates as they as deposited in the monolith, in turn affecting FE and dP.

Figure 58:
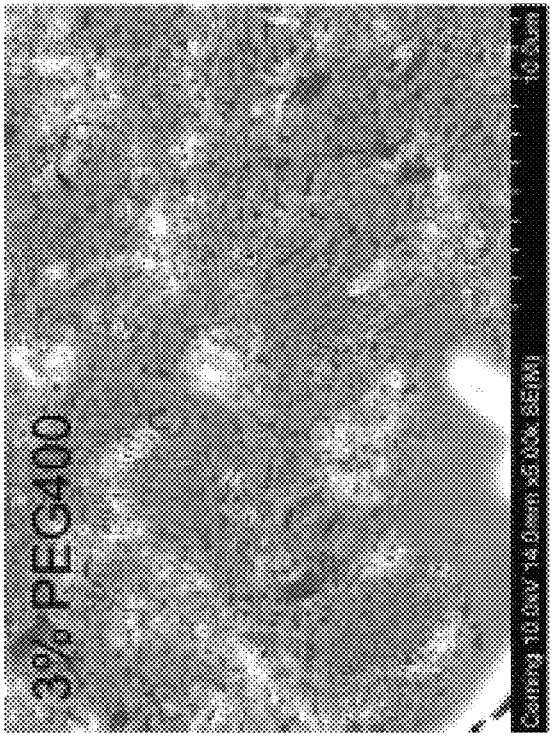
FIGS. 57-58 provide SEM images of cross-sectional views of un-milled A1000SGD agglomerates using varying dispersants.
Figure 57:
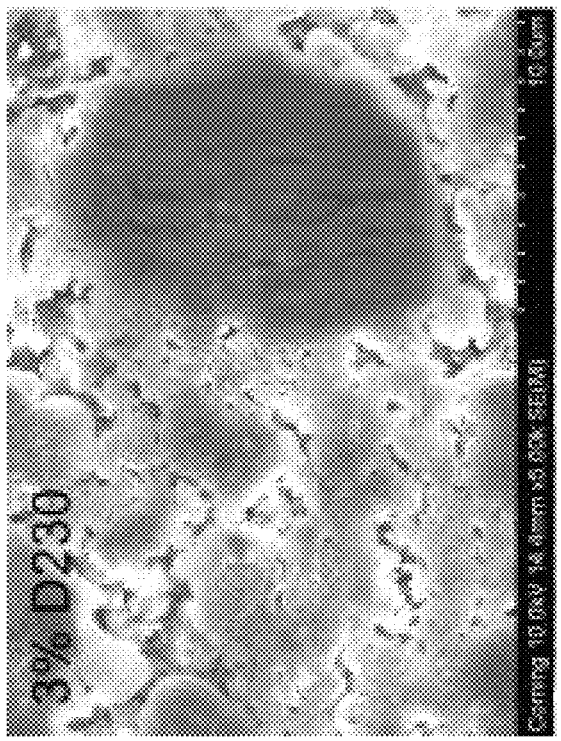

FIGS. 57-58 provide SEM images of cross-sectional views of un-milled A1000SGD agglomerates using varying dispersants. Varying the organic dispersants varies the resulting texture of the agglomerates. FIG. 57 shows a polyoxypropylenediamine (D230) dispersant at 3% by weight in slurry. FIG. 58 shows a polyethylene glycol (PEG-400) dispersant at 3% by weight in slurry. Dispersants appear to affect morphology of the agglomerates.

Figure 59A:
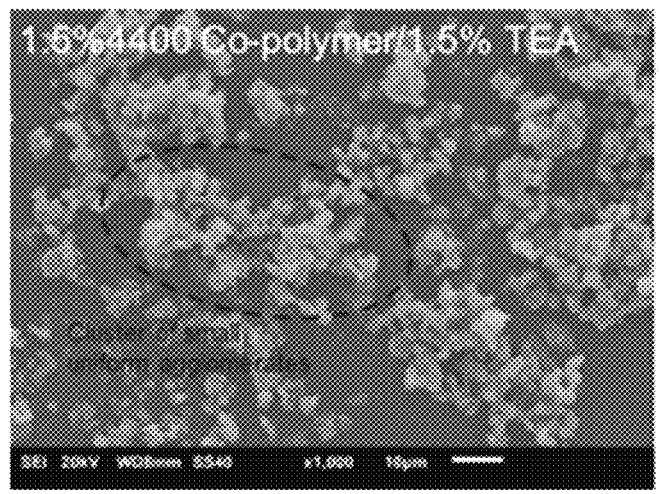
FIGS. 59A-59B, 60A-60B, and 61A-61B provide SEM images of siloxane-alumina agglomerates spray-dried with a combination of PEG-PPG-PEG dispersant (1.5% by weight in the slurry) and TEA (1.5% by weight in the slurry) as well as SEM images of agglomerates spray-dried with only PEG-PPG-PEG dispersant at 1% and 3% by weight in the slurry.
Figure 60A:
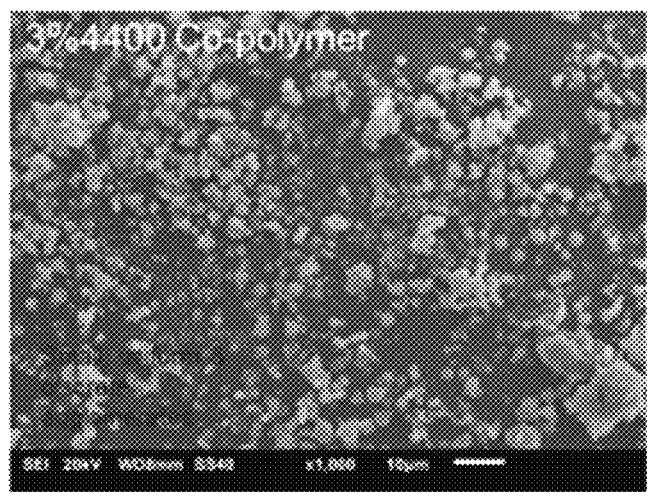
Figure 61A:
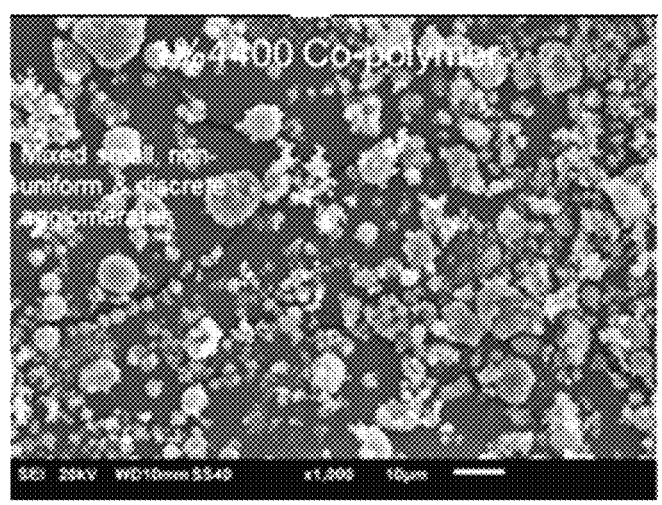
Figure 59B:
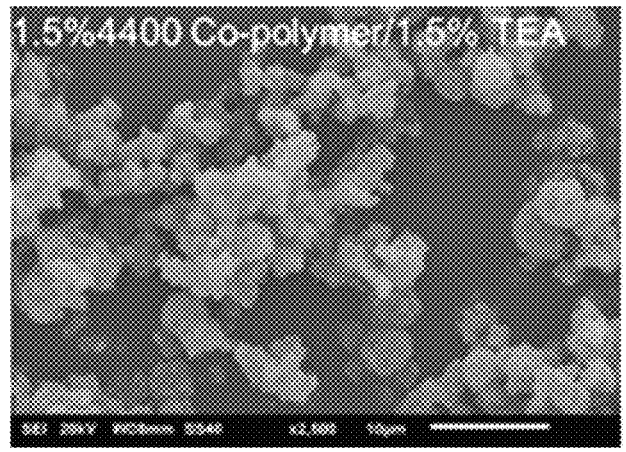
Figure 60B:
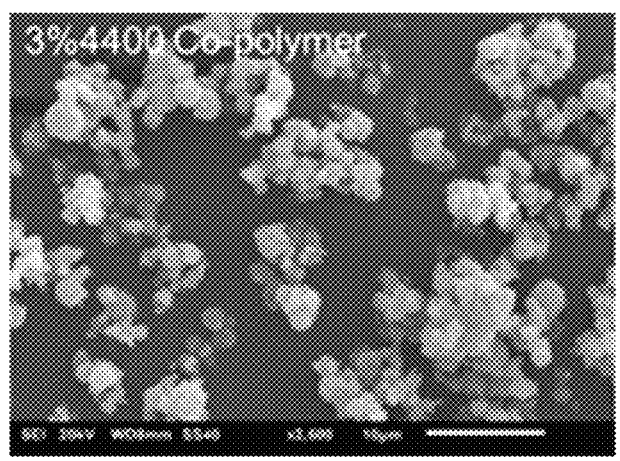
Figure 61B:
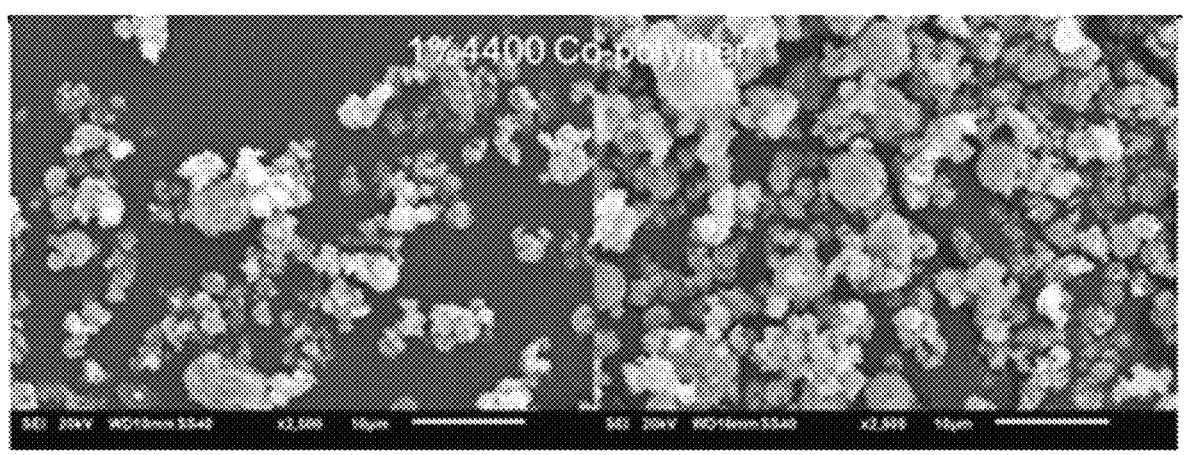

FIGS. 59A-59B, 60A-60B, and 61A-61B provide SEM images of of siloxane-alumina agglomerates spray-dried with varying dispersants. FIGS. 59A-59B show siloxane-alumina agglomerates spray-dried with a combination of PEG-PPG-PEG dispersant (1.5% by weight in the slurry) and TEA (1.5% by weight in the slurry) at two different magnifications. FIGS. 60A-60B show the PEG-PPG-PEG triblock copolymer (4400) dispersant at 3% by weight in slurry at two different magnifications. FIGS. 61A-61B show the PEG-PPG-PEG triblock copolymer (4400) dispersant at 1% by weight in slurry at two different magnifications. FIGS. 59A-59B, 60A-60B, and 61A-61B show the influence of dispersants on clusters of agglomerates. When triethanolamine (TEA) is added to the 4400 g/mol triblock copolymer, clusters of small agglomerates form, as opposed to fine and uniform, more discrete agglomerates with only 3% of the triblock copolymer, and the less fine, less uniform agglomerates with 1% of the triblock copolymer. Without intending to be bound by theory, it is thought that both adherent and non-adherent dispersants promote the uniformity of agglomerate composition, affecting agglomerate structure and leading to requisite FE/dP durability.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A filtration article comprising:
   a honeycomb body comprised of a plurality of intersecting porous walls comprised of surfaces which define a plurality of channels extending from an inlet end to an outlet end, wherein the plurality of channels comprises inlet channels, which are sealed at locations spaced away from the inlet end, and outlet channels, which are sealed at locations spaced away from the outlet end; and
   a porous inorganic network of refractory metal oxide nanoparticles disposed on, or in, or both on and in, at least some of the walls defining the inlet channels,
      wherein the refractory metal oxide nanoparticles are bound by a high temperature binder comprising one or more inorganic components,
      wherein a clean filtration efficiency of the filtration article is greater than or equal to 70% as measured by a clean filtration efficiency test; and
      wherein the filtration article is moisture resistant such that the clean filtration efficiency of the article does not change by more than 5% after being exposed to; a water soak test, a water immersion test, a water nebulizer test, or combinations thereof.

2. The filtration article of claim 1, wherein the high temperature binder is provided by a silicon-containing binder precursor.

3. The filtration article of the preceding claim, wherein the high temperature binder comprises at least one component which is stable at a temperature of greater than or equal to: 400° C., 500° C., 600° C., 700° C., 800° C., 900° C., 1000° C., 1100° ° C., 1200° C., or 1300° C.

4. The filtration article of claim 1, wherein the high temperature binder is silicon-containing.

5. The filtration article of claim 2, wherein the silicon-containing binder binds some of the refractory metal oxide nanoparticles to each other.

6. The filtration article of claim 2, wherein the silicon-containing binder binds some of the refractory metal oxide nanoparticles to the porous walls of the honeycomb body.

7. The filtration article of claim 2, wherein the silicon-containing binder binds the refractory metal oxide nanoparticles to each other and to the porous walls of the honeycomb body.

8. The filtration article of claim 2, wherein the silicon-containing binder is one or more of the group consisting of silica, silicone resin, sodium silicate, colloidal silica, and combinations thereof.

9. The filtration article of claim 2, wherein the silicon-containing binder precursor is a silicone resin.

10. The filtration article of claim 2, wherein the silicon-containing binder precursor is a siloxane.

11. The filtration article of claim 2, wherein the silicon-containing binder precursor is an alkoxysiloxane.

12. The filtration article of claim 2, wherein the silicon-containing binder precursor is a silicate.

13. The filtration article of claim 2, wherein the silicon-containing binder precursor is an alkaline silicate.

14. The filtration article of claim 2, wherein the silicon-containing binder precursor is a sodium silicate.

15. The filtration article of claim 1 wherein the nanoparticles are present in the form of agglomerates.

16. The filtration article of claim 15 wherein the porous inorganic network comprises aggregates of the agglomerates.

17. The filtration article of claim 1 wherein the inorganic material of the porous inorganic network is present on the honeycomb filter body in a loading in a range of from 1 to 20 g/L.

18. The filtration article of claim 1 wherein the inorganic material of the porous inorganic network is present on the honeycomb filter body in a loading in a range of from 1 to 10 g/L.

\* \* \* \* \*